United States Patent
Bloom et al.

(10) Patent No.: US 6,732,353 B1
(45) Date of Patent: May 4, 2004

(54) METHOD AND SYSTEM FOR GENERATING ENTERPRISE APPLICATIONS OF A DIVERSITY OF INFORMATION TECHNOLOGIES

(75) Inventors: Bard Bloom, Yorktown Heights, NY (US); Darrell Reimer, Ossining, NY (US); Ian D. Simmonds, Dobbs Ferry, NY (US); Mark N. Wegman, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,642

(22) Filed: Dec. 15, 1999

Related U.S. Application Data

(60) Provisional application No. 60/158,552, filed on Oct. 8, 1999.

(51) Int. Cl.$^7$ .................................................. G06F 9/44
(52) U.S. Cl. .......................................... 717/103; 705/8
(58) Field of Search ........................ 717/100; 707/201, 707/202, 10, 8; 709/248, 203; 705/4, 8, 9; 706/7, 18, 150

(56) References Cited

U.S. PATENT DOCUMENTS

| | | | | |
|---|---|---|---|---|
| 5,930,512 A | * | 7/1999 | Boden et al. | 395/710 |
| 5,960,420 A | * | 9/1999 | Leymann et al. | 707/1 |
| 6,009,405 A | * | 12/1999 | Leymann et al. | 705/9 |
| 6,023,702 A | * | 2/2000 | Leisten et al. | 707/100 |
| 6,038,538 A | * | 3/2000 | Agrawal et al. | 705/7 |
| 6,073,111 A | * | 6/2000 | Leymann et al. | 705/8 |
| 6,122,633 A | * | 9/2000 | Leymann et al. | 707/10 |
| 6,275,863 B1 | * | 8/2001 | Leff et al. | 709/248 |
| 6,278,977 B1 | * | 8/2001 | Agrawal et al. | 705/7 |
| 6,415,297 B1 | * | 7/2002 | Leymann et al. | 707/201 |

OTHER PUBLICATIONS

IBM MQSeries Worflow Concepts and Architecture version 3.2, IBM published Jun. 1999, pp. 16–17.*
IBM FlowMark Modeling version 2, Release 3, IBM, published Dec. 1996, pp. 2–28,47–57,67–74,152–155.*
"Using the WFT Development Environment", Template Software, Template Software Inc. Jun. 1997.*
"Template Software Strenghtens Core Product Family with Ease–Of–Use and Functionality Enhancement that Promotes Unparallelled Software Reuese", PR Newsire, Jun. 23, 1997.*
"Template Software Rolls Out Corporate and Product Groth Strategies at Solutions '97", Template Software Inc. PR Newswire, Apr. 3, 1997.*
"Object–Orient Software Engineering", Ivar Jacobson, pp. 126–129, 156–163, Jan. 1996.*

* cited by examiner

*Primary Examiner*—Todd Ingberg
(74) *Attorney, Agent, or Firm*—Ference & Associates

(57) ABSTRACT

An enterprise process model that comprises a plurality of actors, actions performed by said actors, objects acted upon by said actions, and roles. Data characterizing the view of the attributes of at least one of the objects of the model is generated by associating a plurality of situation/role pairs with the at least one object; and then, for each particular situation/role pair, defining a view definition for subsequent use.

In another aspect of the present invention, an enterprise application for use in an information system that comprises diverse software services and hardware platforms is generated by providing a model of the enterprise process, wherein the model comprises a plurality of actors, actions performed by said actors, objects acted upon by said actions, and roles. A configuration defining software services and hardware platforms that support the model is generated. Finally, program fragments that support the model are generated.

40 Claims, 9 Drawing Sheets

METHOD AND SYSTEM FOR GENERATING ENTERPRISE APPLICATIONS OF A DIVERSITY OF INFORMATION TECHNOLOGIES

CROSS-REFERENCED TO RELATED APPLICATION

This application claims priority to U.S. Provisional Application 60/158,552 filed Oct. 8, 1999, and is related to Ser. No. 09/461,616 filed concurrently herewith herein incorporated by reference in its entirety.

FIELD OF THE INVENTION

The present invention relates generally to tools that aid in the development of software applications and, more specifically, to tools that aid in the development of large scale enterprise applications.

BACKGROUND OF THE INVENTION

Enterprise applications perform useful functions (such an expense reimbursement, or order fulfillment) in an enterprise. Software technologies (such as workflow programs, messaging systems, database programs, and Graphical User Interface (GUI) builders) have been developed that aid in the development of large-scale, enterprise-wide applications. These systems are helpful because they provide useful infrastructure and a rapid build time.

However, because such systems use diverse underlying software technologies, it is often very difficult for the system designer to visualize the enterprise process while at the same time visualize the user interface and the information accessible at each stage of the enterprise process.

Thus, there remains a need in the art to provide an efficient mechanism to visualize an enterprise process and also visualize the user interface and information accessible at each stage of the enterprise applications that rely on a set of diverse underlying software technologies.

In addition, in the event that a change is required in the enterprise application, the system designers must make the appropriate changes to each of the underlying software technologies to update the enterprise application. This may be a difficult, error-prone, time-consuming and expensive task if the change effects much of the underlying software technology that makes up the enterprise application.

Therefore, there is a need in the art to provide a system that provides for rapid integration of software technologies into an enterprise application, yet also provides for flexible and efficient updates to such enterprise applications.

SUMMARY OF THE INVENTION

The problems stated above and the related problems of the prior art are solved with the principles of the present invention, method and system for generating enterprise applications of a diversity of information technologies. An enterprise process model is generated that comprises a plurality of actors, actions performed by said actors, objects acted upon by said actions, and roles. Data characterizing the view of the attributes of at least one of the objects of the model is generated by associating a plurality of situation/role pairs with the at least one object; and then, for each particular situation/role pair, defining a view definition for the attributes of the at least one object based upon user input, and storing the view definition for subsequent use. Preferably, the view definition is stored as part of a model, and used by a code generation process to build program fragments that execute the enterprise application represented by the model.

Preferably, the view definition provides one or more of the following: i) an indication whether the attributes of the at least one object are to be displayed; ii) information that dictates how to render the attributes of the at least one object; iii) an indication whether the attributes of the at least one object are to be editable; and iv) information that dictates how to edit the attributes of the at least one object.

In another aspect of the present invention, an enterprise application for use in an information system that comprises diverse software services and hardware platforms is generated by generating a model of the enterprise process, wherein the model comprises a plurality of actors, actions performed by said actors, objects acted upon by said actions, and roles. A configuration defining software services and hardware platforms that support the model is generated. Finally, program fragments that support the model are generated. The program fragments are suitable for execution on hardware platforms defined by the configuration and use the software services defined by the configuration. Preferably, a set of templates that support these hardware platforms and software services are used to generate the program fragments. In addition, the model preferably includes a view definition for the attributes of at least one object of the enterprise process, wherein the view definition is generated via user input as described above.

DESCRIPTION OF THE PREFERRED EMBODIMENTS

Figure 1:
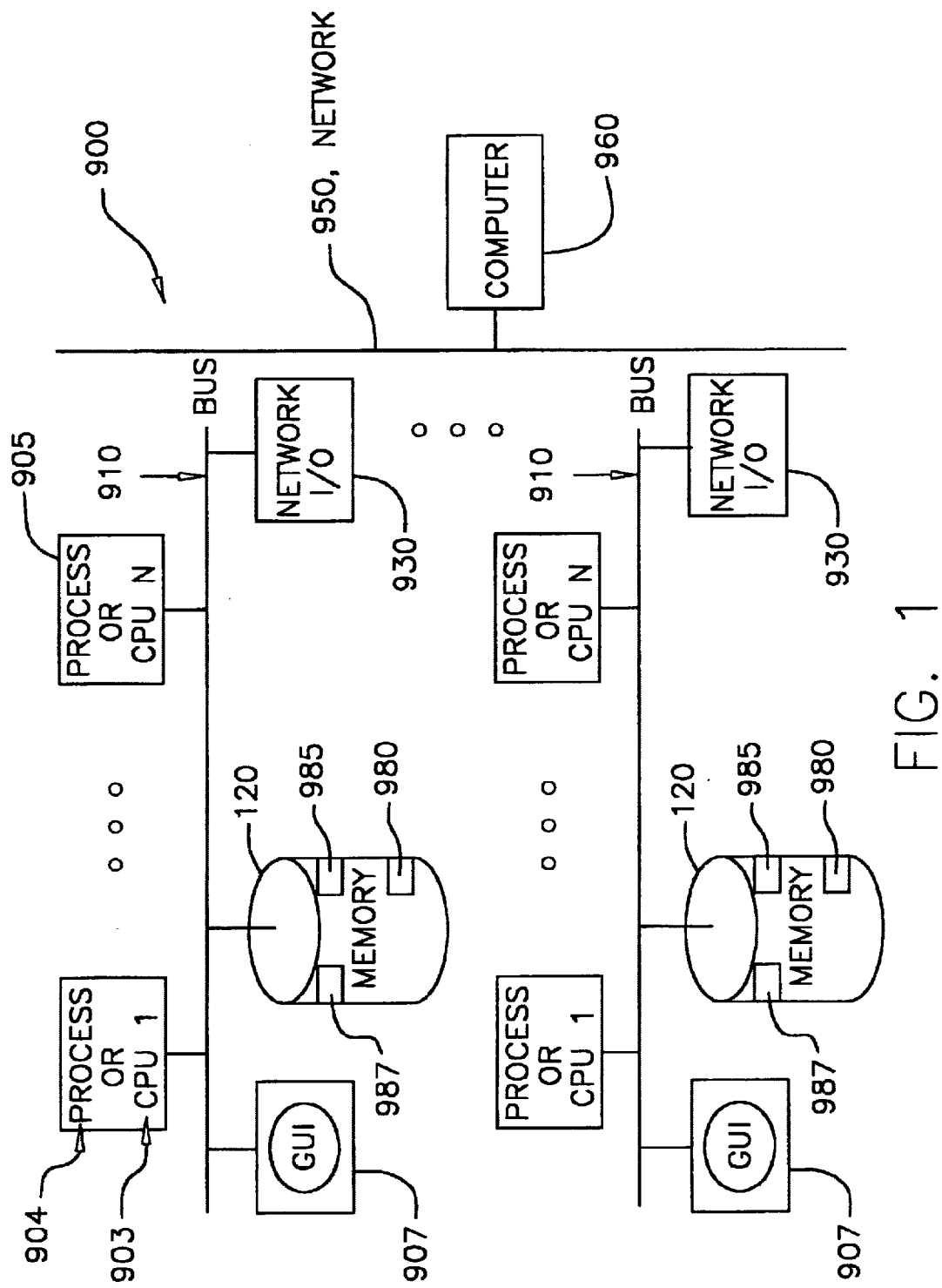
FIG. 1 is a block diagram of a computer processing system wherein the method of the present invention may be embodied.

The present invention may be implemented on any computer processing system including, for example, a personal computer or a workstation. As shown in FIG. 1, a computer processing system 900 as may be utilized by the present invention generally comprises one or more computers or processors. An exemplary system includes at least one central processing unit (CPU) 903 connected to a bus 910 that is further connected to memory 120, a graphical user interface 907 (such as a display), and optionally a network input/output (I/O) device 930. Memory 120 typically includes persistent storage (such as ROM, a hard disk drive, a CD-ROM drive, an optical drive, ROM or other suitable storage device) and non-persistent storage (such as RAM). The operating system and application programs that execute on the CPU 903 are typically stored in persistent storage and loaded into non-persistent storage for execution by the CPU 903. Portions of the operating system and application programs that execute on the CPU may be loaded from network resources into memory 120 via the network I/O device 930. An example of a such a system 900 is the IBM RS/6000 workstation.

It should be noted that the application program(s) executed by the CPU 903 may perform the methods of the present invention described below. Alternatively, portions or all of the methods described below may be embodied in hardware that works in conjunction with the application program executed by the CPU 903.

The present invention provides a technology for describing business processes at a very high level, and to automatically generate the software to support that business process. By combining enough information about the business process to generate it and by defining that information in business rather than software terms, generated software can be more easily modified when the business process changes. In order to do this the relevant aspects of business processes need to be modeled. Most business processes involve the coordination of many people, modifying data and physical objects. For the purposes of generating software, the principal concern is with data objects rather than physical objects. The business process specifies who is allowed and asked to modify various data objects at different times. Thus the model is focused on actors (people and program agents), actions (what those actors do) and things that are acted upon (data).

This patent application is organized as follows: Section 1 describes some of the social aspects of enterprises is described, along with the business processes needed to sustain them and the common elements in those. Section 2 describes how to concretely describe those common elements in a software tool. Finally, section 3 describes how to generate software from that description.

1. AN ENTERPRISE PROCESS IS A SET OF STRUCTURES AND CONVENTIONS GOVERNING A SUBSET OF THE CONVERSATIONS WITHIN AN ENTERPRISE

1.1. An Enterprise Consists of Many People Working Together Towards a Shared Goal People work together via conversations that guide their collective actions. Conversations lead to the formation of social systems called organizations or enterprises.

An enterprise is a human social system that produces a variety of outcomes that are valuable to a variety of constituencies. Enterprises include:

business enterprises, which generate capital through the exchange of goods and services for something that is of value to them—typically money, but increasingly other services, information or knowledge government enterprises which, amongst other things: establish and enforce regulations governing social conduct; issues, licenses and property rights such as a license to drive automobiles or a patent to intellectual property; raise taxes; and dispense largesse in the form of social services third sector enterprises (non-governmental organizations) which pursue causes on a not-for-profit basis while remaining independent from government.

The accomplishment of a particular outcome by an enterprise typically requires a chain or web of conversations amongst a possibly large number of people. The person requiring the outcome need not know about all these conversations, nor what people and knowledge will be required to produce the outcome. All that they rely upon is trust—that the person who commits to deliver an outcome to them speaks faithfully on behalf of the larger group (e.g., the enterprise as a whole, or a team) that as a whole will deliver the outcome.

1.2. Many Conversations of an Enterprise Process are Highly Structured and Frequently Repeated An enterprise process is the subset of the conversations of an enterprise that contributes to the achievement of a particular class of outcome. Some enterprise processes provide outcomes to people and enterprises beyond the enterprises—for example, a sales process (leads to purchase outcomes), a recruiting process, an order fulfillment process or an auditing process. Other enterprise processes accomplish outcomes of internal interest to the enterprise and its employees—for example, an expense reimbursement process, a strategy formation process, and a facilities management process. Within a business enterprise, some enterprise processes are called "business processes."

Frequently the conversations of an enterprise process become stylized, in form, content and job roles. This repeated structure and procedure is often reinforced through artifacts such as paper forms, organizational structures, job definitions, measurement and reward systems, and even scripts to be spoken aloud by employees in particular situations. The typical situations of the enterprise process are enumerated, together with the possible courses of action (procedures) to be followed by participants within those situations. This additional structure corresponds to practices that emerged or were the result of explicit agreements by the members of the enterprise. Some of this structure is deliberately introduced so that automation can be developed and exploited.

1.3. Enterprise Applications Support the Agreed Structures and Conventions of Enterprise Processes When the conversations of an enterprise process are stylized, repeated structures can be introduced into and thus be supported or even enforced by information technologies. A computer program that imposes upon generic information technologies the additional structure necessary to support the repeated, structured conversations of an enterprise process is referred to as an enterprise application of those information technologies. Here we use the shorter term enterprise application.

This invention is of methods and technologies for the development of enterprise applications. The engineering task of developing enterprise applications deals with both hardware devices and software technologies. Enterprise applications are hosted by physical, "hardware" devices that interface to people via input and output devices, and to other devices to form networks. Software technologies are programs that are executed by computer hardware devices and communications equipment. Generic software technologies provide a diverse range of enabling services including those that can be used directly "out of the box" (such as word processors and e-mail) and those that require application (such as transaction processing monitors, relational databases, and object request brokers). Supporting the structures of an enterprise process involves the development of computer programs that coordinate these diverse hardware and software technologies to form an enterprise application of the technologies.

2. THE STRUCTURE OF AN ENTERPRISE PROCESS CAN BE CAPTURED AS A MODEL IN A SOFTWARE TOOL

The first aspect of the invention comprises a software tool in which a model of the structures of an enterprise process can be captured. Such a model comprises:

a description of the common situations of the enterprise process, defined in terms of actors, actions, and acted upon objects, and the relationships between them that characterize each situation a description of each conversations contents and a description of the allowed actions and the sequencing of those actions by which people add to the conversation and orchestrate others adding to the conversation a description of information visualization and edit actions, defined for an actor playing a certain role in a certain situation of a process.

The second aspect of the invention is the capability to generate an enterprise application of a diversity of technologies, based upon said enterprise process model. This second aspect is described in Section 3.

2.1. Characterizing Common Situations in Terms of Actors, Actions and Acted Upons The common, recurring situations of an enterprise process can be characterized in terms of actions, roles and acted upons:

an "actor" is a human or software agent who may participate (perform actions) within the conversations of an enterprise and its processes an "acted upon" is one or more pieces of data and information recorded within conversations. It is an artifact of the conversation that can be observed by other actors later in the process. This data or information may refer to anything of interest to the enterprise (including the actors, actions, and conversations of enterprise processes themselves)

an "action" is an operation that results in changes to the data and information recorded within conversations. An "action" is performed by an actor, and results in changes to "acted upons"

a "role" is a label associated with a set of actors and information that characterizes i) when the set of actors associated with the label may perform certain actions, and ii) what such actors can see when they view objects of the model.

A situation may therefore be defined in terms of:

under what conditions the situation occurs. These conditions are typically expressed in terms of the state of the acted upon data and information which actors may play which roles within given situations what actions role players may be permitted or obliged to perform within the situation, and with what urgency.

The preferred embodiment of the present invention focuses on highly procedural enterprises processes. Thus, its Procedure Editor captures and displays to the user Procedure Diagrams that outline the specific set of a relationships of procedural workflows.

A "procedure" is a carefully designed and stage-managed sequence of situations, each of which is tied to clearly defined roles, actions and acted upons. This logical sequence of workflow "stages" is designed to ensure efficient achievement of a predictable set of outcomes.

Figure 2:
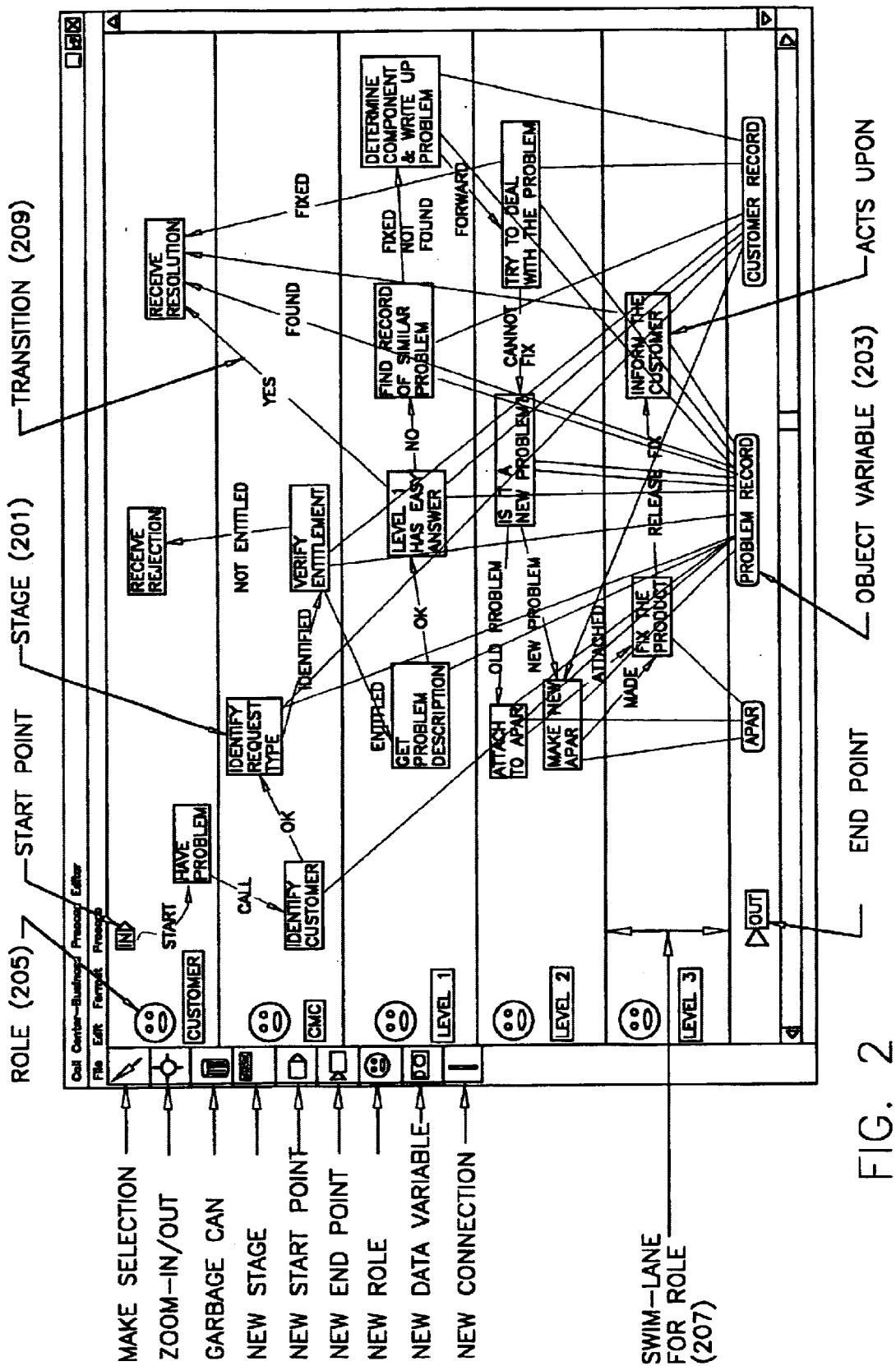
FIG. 2 illustrates the user interface for a Procedure Editor, which allows the user to enter a procedure diagram for a highly procedural enterprise process.

FIG. 2 illustrates an exemplary Procedure Diagram for a highly procedural enterprise process which is roughly modeled on part of the way help requests are handled when they come in on the telephone. We call this process—CallCenter—and it consists of:

stages (201)—the procedure's situations—are shown as rectangles (for example, identify customer)

object variables (203)—placeholders for the procedure's acted upons—are shown as octagons along the bottom of the diagram (for example, problemRecord is a variable that will contain a ProblemRecord object)

roles (205) are shown as masks to be 'worn' by actors (for example, customer).

The example in FIG. 2 shows the processing of a customer problem within the customer support organization of a software company. The procedure is initiated by a customer who has a problem. The customer contacts a so-called CMC representative who identifies the customer and verifies that they are entitled to support, at which point the customer's problem is passed to one or more levels of support personnel (level1, level2 and level3), based upon the nature of the problem. If a problem has not been previously encountered, there may be a need to correct the software, as specified in an APAR—an "Authorized Program Analysis Report."

Along the left hand side of the diagram are masks for the various roles (205) of actor—customer, CMC representative, and level1, level2 and level3 support personnel. Each task is a placed in a "swim lane" (207), which is a horizontal strip between two horizontal lines to the right of a role, to indicate which role of actor will perform the stage; for example, the CMC representative will perform tasks called identify customer, identify request type and verify entitlement.

The conditions in which each situation [stage (201)] of a procedure may occur are straightforward. An order in which stages can occur is indicated by transitions (209), which are shown as named arrows. For example, the process starts with the customer's have problem stage, before proceeding via the call transition to the CMC representative's identify customer stage. For several stages in this procedure, the actor playing a role is faced with a choice between several outcomes, each of which leads to a different transition being followed and subsequently a different continuation of the procedure. For example, when the CMC representative ends the verify entitlement stage they decide whether the customer is not entitled or entitled to support, leading either to the customer receiving an immediate rejection (following the not entitled outcome and transition), or to the rest of the problem determination and resolution procedure being followed. The selection of an outcome is a "transition action" performed by the actor performing the stage.

Lines connecting object variables (203) [octagons] to stages (201) [rectangles] indicate which object variables (203) are acted upon in each stage of the procedure. For example, the try to deal with the problem stage performed by level2 support acts upon the process's problemRecord and customerRecord object variables. Similarly, the APAR object variable is involved in each of the stages attach to APAR, make new APAR and fix the product.

Precisely which actor plays which role for which stage, and which domain object instance is associated with which object variable, and when these selections are made, is determined by additional information inputted into the system, but that is not shown in the diagram. In the example: the actor playing the role of customer should be the same for all three stages; and an actor is determined to play the level3 role depending upon their familiarity with the product component that is believed to be faulty. Similarly, the APAR object variable will either be filled by an existing APAR during the attach to APAR stage, or attached to a newly created APAR object during the make new APAR stage.

The highly procedural enterprise processes captured and displayed by the Procedure Editor has the following limitations:

the situations of the process are stages in a procedure; the invention supports all levels of structure in the spectrum from ad hoc to highly procedural processes each situation involves a single actor, being the actor playing the role associated with a stage; the invention supports both single actor and multi-actor situations in each stage there are a limited number of actions available to the actor, including the ability to see and modify objects acted upon by the stage, and the selection of a transition as the outcome for the stage; the invention applies to all situations that can occur within the conversations within an enterprise or between enterprises, and all actions that can occur within those situations.

2.2. Characterizing Things Acted Upon

The informational things recorded, viewed and acted upon within the situations of an enterprise process can be characterized using any of the large variety of means that computer science has developed for characterizing data and information. Commonly used approaches include:

entity-relationship attribute modeling
object-oriented modeling
information modeling and many others. The invention requires at least one means for defining acted upons.

In the preferred embodiment of the present invention, there is one kind of acted upon—"domain objects", or "objects" for short. Objects are defined in terms of their attributes and methods. An attribute is a named field that can contain a value of a specified type—for example, a text string, an integer, or another type of object. A method is an operation associated with an object that may update the object's data, invoke methods of other objects and/or return a value. For each of its attributes an object has associated methods for "getting" and "setting" the attribute's value.

Figure 3:
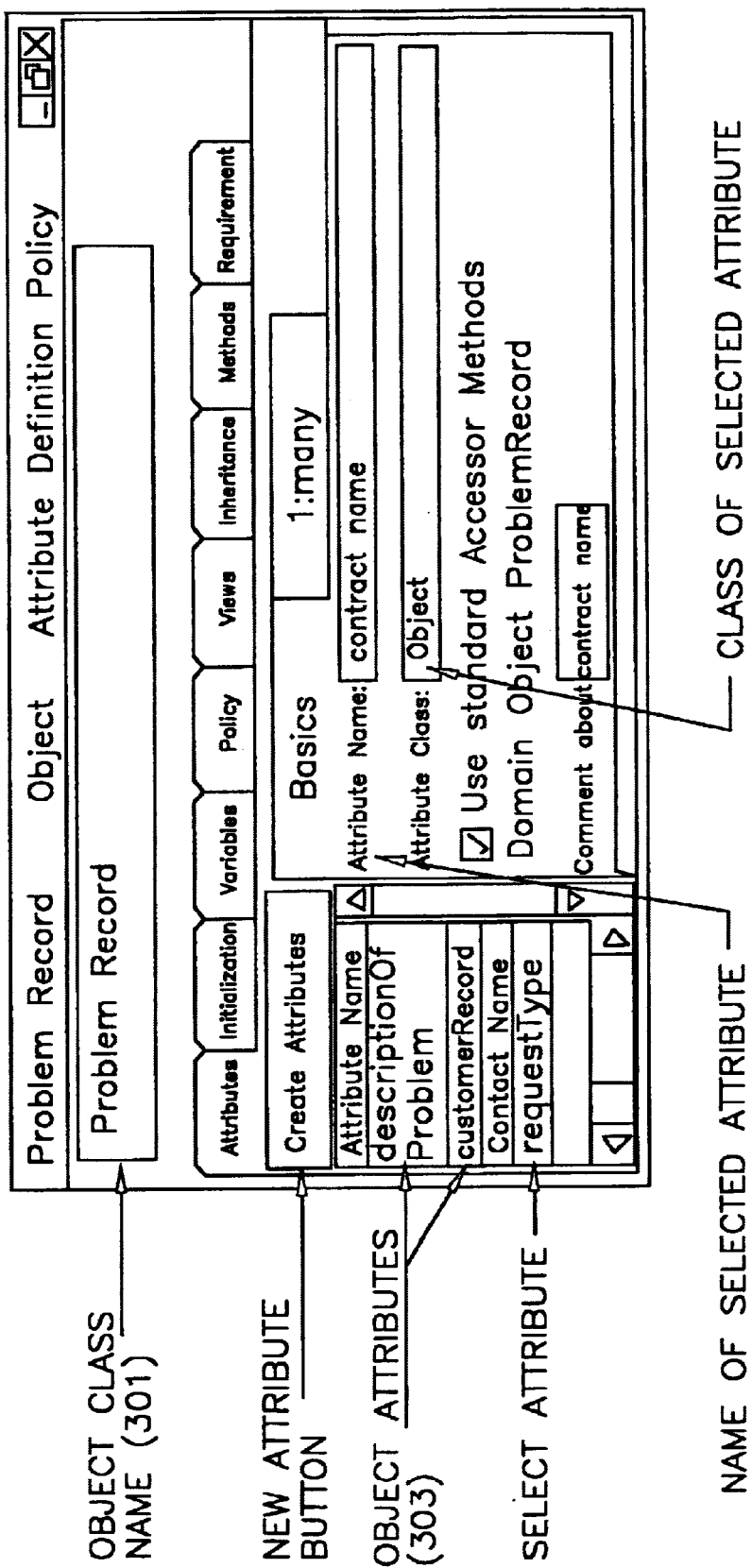
FIG. 3 illustrates the user interface for an Object Attribute Definition Editor of the present invention, which allows the user to define classes of object and the attributes for each class of object.

Objects and their attributes are defined in an Object Attribute Definition editor. The user interface to the Object Attribute Definition editor is illustrated in FIG. 3. In the example of FIG. 3, the domain objects of class Problem-Record (shown top left, 301) have attributes named descriptionOfProblem, customerRecord, contractName and requestType. Each attribute is characterized in a number of ways, one of which is its class; here the attribute contract-Name is of class Object. The Object Attribute Definition editor allows the user to define classes of object (301) and define the attributes (303) for each class of object. Preferably, the Object Attribute Definition editor allows the user to define the name (305) of a given attribute (303) for each class of object, and class (307) for a given attribute (303) for each class of object. The running application may deal with many instances of each class—for example, the many ProblemRecord objects created in the Call Center process. Each instance of the Call Center process, responding to a specific customer call, will act upon a single problem record.

There are a large number of ways to define acted upons and actions, most of which are suitable for use in this invention.

2.3. Characterizing Actions, Including Those for Visualizing and Editing Acted Upons An action is performed within a situation as an actor acts upon data or information. Actions may, amongst other things, result in: changes to data or information; the display of data or information; or the assignment of work to actors. As a consequence of an action taking place one or more new situations may arise, leading to further actors performing further actions.

Actions that display and edit information may be defined in terms of "view definitions". A view definition is information associated with an acted upon that characterizes the display and manipulation of the acted upon when rendered for display.

Each action should be available only to certain actors and in certain situations. The invention includes a means for defining what each actor may see or may modify within actions that visualize or change acted upons, and in what situations the actors are able to perform those actions. The invention requires at least one means for defining actions.

Three kinds of actions take place within the "stages" (situations) of a procedure:

"information visualization actions" result in the display of the attributes (data and information) of objects (acted upons)

"edit actions" result in changes to objects and their attributes

"transition actions" determine the subsequent course of action.

Transition actions are defined using the Procedure Editor, as described above in Section 2.1. Information visualization and edit actions are defined in the Object View Definition Editor, and are introduced here.

Figure 4:
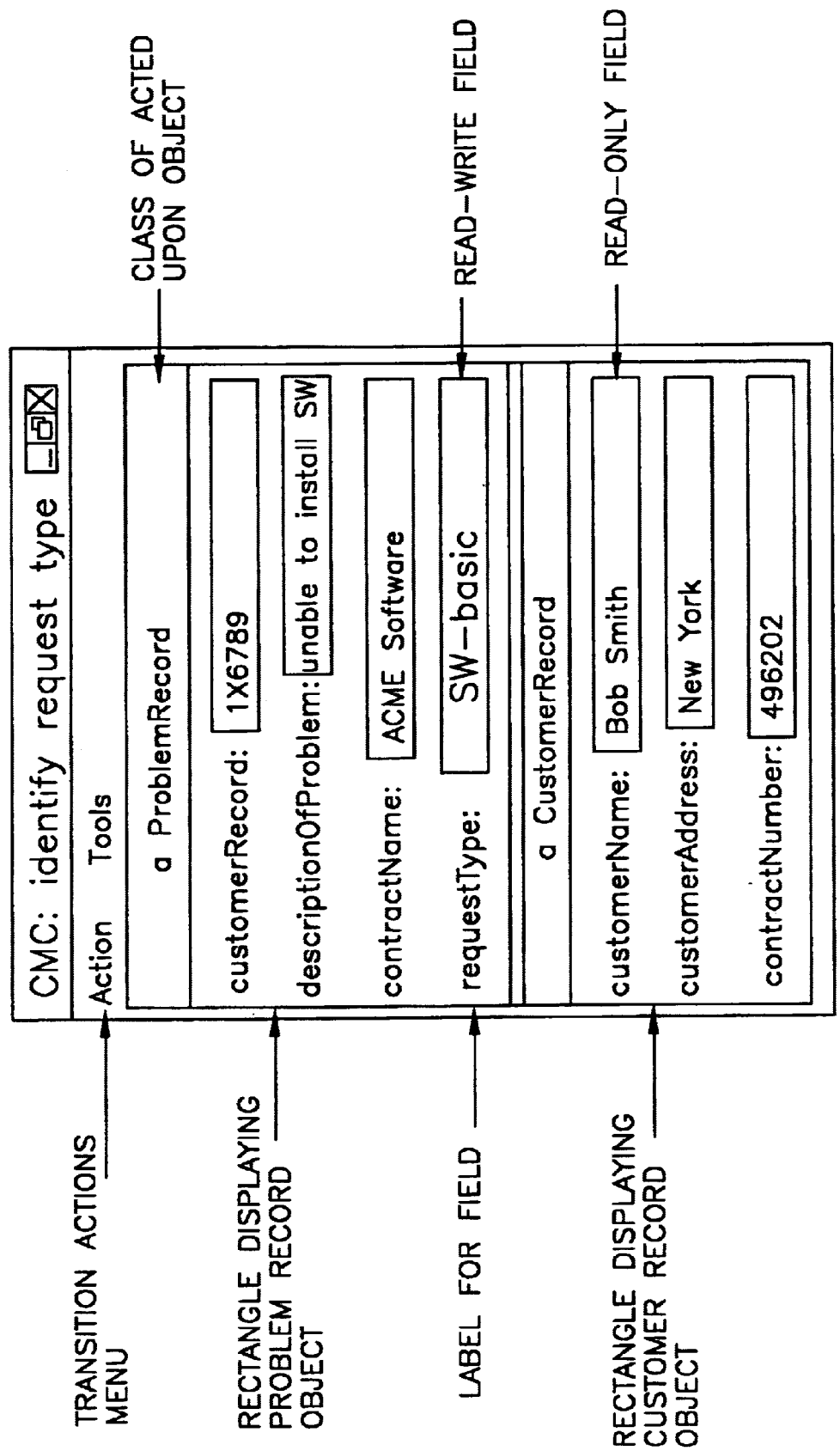
FIG. 4 illustrates a task window for a particular role performing a particular stage of the enterprise process of FIG. 2.

In the applications generated from the preferred embodiment, all three kinds of actions are made available in the form of a "task window", the details of which are shown in FIG. 4. A task window supports an actor in her work in a particular situation ("stage") in a business procedure. For example, the task window of FIG. 4 supports the CMC role in the identify request type stage of FIG. 2. The task window enables the actor playing the role for a given stage to see and possibly edit the attributes of each of the objects acted upon in the situation by the actor, and enables such actor to select a transition action that indicates the outcome of the stage. Note that the actor may make changes to the attribute values contained in read-write fields, but cannot change read-only fields. A read-write field—in this case, the value "SW-basic" of the problem record's requestType field—is shown with a white background, while a read-only attribute—such as the value "Bob Smith" of the customer record's customerName field—has a gray background.

The action of opening a task window for a stage is the visualization action of the stage. The action of editing the read-write fields of the form is the edit action of the stage. The actor indicates that the stage is completed by performing a transition action from the "Actions" menu (shown at the top left of the window). This menu is generated to include an entry corresponding to each transition leaving the current stage in the enterprise process diagram—that is, for each transition action of the stage. For the task window of the identify request type stage there is just one such transition—identified—so the menu (not shown) contains just this one transition action. As the user selects a transition action from the action list, the stage is completed and the application transitions to the next stage, for example by routing a work item to the actor that will perform the next stage.

The details of the task window for a particular role performing a particular stage—in the example of FIG. 4, for the CMC representative performing the IdentifyRequestType stage—are defined as follows:

the task's "Actions" menu is determined wholly in terms of the transitions leaving the task in its enterprise process diagram the set of domain objects displayed in a task window is determined by "acted upon" relationships shown in an enterprise procedure diagram. Thus, the task window for identify request type shown in FIG. 4 contains views of two domain objects: a problem record and a customer record.

task windows and the object views that they contain require further specification—in terms of task and object view definitions.

An object view definition is information associated with an object that characterizes the display and manipulation of the attributes of the object when rendered for display, for example, in a task window. It categorizes each of the domain object's attributes as either displayed or not displayed. Each displayed attribute is further categorized as editable or read-only, and has additional formatting information.

Figure 5:
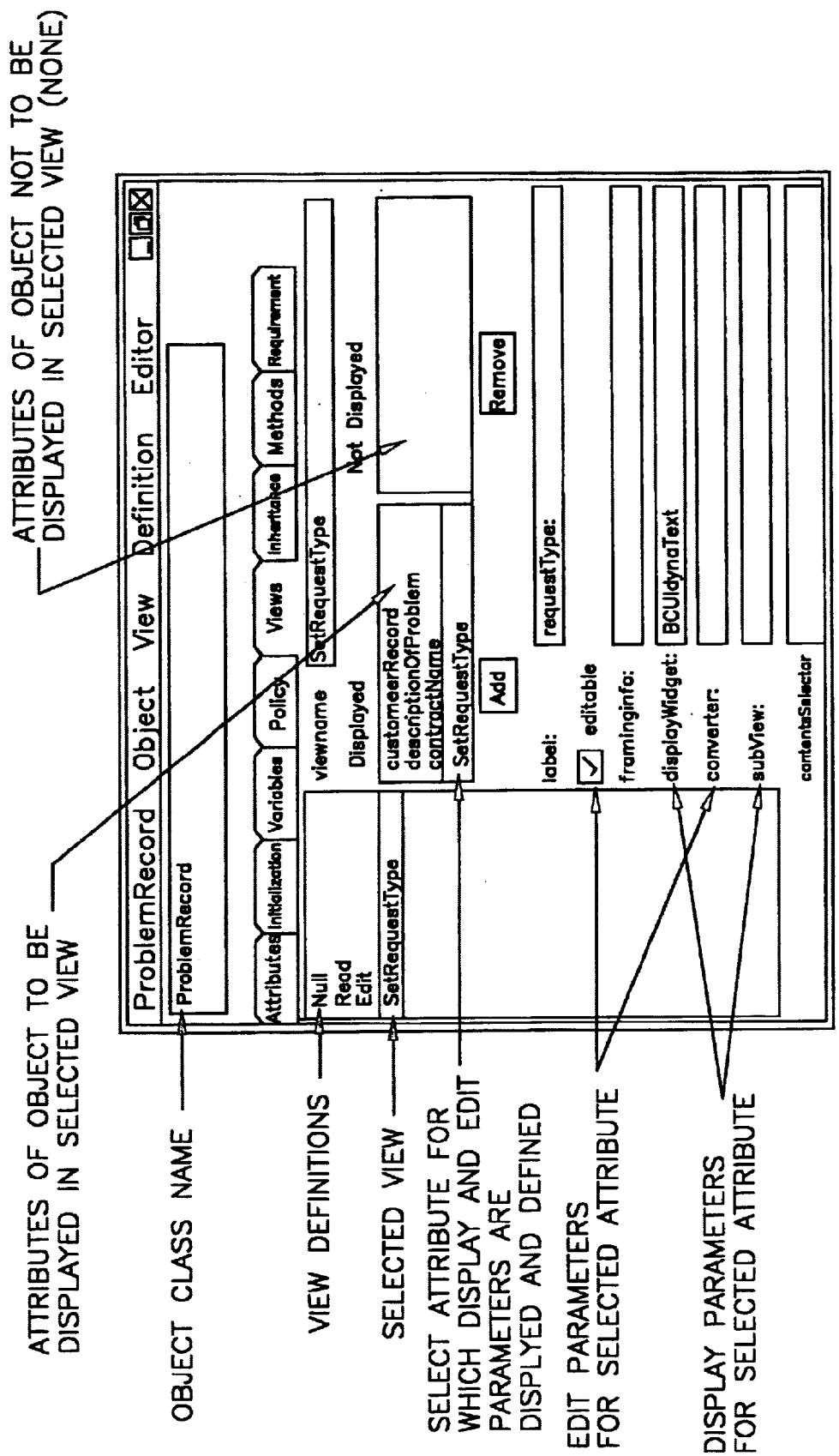
FIG. 5 illustrates the user interface for an Object View Definition Editor of the present invention, which provides the user with the ability to selectively define the display parameters and edit parameters of the attributes (which are preferably defined by the Object Attribute Definition editor of FIG. 3) of the domain object for a given view definition.

According to the present invention, an object view definition for a given domain object is specified using the Object View Definition Editor. The user interface of the Object View Definition Editor is illustrated in FIG. 5. In this example, an object view definition called SetRequestType is being defined for the domain object ProblemRecord to the CMC role in the IdentifyRequestType task of FIG. 2. The attributes of the domain object for a given view definition may be selectively defined as "Displayed" or "Not Displayed". In addition, the object view definition editor may provide the user to selectively define the "edit" parameters for a given attribute (which define whether the attribute is editable when displayed and other parameters used to edit the given attribute) and "display" parameters (which define parameters used to render a display of the attribute). In the example shown in FIG. 5, each of the four attributes of the object ProblemRecord (which was defined in the Object Attribute Definition Editor) for the SetRequestType view is to be displayed, so they are all categorized as "Displayed." Since the goal of the task is to identify the type of request being made by the customer, the requestType attribute is declared to be "editable."

Figure 6:
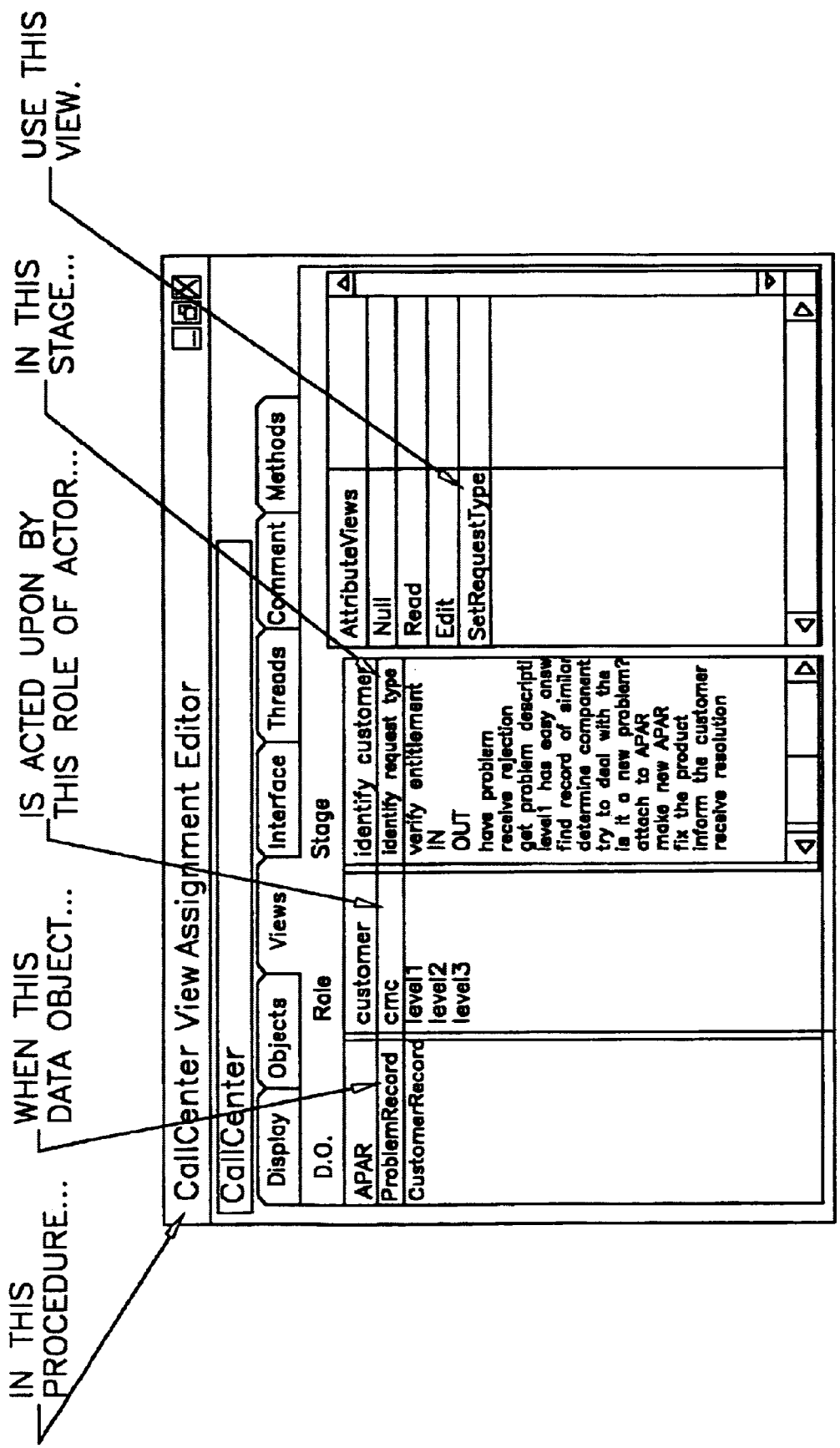
FIG. 6 illustrates a user interface for a View Assignment Editor of the present invention, which allows the user to select an object view (which is preferably defined by the object view definition editor of FIG. 5) for a given combination of domain object, role and task.

Since a stage may act upon several objects, a task view consists of one object view definition for each domain object acted upon by the task performed in the stage. A task view definition is assembled for a given task using the View Assignment Editor. The user interface of the View Assignment Editor is shown in FIG. 6. More specifically, the View Assignment Editor allows the user to select an object view definition (in this example, selected from the table of available views on the right) for a given combination of domain object, role and task (in this example, selected from entries in each of the first three columns, respectively). In FIG. 6 as shown, the object view SetRequestType of domain object ProblemRecord is selected as part of the task view definition for role CMC as they perform stage identify request type.

Preferably, a task view definition is complete when one object view has been selected for each domain object acted upon by each actor for the given task in the stage.

3. AN ENTERPRISE APPLICATION CAN BE AUTOMATICALLY GENERATED FROM AN ENTERPRISE PROCESS DESCRIPTION

Section 3.1 presents the notion of a program generator, which uses enterprise process models and program templates to generate computer programs. Section 3.2 describes how to create program templates. Section 3.3 describes how a tool can support alternative template sets and thus generate programs for a variety of enabling software and hardware technologies.

3.1. A Program Generator Uses Program Templates and Models to Generate Programs A program generator is a computer program that generates a set of computer program fragments ("modules") based upon a set of program templates and an input model that represents a description of the actors, actions, acted upons and situations of the business process as described in Section 2.

Figure 7:
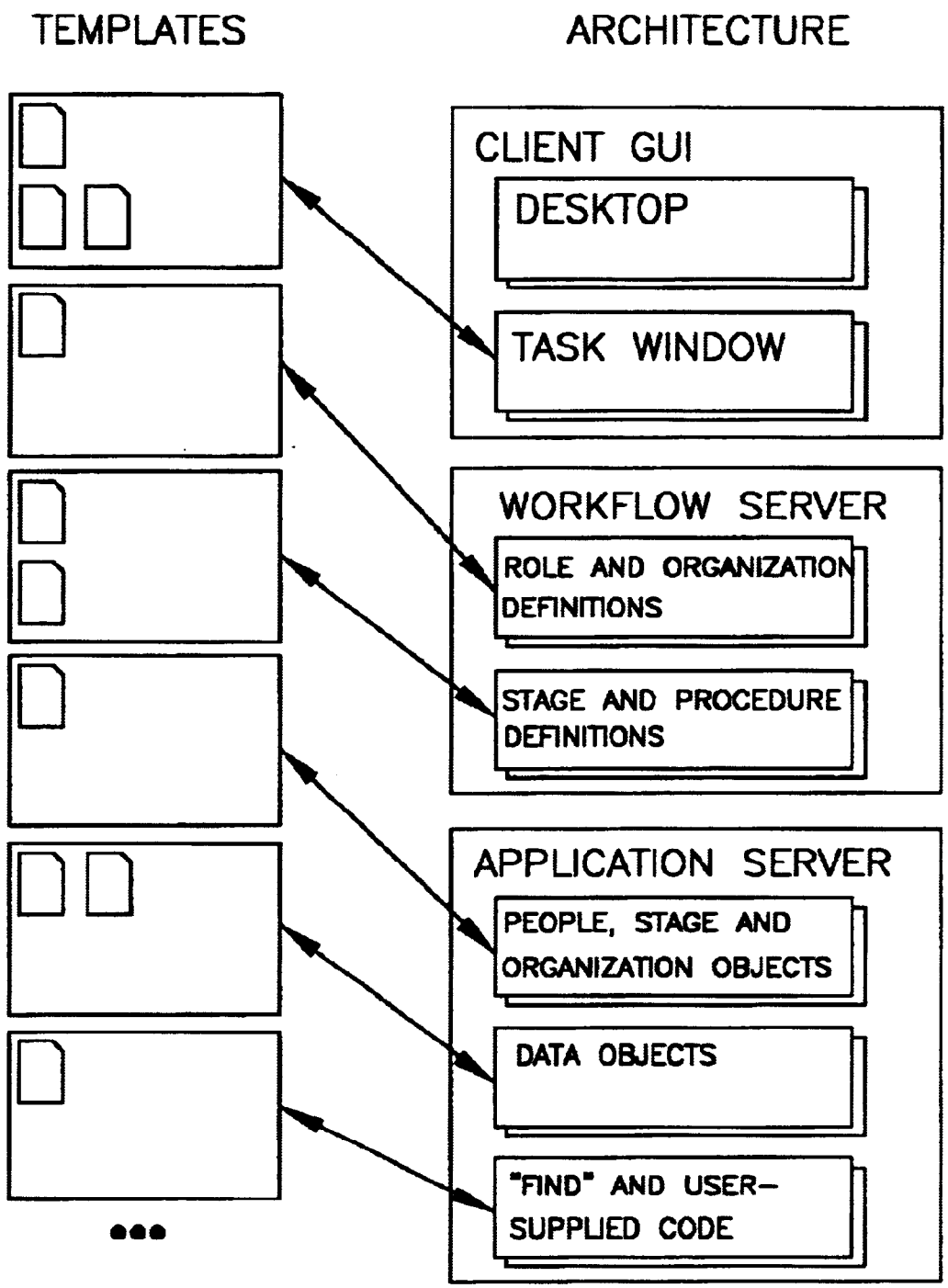
FIG. 7 is a pictorial illustration of an exemplary set of templates and an exemplary architecture underlying an enterprise application generated by the methodology of the present invention.

FIG. 7 illustrates an exemplary set of templates and an exemplary architecture. The templates are designed to produce applications of a particular hardware and software architecture. In this case, the architecture of the generated application consists of:

a Client Graphical User Interface (GUI) that runs on each user's desktop (or other) computer. The Client GUI consists of the "Desktop" window from which a user selects new work items (task), and one or more Task Windows appropriate for the various kinds of stage and other situation that the user may have to deal with a Workflow Server that runs on one or more server machines. The Workflow Server is responsible for routing work items (tasks) to users. In order to correctly route work, it must also follow stage and procedure definitions and know about roles and organizations.

an Application Server that runs on one or more server machines. The Application Server is responsible for the acted upons ("data" and "data objects") of the application, plus any additional business logic (here shown as "find and user-supplied code") supplied by the supplier of the model. In the preferred embodiment, the Application Server was also responsible for overcoming some of the limitations of the commercial Workflow Server that formed part of the selected architecture—hence the need for people, stage and organization objects.

The architecture for a particular business procedure consists of a number of program fragments that apply the various technologies of the architecture. As shown in FIG. 7, for each kind of program fragment to be created, there may be one or more a corresponding templates.

FIG. 7, which is illustrative, shows that a task window—which is an application of generic graphical user interface technologies—is made up of three kinds of program fragment, each of which has a corresponding template. One of these templates—creating an "interface" used by other program fragments of the task window to interact with a data object in the Application Server, and parameterized by the <ClassName> of the data object's class, and an <AttributeName>, <AttributeClass> pair for each of <ClassName>'s attributes—looks like this:

```
I.   Create a file called <ClassName>.java
II.  Write the following to the file, substituting the class's
     name for <ClassName>:
     // <ClassName>.java interface for an EJB Object
     package ebPackage;
     import java.util.*;
     import javax.ejb.EJBObject;
     import java.rmi.RemoteException;
     public interface <ClassName> extends EJBObject, Viewable {
         // getters and setters for the objects attributes
         String get<ClassName>Id( ) throws RemoteException;
         void set<ClassName>Id(String newValue)
         throws RemoteException;
I.   For each attribute of class <ClassName>,
         write the following to the file,
     substituting the attribute's name for <AttributeName> and
     its class for <AttributeClass>:
         String get<AttributeName>( ) throws RemoteException;
         void set<AttributeName> (<AttributeClass> newValue)
             throws RemoteException;
I.   Finally, write the following to the file:
         // standard methods
         public String displayName( ) throws RemoteException;
         public String getInstanceId( ) throws RemoteException;
         public boolean matches(String pattern, String qualifier) throws
             RemoteException;
         public interface Creator {public Viewable createThing( ) throws
             RemoteException; }}
```

In the case of the class ProblemRecord from the example shown in Section 2, with its four attributes descriptionOfProblem, customerRecord, contractName and requestType, the following code is generated from this template:

```
// ProblemRecord.java interface for an EJB Object
package ebPackage;
import java.util.*;
import javax ejb.EJBObject;
import java.rmi.RemoteException;
public interface ProblemRecord extends EJBObject, Viewable {
    // getters and setters for the objects attributes
    String getProblemRecordId( ) throws RemoteException;
    void setProblemRecordId(String newValue) throws
    RemoteException;
    String getDescriptionOfProblem( ) throws RemoteException;
    void setDescriptionOfProblem(String newValue) throws
    RemoteException;
    String getCustomerRecord( ) throws RemoteException;
    void setCustomerRecord(String newValue) throws RemoteException;
    String getContractName( ) throws RemoteException;
    void setContractName(String newValue) throws RemoteException;
    String getRequestType( ) throws RemoteException;
    void setRequestType(String newValue) throws RemoteException;
    // standard methods
    public String displayName( ) throws RemoteException;
    public String getInstanceId( ) throws RemoteException;
    public boolean matches(String pattern, String qualifier) throws
    RemoteException;
    public interface Creator (public Viewable createThing( ) throws
        RemoteException;}}
```

A complete template set contains sufficient templates for generating all aspects of an enterprise application. Each template in the set is similar in nature to the above example, although different program templates may generate program fragments in different programming or specification languages. It is not uncommon for a single application to have modules written in 4 or more different programming or specification languages.

Figure 8:
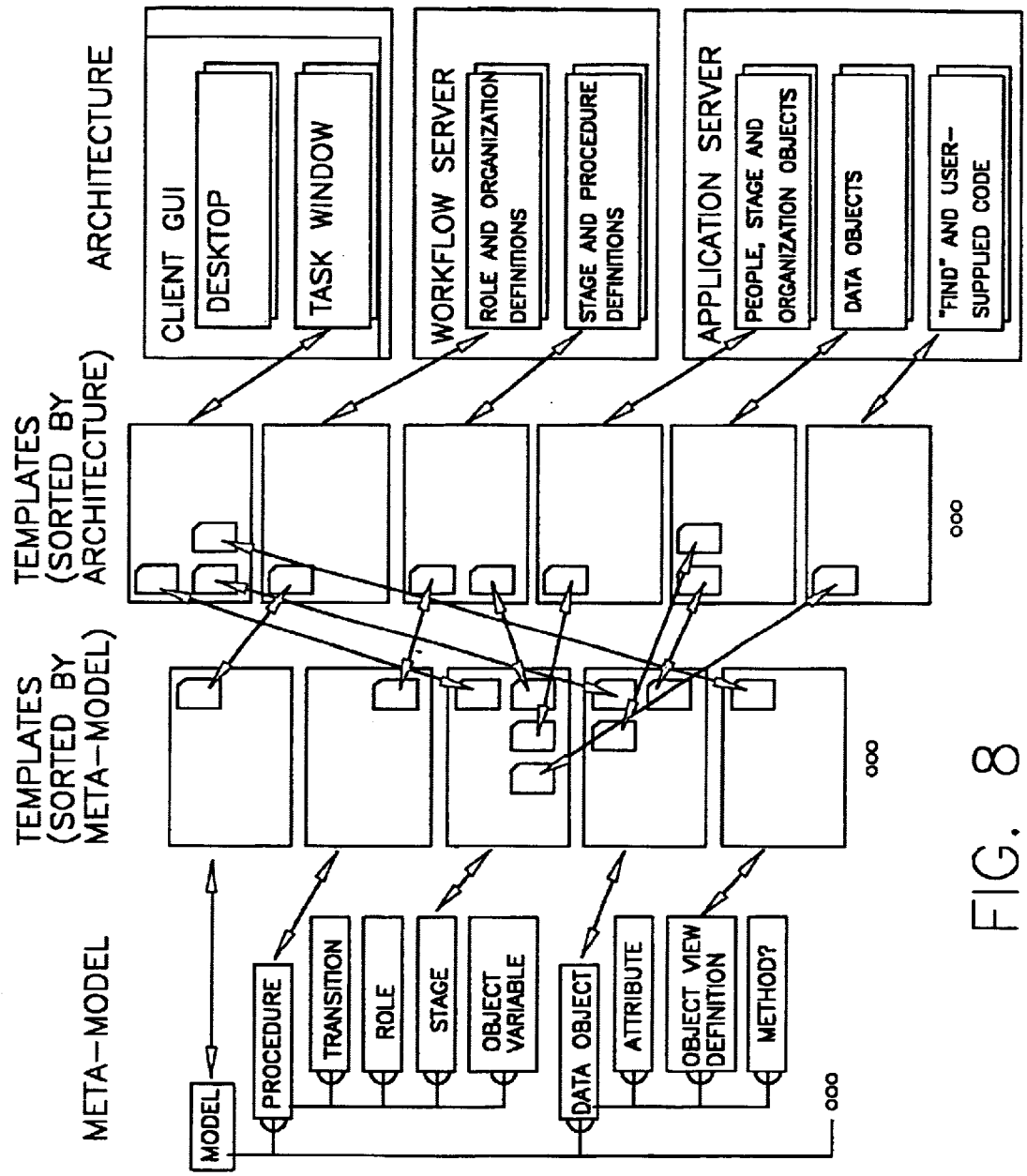
FIG. 8 is a pictorial illustration of an exemplary set of templates, an exemplary architecture, and an meta-model used in generating an enterprise application according to the methodology of the present invention.

As illustrated in FIG. 8, templates can also be thought of from the point of view of the meta-model that governs the models that can be recorded within the invention's software tool. The same set of templates can be sorted or grouped not only according to what part of the architecture they will apply (the right-hand template sorting), but also by what meta-model element they are primarily associated with.

A meta-model is a model of the typical kinds of element of a model. The meta-model of the present invention necessarily includes actors, actions and acted upons, or elements that correspond to these three things. As shown in FIG. 8, the meta-model of the preferred embodiment represents procedures (and their transitions, roles, stages, object variables, and so on), data objects (and their attributes, object view definitions, methods, and so on), and other kinds of elements of a model.

From the meta-model perspective (the left half of the diagram), the template presented above (and highlighted in the diagram) can be seen as a template associated with data objects. The generated application must contain one program fragment generated from this template for each data object of the model (in the example of Section 2, the data objects include APAR objects, problemRecords and customerRecords). From this perspective, the code generation process can be seen as examining a model, and for each element (for example, a given data object) generating a program fragment using each program template associated with that kind of model element.

Figure 9:
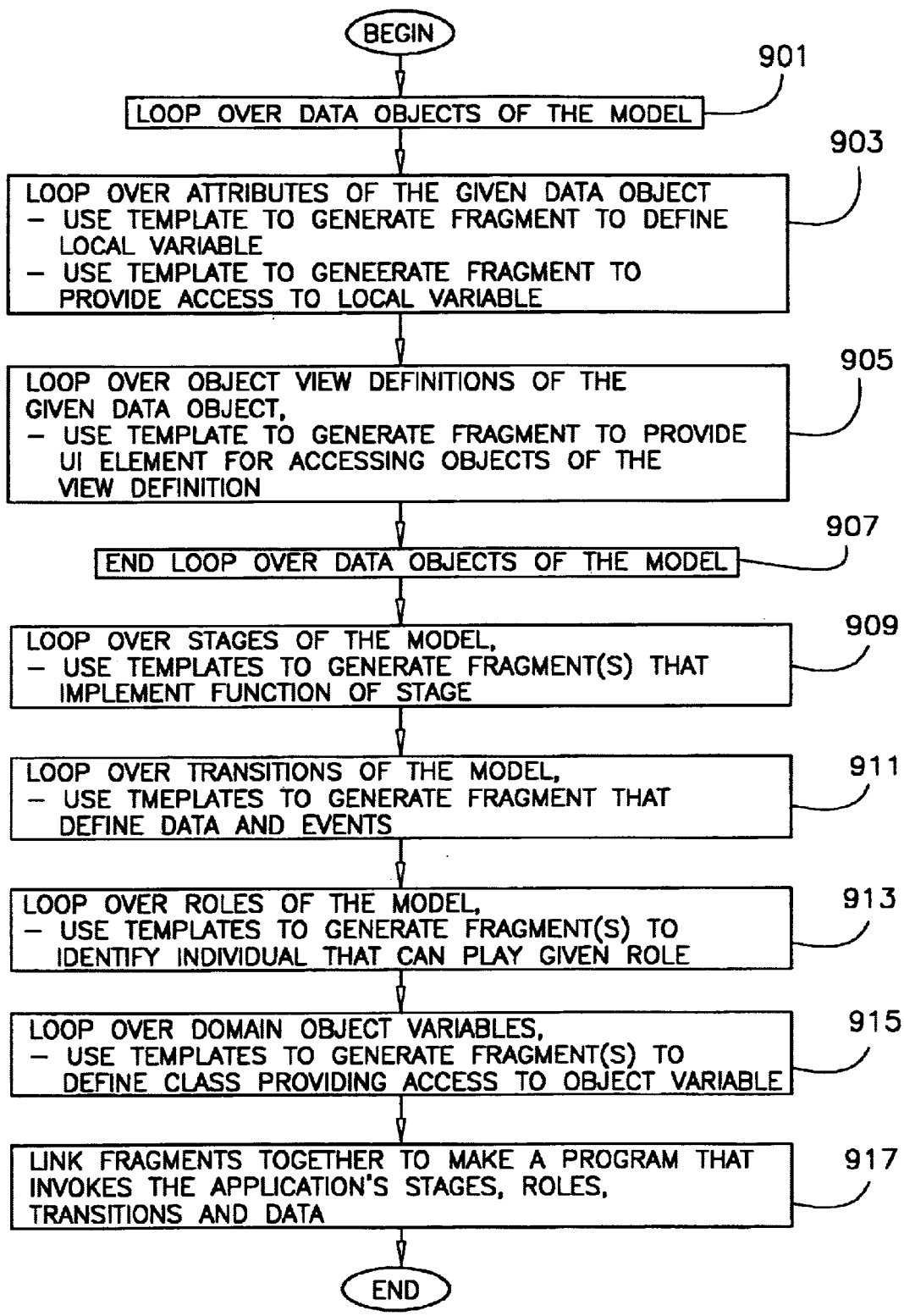
FIG. 9 is a flow chart illustrating an exemplary code generation process for generating program fragments that embody a given enterprise application.

FIG. 9 is a flow chart illustrating an exemplary code generation process according to the present invention. In steps 901–907, a loop is performed over the data objects of the model. For a given data object, steps 903–905 are performed. In step 903, a loop is performed over the attributes of the given data object, wherein for each attribute, appropriate templates are used to generate one or more program fragments that i) define a local variable representing the attribute, and ii) provide access (read method/write method) to the local variable; and the resultant program fragments are stored for subsequent use. In step 905, a loop is performed over the object view definitions of the given data object, wherein for each object view definition, appropriate templates are used to generate a program fragment that provides a user interface element capable of accessing the data objects of the object view definition; and the resultant program fragments are stored for subsequent use. In step 909, a loop is performed over the stages of the model, wherein for a given stage, appropriate templates are used to generate one or more program fragments that implement the functions of the stage (that are independent of role) taking into account information (such as conditions, names, events, etc.) from the transitions into and out of the given stage; and the resultant program fragments are stored for subsequent use. In step 911, a loop is performed over the transitions of the model, wherein for a given transition, appropriate templates are used to generate one or more program fragments that define the data and events communicated between the stages of the process; and the resultant program fragments are stored for subsequent use. In step 913, a loop is performed over the roles of the model, wherein for a given role, appropriate templates are used to generate one or more program fragments to identify an individual (or class of individuals) that can play the given role; and the resultant program fragments are stored for subsequent use. In step 915, a loop is performed over the domain object variables of the model, wherein for a given domain object variable, appropriate templates are used to generate one or more program fragments that define a class providing access to the given domain object variable; and the resultant program fragments are stored for subsequent use. Finally, in step 917, the resultant program fragments are linked together to make a program that invokes the application's stages, roles, transitions and data to thereby execute the enterprise process represented by the model, and the code generation process ends.

3.2. How a Template set for a Wide Variety of Applications is Produced From a Single Software System In principle, a template set is produced by abstraction from a carefully designed example system. Thus, a template set may be constructed as follows:

a set of enabling software and hardware technologies is selected a sample program applying these technologies and containing all desired kinds of feature is carefully built and tested by an expert programmer each kind of program fragment in the sample application is generalized to produce a corresponding template a corresponding generation coordinator program is written, which ensures that all necessary program fragments are generated for each element of the model.

In practice, a template is grown, over time, from a small working nucleus, as it is enriched to support further kinds of feature. Each new feature (for example, an ability to "drag" a value from a field in one form and "drop" it into a field in another form) is first programmed as an extension to a previously generated program so that its correctness can be tested in situ. The new feature is then incorporated into the template set, as some combination of extensions to some existing templates, and entirely new templates. The Generation Coordination Program is then updated to apply the new templates.

Thus incrementally, over time, a rich template set and corresponding Generation Coordination Program are built, sufficient to generate a wide variety of applications.

3.3. The Effect of Including Alternative Template Sets is to Allow the User to Select a Set of Software and Hardware Components for Which a Software Application Will be Generated The specific set of technologies that are applied to produce an enterprise application varies depending upon which organization that will use the application, and when it is developed.

Since the model (presented in section 2) of an enterprise process described to the tool is technology independent, it is possible to produce a program template set for each of a variety of such technology configurations.

Typically the program required to exercise one technology configuration will not work for a different technology configuration. This may be true not only for technology products from different suppliers, but also for different versions of a single product from a single supplier.

Each configuration of technology versions requires a dedicated architecture and thus a dedicated set of program generation templates. The tool may support one or more such template sets and thereby more than one application architecture and technology configuration. An application developer may be given a means for choosing one of the supported templates sets. Depending upon the number and nature of supported template sets, the application developer choosing a template set may be presented with a more or less sophisticated template selection mechanism. Examples include:

when there are a small number of supported template sets, the alternative sets may be presented as a simple list of monolithic wholes when there are a large number of supported template sets, or when those templates are parameterized, the template sets may themselves be somewhat modular, allowing a template set to be assembled based on a set of selection criteria (for example, what database technology should be used).

It is customary to characterize a template set in terms of the technologies that it is able to exercise.

The preferred embodiment supports a small number of alternative template sets, each of which corresponds to a different choice of enabling technologies:

"traditional workflow"—an architecture dominated by a commercially available workflow engine "non-traditional workflow"—an architecture dominated by a research prototype that offers an alternative to traditional workflow engines "simulation engine"—an architecture intended to run on a single, portable computer, and to be used for demonstration purposes only.

Given the small number of alternative configurations supported by the preferred embodiment, the choice between them is made available as separate buttons in a code generation window.

Sample generated program fragments resulting from the application of the methodology of the present invention for the Call Center process as described in Section 2 is set forth in Appendix A.

While preferred embodiments of the invention have been shown and described herein, it will be understood that such embodiments are provided by way of example only. Numerous variations, changes, and substitutions will be apparent to those skilled in the art without departing from the spirit of the invention. Accordingly, it is intended that the appended claims cover all such variations as fall within the spirit and scope of the invention.

Appendix A

An example of the results of the code generation operations of the present invention for the Call Center process described in Section 2 is now set forth. The following code files illustrate the variety of code that can be generated, but is just a subset of the code that is generated for the CallCenter example. Only one file of each kind that is generated is included -- for example, we see the various code files created specifically for a CustomerRecord object, but not for ProblemRecord and APAR objects.

The following files are created for the CustomerRecord object:

File: makeCustomerRecordJar.bat

```
jar cvfm0 CustomerRecord.jar inputManifestForCustomerRecord.txt
ebPackage\CustomerRecord.class ebPackage\CustomerRecordB.class
ebPackage\CustomerRecordHome.class ebPackage\CustomerRecordKey.class
ebPackage\CustomerRecordBFinderHelper.class ebPackage\Viewable.class
ebPackage\Revel.class
```

File: CustomerRecord.java

```java
// CustomerRecord.java interface for an EJB Object package ebPackage;

import java.util.*;
import javax.ejb.EJBObject;
import java.rmi.RemoteException;

public interface CustomerRecord extends EJBObject, Viewable {

// getters and setters for the objects attributes

String getCustomerId() throws RemoteException;
    void setCustomerId(String newValue) throws RemoteException;

String getCustomerName() throws RemoteException;
    void setCustomerName(String newValue) throws RemoteException;

String getCustomerAddress() throws RemoteException;
    void setCustomerAddress(String newValue) throws RemoteException;

String getContractNumber() throws RemoteException;
```

- 1 -

```
            void setContractNumber(String newValue) throws RemoteException;

public String displayName() throws RemoteException;
        public String getInstanceId() throws RemoteException;
        public boolean matches(String pattern, String qualifier) throws
RemoteException;
            public interface Creator {
                    public Viewable createThing() throws RemoteException;
            }

}
```

File: CustomerRecord.xml

```xml
<?xml version='1.0'?>
<!DOCTYPE ejb-jars SYSTEM "JetDTD.dtd">

<ejb-jars>

<ejb-jar>

<input-file>E:\WebSphere\Appserver\eb\EJBDeveloper\CustomerRecord.jar</input-file>
<output-file>E:\WebSphere\Appserver\deployableEJBs\CustomerRecord.jar</output-file>

<entity-bean>
<primary-key-class>ebPackage.CustomerRecordKey</primary-key-class>
<re-entrant value="false" />
<container-managed-field>primaryKey</container-managed-field>
<container-managed-field>customerId</container-managed-field>
<container-managed-field>customerName</container-managed-field>
<container-managed-field>customerAddress</container-managed-field>
<container-managed-field>contractNumber</container-managed-field>
</entity-bean>

<JNDI-name>CustomerRecordHome</JNDI-name>
<enterprise-bean-class>ebPackage.CustomerRecordB</enterprise-bean-class>
<remote-interface-class>ebPackage.CustomerRecord</remote-interface-class>
<home-interface-class>ebPackage.CustomerRecordHome</home-interface-class>

<transaction-attribute value="TX_REQUIRED" />
<isolation-level value="SERIALIZABLE" />
<run-as-mode value="CLIENT_IDENTITY" />
```

```
<dependency>
<on>ebPackage/CustomerRecord.class</on>
<on>ebPackage/CustomerRecordHome.class</on>
<on>ebPackage/CustomerRecordKey.class</on>
</dependency>

</ejb-jar>

</ejb-jars>
```

File: CustomerRecordB.java

```java
// CustomerRecordB.java implementation of interface for an EJB Object and
Entity Bean package ebPackage;

import javax.ejb.EntityBean;
import javax.ejb.EntityContext;
import java.rmi.RemoteException;
import java.rmi.*;
import java.util.*;
import javax.naming.*;
import javax.ejb.*;

public class CustomerRecordB implements javax.ejb.EntityBean,
java.io.Serializable {

// instance variables
        private EntityContext entityContext;

// container managed fields must be PUBLIC instance variables in
webSphere
        // nobody else likes it either
        public String primaryKey;
        public String customerId;
        public String customerName;
        public String customerAddress;
        public String contractNumber;

// constructor for bean
        public CustomerRecordB(){
                Revel.howl("CustomerRecordB null constructor started");
                entityContext=null;
                Revel.howl("CustomerRecordB null constructor ended");
```

```
}

// methods to make this object a "Viewable" object
public String displayName(){
        return (primaryKey+":"+customerId+":"+customerName);
}
public String getInstanceId(){
        return primaryKey;
}
public boolean matches(String pattern, String qualifier){
        return true;
}

// interface method implementations public String getCustomerId() {
        return customerId;
} public void setCustomerId(String newValue) {
        customerId=newValue;
} public String getCustomerName() {
        return customerName;
} public void setCustomerName(String newValue) {
        customerName=newValue;
} public String getCustomerAddress() {
        return customerAddress;
} public void setCustomerAddress(String newValue) {
        customerAddress=newValue;
} public String getContractNumber() {
        return contractNumber;
} public void setContractNumber(String newValue) {
        contractNumber=newValue;
```

```
            }

// methods from javax.ejb.EntityBean
      public void ejbCreate(){
            try{
                  Revel.howl("CustomerRecordB.ejbCreate() Started ejbCreate()");
                  Properties p = new Properties();
                  p.put(Context.INITIAL_CONTEXT_FACTORY,
"com.ibm.jndi.CosNaming.CNInitialContextFactory");
                  p.put("java.naming.provider.url","iiop://localhost:9019");
                  InitialContext ic = new InitialContext(p);
                  Object tmpObj = ic.lookup("IdIssuerHome");
                  IdIssuerHome issuerHome =
IdIssuerHomeHelper.narrow((org.omg.CORBA.Object)tmpObj);
                  IdIssuer idIssuer = null;
                  try {
                        idIssuer = issuerHome.create("CustomerRecord");
                  } catch (DuplicateKeyException ex) {
                        idIssuer = issuerHome.findByPrimaryKey(new
IdIssuerKey("CustomerRecord"));
                  }
                  primaryKey = idIssuer.getNextId();
                  Revel.howl("CustomerRecordB.ejbCreate() CustomerRecord primaryKey: "+primaryKey);
            } catch(Exception e){
                  Revel.howl("CustomerRecordB.ejbCreate() Exception: "+e);
                  System.out.println("exception in ejbcreate: "+e.getMessage());
            }
            Revel.howl("CustomerRecordB.ejbCreate() Finished ejbCreate()");
      };
      public void ejbCreate(String keyValue){
            Revel.howl("CustomerRecordB.ejbCreate(String keyValue) Started ejbCreate()");
            primaryKey = keyValue;
            Revel.howl("CustomerRecordB.ejbCreate(String keyValue) Ended ejbCreate");
      };
      public void ejbActivate() throws RemoteException {
            Revel.howl("CustomerRecordB.ejbActivate() Called, primaryKey: "+primaryKey);
      };
```

```
            public void ejbPassivate() throws RemoteException {
                    Revel.howl("CustomerRecordB.ejbPassivate() Called, primaryKey:
"+primaryKey);
            };
            public void ejbLoad() throws RemoteException {
                    Revel.howl("CustomerRecordB.ejbLoad() Called, primaryKey:
"+primaryKey);
            };
            public void ejbStore() throws RemoteException {
                    Revel.howl("CustomerRecordB.ejbStore() Called, primaryKey:
"+primaryKey);
            };
            public void ejbPostCreate() throws RemoteException {
                    Revel.howl("CustomerRecordB.ejbPostCreate() Called,
primaryKey: "+primaryKey);
            };
            public void ejbRemove() throws RemoteException {};
            public void setEntityContext(EntityContext ctx) throws RemoteException
    {
                    entityContext=ctx;
            }
            public void unsetEntityContext() throws RemoteException {
                    entityContext=null;
            }

}
File: CustomerRecordBFinderHelper.java

// CustomerRecordBFinderHelper.java interface for EJB finder helpers package ebPackage;

public interface CustomerRecordBFinderHelper {
                    public static final String findAllQueryString = "select * from
    EJB.CustomerRecordBTbl";

}
File: CustomerRecordHome.java

// CustomerRecordHome.java interface for an EJB Object Home package ebPackage;

import javax.ejb.EJBHome;
```

```
import javax.ejb.FinderException;
import java.util.*;

public interface CustomerRecordHome extends EJBHome {

// home interface methods
        public CustomerRecord create()
                throws javax.ejb.CreateException, java.rmi.RemoteException;
        public CustomerRecord create(String keyValue)
                throws javax.ejb.CreateException, java.rmi.RemoteException;
        public CustomerRecord findByPrimaryKey(CustomerRecordKey
primaryKey)
                throws javax.ejb.FinderException, java.rmi.RemoteException;
        public Enumeration findAll() throws javax.ejb.FinderException,
java.rmi.RemoteException;
        // add signatures for user-defined finder methods here

}
```

File: CustomerRecordKey.java

```
        // CustomerRecordKey.java implementation of key class for an EJB Object package ebPackage;

public class CustomerRecordKey implements java.io.Serializable {

// instance variables
                public String primaryKey;

// constructor for key
                public CustomerRecordKey(){
                } public CustomerRecordKey(CustomerRecordB bean){
                        primaryKey = bean.primaryKey;
                }
                public CustomerRecordKey(String keyValue){
                        primaryKey = keyValue;
                } public int hashCode(){
                        return primaryKey.hashCode();
```

```
        }
        public boolean equals(Object o){
            if (o instanceof CustomerRecordKey)
                return
(primaryKey.equals(((CustomerRecordKey)o).primaryKey));
            else
                return false;
        }

}
```

File: CustomerRecordRemoteViewer.java

```
package ebPackage;
// YifJavaSecretViewer(YifJavaSecretClassSpec)>>#javaClassDefinition import java.rmi.*;
// YifJavaSecretViewer(YifJavaSecretClassSpec)>>#javaClassDefinition
import javax.swing.*;
// YifJavaSecretViewer(YifJavaSecretClassSpec)>>#javaClassDefinition
import javax.swing.event.*;
    // YifJavaSecretViewer(YifJavaSecretClassSpec)>>#javaClassDefinition
import java.awt.*;
// YifJavaSecretViewer(YifJavaSecretClassSpec)>>#javaClassDefinition
import java.awt.event.*;
// YifJavaSecretViewer(YifJavaSecretClassSpec)>>#javaClassDefinition
import javax.swing.plaf.*;
   // YifJavaSecretViewer(YifJavaSecretClassSpec)>>#javaClassDefinition
import javax.swing.border.*;
    // YifJavaSecretViewer(YifJavaSecretClassSpec)>>#javaClassDefinition
import java.util.*;                                                    //
YifJavaSecretViewer(YifJavaSecretClassSpec)>>#javaClassDefinition public class CustomerRecordRemoteViewer {
        //
YifJavaSecretViewer(YifJavaSecretClassSpec)>>#javaClassDefinition
//// no instance variables
//
YifJavaSecretViewer(YifJavaSecretClassSpec)>>#javaInstanceVariableDefinitio
ns
```

```
public static Edit makeEdit (boolean makeControls) {
        //
YifJavaSecretViewer(YifJavaSecretClassSpec)>>#javaMethodDefinitions
return (new CustomerRecordRemoteViewer()).makeEdit2(makeControls);
                //
YifJavaSecretViewer>>#javaCompileStaticCreatorFor:
} // (end makeEdit)
// YifJavaSecretViewer(YifJavaSecretClassSpec)>>#javaMethodDefinitions private Edit makeEdit2 (boolean makeControls) {
        //
YifJavaSecretViewer(YifJavaSecretClassSpec)>>#javaMethodDefinitions
return new Edit(makeControls);
     // YifJavaSecretViewer>>#javaCompileStaticCreatorFor:
} // (end makeEdit2)
// YifJavaSecretViewer(YifJavaSecretClassSpec)>>#javaMethodDefinitions public static Null makeNull (boolean makeControls) {
        //
YifJavaSecretViewer(YifJavaSecretClassSpec)>>#javaMethodDefinitions
return (new CustomerRecordRemoteViewer()).makeNull2(makeControls);
                //
YifJavaSecretViewer>>#javaCompileStaticCreatorFor:
} // (end makeNull)
// YifJavaSecretViewer(YifJavaSecretClassSpec)>>#javaMethodDefinitions private Null makeNull2 (boolean makeControls) {
        //
YifJavaSecretViewer(YifJavaSecretClassSpec)>>#javaMethodDefinitions
return new Null(makeControls);
     // YifJavaSecretViewer>>#javaCompileStaticCreatorFor:
} // (end makeNull2)
// YifJavaSecretViewer(YifJavaSecretClassSpec)>>#javaMethodDefinitions public static Read makeRead (boolean makeControls) {
        //
YifJavaSecretViewer(YifJavaSecretClassSpec)>>#javaMethodDefinitions
return (new CustomerRecordRemoteViewer()).makeRead2(makeControls);
                //
YifJavaSecretViewer>>#javaCompileStaticCreatorFor:
```

```
} // (end makeRead)
// YifJavaSecretViewer(YifJavaSecretClassSpec)>>#javaMethodDefinitions private Read makeRead2 (boolean makeControls) {
            //
YifJavaSecretViewer(YifJavaSecretClassSpec)>>#javaMethodDefinitions
return new Read(makeControls);
     // YifJavaSecretViewer>>#javaCompileStaticCreatorFor:
} // (end makeRead2)
// YifJavaSecretViewer(YifJavaSecretClassSpec)>>#javaMethodDefinitions public class Read extends RemoteViewer {
           // YifJavaInnerClassCode>>#asJava
        private JTextField customerIdEditor;
             // YifJavaSecretViewer>>#javaVariableDefFor:
        private JTextField customerNameEditor;
              // YifJavaSecretViewer>>#javaVariableDefFor:
        private JTextField customerAddressEditor;
               // YifJavaSecretViewer>>#javaVariableDefFor:
        private JTextField contractNumberEditor;
              // YifJavaSecretViewer>>#javaVariableDefFor:
        private CustomerRecord editee;
          // YifJavaSecretViewer>>#javaVarsFor:
public void setEditee(Viewable editee) {
     // YifJavaSecretViewer>>#javaSetEditeeFor:
        Revel.howl("Trying to set editee, and it is " + (editee == null ? "null" :
"not null"));            // YifJavaSecretViewer>>#javaSetEditeeFor:
        this.editee = (CustomerRecord) editee;
             // YifJavaSecretViewer>>#javaSetEditeeFor:
        }//setEditee
    // YifJavaSecretViewer>>#javaSetEditeeFor:
public void putDataIntoUIFields() {
      // YifJavaSecretViewer>>#javaSetEditeeFor:
        // Write the data from (this.editee) into the UI components
                // YifJavaSecretViewer>>#javaSetEditeeFor:
         try {
// YifJavaSecretViewer>>#javaSetEditeeFor:
               customerIdEditor.setText(editee.getCustomerId());
                             //
YifJavaPrimitiveViewStringTextField>>#javaPutDataFieldIntoUI:
              customerNameEditor.setText(editee.getCustomerName());
                             //
YifJavaPrimitiveViewStringTextField>>#javaPutDataFieldIntoUI:
```

```
                customerAddressEditor.setText(editee.getCustomerAddress());
                                    //
YifJavaPrimitiveViewStringTextField>>#javaPutDataFieldIntoUI:
                contractNumberEditor.setText(editee.getContractNumber());
                                    //
YifJavaPrimitiveViewStringTextField>>#javaPutDataFieldIntoUI:
        } catch(Exception re) {
        // YifJavaSecretViewer>>#javaSetEditeeFor:
                System.err.println(" Doom in
CustomerRecordRemoteViewer.Read.putDataIntoUIFields - " + re);
    // YifJavaSecretViewer>>#javaSetEditeeFor:
                }
        // YifJavaSecretViewer>>#javaSetEditeeFor:
        }//putDataIntoUIFields
        // YifJavaSecretViewer>>#javaSetEditeeFor:

public Viewable getEditee() {
    // YifJavaSecretViewer>>#javaGetEditeeFor:
        return this.editee;
    // YifJavaSecretViewer>>#javaGetEditeeFor:
        }//getEditee
    // YifJavaSecretViewer>>#javaGetEditeeFor:
public Read(boolean makeControls) {//constructor
            // YifJavaSecretViewer>>#javaConstructorFor:
        super();                                        //preliminaries
                                    //
YifJavaSecretViewer>>#javaConstructorFor:
                                                //preliminaries
                                    //
YifJavaSecretViewer>>#javaConstructorFor:
        GridBagLayout gbl = new GridBagLayout();
            //preliminaries                     //
YifJavaSecretViewer>>#javaConstructorFor:
        this.setLayout(gbl);
//preliminaries                                 //
YifJavaSecretViewer>>#javaConstructorFor:
        GridBagConstraints gbc = new GridBagConstraints();
                //preliminaries                         //
YifJavaSecretViewer>>#javaConstructorFor:
        gbc.fill = GridBagConstraints.BOTH;
                //preliminaries                         //
YifJavaSecretViewer>>#javaConstructorFor:
                                                //preliminaries
                                    //
YifJavaSecretViewer>>#javaConstructorFor:
```

```java
        Border border = (Border)(new
BorderUIResource.BevelBorderUIResource(javax.swing.border.BevelBorder.RAI
SED));        // YifJavaSecretViewer>>#javaConstructorFor:
        this.setBorder(border);
        // YifJavaSecretViewer>>#javaConstructorFor:

JLabel title_label = new JLabel("CustomerRecord", JLabel.CENTER);
                        // YifJavaSecretViewer>>#javaConstructorFor:
        this.add(title_label);
        // YifJavaSecretViewer>>#javaConstructorFor:

{
// YifJavaSecretViewer>>#javaEditorBuilderForView:attributeViewSpec:n:
        JLabel customerIdEditor_label = new JLabel("customerId:",
JLabel.CENTER);                        //
YifJavaSecretViewer>>#javaEditorBuilderForView:attributeViewSpec:n:
        gbc.weightx = 0.0;
        // YifJavaSecretViewer>>#javaEditorBuilderForView:attributeViewSpec:n:
        gbc.gridy = 1;
        // YifJavaSecretViewer>>#javaEditorBuilderForView:attributeViewSpec:n:
        gbl.setConstraints(customerIdEditor_label, gbc);
                //
YifJavaSecretViewer>>#javaEditorBuilderForView:attributeViewSpec:n:
        this.add(customerIdEditor_label);
                //
YifJavaSecretViewer>>#javaEditorBuilderForView:attributeViewSpec:n:

customerIdEditor = (new JTextField(40));
                //
YifJavaSecretViewer>>#javaEditorBuilderForView:attributeViewSpec:n:
        customerIdEditor.setEditable(false);
                //
YifJavaSecretViewer>>#javaEditorBuilderForView:attributeViewSpec:n:
        gbc.weightx = 1.0;
        // YifJavaSecretViewer>>#javaEditorBuilderForView:attributeViewSpec:n:
        gbl.setConstraints(customerIdEditor, gbc);
                //
YifJavaSecretViewer>>#javaEditorBuilderForView:attributeViewSpec:n:
        this.add(customerIdEditor);
                //
YifJavaSecretViewer>>#javaEditorBuilderForView:attributeViewSpec:n:
        }
// YifJavaSecretViewer>>#javaEditorBuilderForView:attributeViewSpec:n:
```

```
        {
// YifJavaSecretViewer>>#javaEditorBuilderForView:attributeViewSpec:n:
        JLabel customerNameEditor_label = new JLabel("customerName:",
JLabel.CENTER);                    //
YifJavaSecretViewer>>#javaEditorBuilderForView:attributeViewSpec:n:
        gbc.weightx = 0.0;
    // YifJavaSecretViewer>>#javaEditorBuilderForView:attributeViewSpec:n:
        gbc.gridy = 2;
    // YifJavaSecretViewer>>#javaEditorBuilderForView:attributeViewSpec:n:
        gbl.setConstraints(customerNameEditor_label, gbc);
                //
YifJavaSecretViewer>>#javaEditorBuilderForView:attributeViewSpec:n:
        this.add(customerNameEditor_label);
            //
YifJavaSecretViewer>>#javaEditorBuilderForView:attributeViewSpec:n:

customerNameEditor = (new JTextField(40));
                //
YifJavaSecretViewer>>#javaEditorBuilderForView:attributeViewSpec:n:
        customerNameEditor.setEditable(false);
            //
YifJavaSecretViewer>>#javaEditorBuilderForView:attributeViewSpec:n:
        gbc.weightx = 1.0;
    // YifJavaSecretViewer>>#javaEditorBuilderForView:attributeViewSpec:n:
        gbl.setConstraints(customerNameEditor, gbc);
            //
YifJavaSecretViewer>>#javaEditorBuilderForView:attributeViewSpec:n:
        this.add(customerNameEditor);
            //
YifJavaSecretViewer>>#javaEditorBuilderForView:attributeViewSpec:n:
        }
// YifJavaSecretViewer>>#javaEditorBuilderForView:attributeViewSpec:n:

{
// YifJavaSecretViewer>>#javaEditorBuilderForView:attributeViewSpec:n:
        JLabel customerAddressEditor_label = new JLabel("customerAddress:",
JLabel.CENTER);                //
YifJavaSecretViewer>>#javaEditorBuilderForView:attributeViewSpec:n:
        gbc.weightx = 0.0;
    // YifJavaSecretViewer>>#javaEditorBuilderForView:attributeViewSpec:n:
        gbc.gridy = 3;
    // YifJavaSecretViewer>>#javaEditorBuilderForView:attributeViewSpec:n:
        gbl.setConstraints(customerAddressEditor_label, gbc);
                //
YifJavaSecretViewer>>#javaEditorBuilderForView:attributeViewSpec:n:
```

```
            this.add(customerAddressEditor_label);
                //
YifJavaSecretViewer>>#javaEditorBuilderForView:attributeViewSpec:n:

customerAddressEditor = (new JTextField(40));
                //
YifJavaSecretViewer>>#javaEditorBuilderForView:attributeViewSpec:n:
            customerAddressEditor.setEditable(false);
                //
YifJavaSecretViewer>>#javaEditorBuilderForView:attributeViewSpec:n:
            gbc.weightx = 1.0;
                // YifJavaSecretViewer>>#javaEditorBuilderForView:attributeViewSpec:n:
            gbl.setConstraints(customerAddressEditor, gbc);
                //
YifJavaSecretViewer>>#javaEditorBuilderForView:attributeViewSpec:n:
            this.add(customerAddressEditor);
                //
YifJavaSecretViewer>>#javaEditorBuilderForView:attributeViewSpec:n:
        }
// YifJavaSecretViewer>>#javaEditorBuilderForView:attributeViewSpec:n:

{
// YifJavaSecretViewer>>#javaEditorBuilderForView:attributeViewSpec:n:
            JLabel contractNumberEditor_label = new JLabel("contractNumber:",
JLabel.CENTER);              //
YifJavaSecretViewer>>#javaEditorBuilderForView:attributeViewSpec:n:
            gbc.weightx = 0.0;
                // YifJavaSecretViewer>>#javaEditorBuilderForView:attributeViewSpec:n:
            gbc.gridy = 4;
                // YifJavaSecretViewer>>#javaEditorBuilderForView:attributeViewSpec:n:
            gbl.setConstraints(contractNumberEditor_label, gbc);
                    //
YifJavaSecretViewer>>#javaEditorBuilderForView:attributeViewSpec:n:
            this.add(contractNumberEditor_label);
                //
YifJavaSecretViewer>>#javaEditorBuilderForView:attributeViewSpec:n:

contractNumberEditor = (new JTextField(40));
                //
YifJavaSecretViewer>>#javaEditorBuilderForView:attributeViewSpec:n:
            contractNumberEditor.setEditable(false);
                //
YifJavaSecretViewer>>#javaEditorBuilderForView:attributeViewSpec:n:
            gbc.weightx = 1.0;
                // YifJavaSecretViewer>>#javaEditorBuilderForView:attributeViewSpec:n:
```

```
                gbl.setConstraints(contractNumberEditor, gbc);
                        //
YifJavaSecretViewer>>#javaEditorBuilderForView:attributeViewSpec:n:
            this.add(contractNumberEditor);
                //
YifJavaSecretViewer>>#javaEditorBuilderForView:attributeViewSpec:n:
        }
// YifJavaSecretViewer>>#javaEditorBuilderForView:attributeViewSpec:n:

if (makeControls) {
            // YifJavaSecretViewer>>#editorCommandButtonsFrom:view:

JButton cancelButton = new JButton("Cancel");
                    //
YifJavaSecretViewer>>#editorCommandButtonsFrom:view:
                this.add(cancelButton);
                // YifJavaSecretViewer>>#editorCommandButtonsFrom:view:
                cancelButton.addActionListener(
                    // YifJavaSecretViewer>>#editorCommandButtonsFrom:view:
                    new ActionListener() {
                        //
YifJavaSecretViewer>>#editorCommandButtonsFrom:view:
                            public void actionPerformed(ActionEvent ae) {
System.exit(0); }                               //
YifJavaSecretViewer>>#editorCommandButtonsFrom:view:
                            }
                    //
YifJavaSecretViewer>>#editorCommandButtonsFrom:view:
                        );
                // YifJavaSecretViewer>>#editorCommandButtonsFrom:view:

/*Find button goes here*/
            // YifJavaSecretViewer>>#editorCommandButtonsFrom:view:
            JButton saveButton = new JButton("Save");
                    //
YifJavaSecretViewer>>#editorCommandButtonsFrom:view:
                this.add(saveButton);
                // YifJavaSecretViewer>>#editorCommandButtonsFrom:view:
                saveButton.addActionListener
                    // YifJavaSecretViewer>>#editorCommandButtonsFrom:view:
                    (
        // YifJavaSecretViewer>>#editorCommandButtonsFrom:view:
                    new ActionListener() {
                        // YifJavaSecretViewer>>#editorCommandButtonsFrom:view:
```

```
                    public void actionPerformed(ActionEvent ae) {
                            //
YifJavaSecretViewer>>#editorCommandButtonsFrom:view:
                            if (Read.this.editee != null) {
                        // YifJavaSecretViewer>>#editorCommandButtonsFrom:view:
                                Read.this.writeUIToEditee();
                            // YifJavaSecretViewer>>#editorCommandButtonsFrom:view:
                            }
                    // YifJavaSecretViewer>>#editorCommandButtonsFrom:view:
                        }//actionPerformed
                        // YifJavaSecretViewer>>#editorCommandButtonsFrom:view:
                        }
                // YifJavaSecretViewer>>#editorCommandButtonsFrom:view:
                        );
                // YifJavaSecretViewer>>#editorCommandButtonsFrom:view:

} // if(makeControls)
                        //
YifJavaSecretViewer>>#editorCommandButtonsFrom:view:
            }//constructor
        // YifJavaSecretViewer>>#javaConstructorFor:
public void writeUIToEditee() {
        // YifJavaSecretViewer>>#javaWriteUIToEditeeFor:
try{    Read.this.editee.setCustomerId((( (JTextField)
customerIdEditor).getText()));                    //
YifJavaPrimitiveViewStringTextField(YifJavaPrimitiveViewAbstract)>>#javaWr
iteFieldToEditee:attributeViewSpec:view:
        Read.this.editee.setCustomerName((( (JTextField)
customerNameEditor).getText()));                  //
YifJavaPrimitiveViewStringTextField(YifJavaPrimitiveViewAbstract)>>#javaWr
iteFieldToEditee:attributeViewSpec:view:
        Read.this.editee.setCustomerAddress((( (JTextField)
customerAddressEditor).getText()));               //
YifJavaPrimitiveViewStringTextField(YifJavaPrimitiveViewAbstract)>>#javaWr
iteFieldToEditee:attributeViewSpec:view:
        Read.this.editee.setContractNumber((( (JTextField)
contractNumberEditor).getText()));                //
YifJavaPrimitiveViewStringTextField(YifJavaPrimitiveViewAbstract)>>#javaWr
iteFieldToEditee:attributeViewSpec:view:
        } catch(RemoteException re) {
            // YifJavaSecretViewer>>#javaWriteUIToEditeeFor:
            Revel.howl("trouble in writeUIToEditee() - " + re);
                // YifJavaSecretViewer>>#javaWriteUIToEditeeFor:
            re.printStackTrace();
        // YifJavaSecretViewer>>#javaWriteUIToEditeeFor:
```

```
            }
        // YifJavaSecretViewer>>#javaWriteUIToEditeeFor:

}/*writeUIToEditee*/
    // YifJavaSecretViewer>>#javaWriteUIToEditeeFor:
}//Read                                                                 //
YifJavaInnerClassCode>>#asJava public class Null extends RemoteViewer {
        // YifJavaInnerClassCode>>#asJava private CustomerRecord editee;
            // YifJavaSecretViewer>>#javaVarsFor:
public void setEditee(Viewable editee) {
        // YifJavaSecretViewer>>#javaSetEditeeFor:
        Revel.howl("Trying to set editee, and it is " + (editee == null ? "null" :
"not null"));               // YifJavaSecretViewer>>#javaSetEditeeFor:
        this.editee = (CustomerRecord) editee;
            // YifJavaSecretViewer>>#javaSetEditeeFor:
        }//setEditee
    // YifJavaSecretViewer>>#javaSetEditeeFor:
public void putDataIntoUIFields() {
        // YifJavaSecretViewer>>#javaSetEditeeFor:
        // Write the data from (this.editee) into the UI components
                // YifJavaSecretViewer>>#javaSetEditeeFor:
        try {
// YifJavaSecretViewer>>#javaSetEditeeFor:

} catch(Exception re) {
            // YifJavaSecretViewer>>#javaSetEditeeFor:
            System.err.println(" Doom in
CustomerRecordRemoteViewer.Null.putDataIntoUIFields - " + re);
    // YifJavaSecretViewer>>#javaSetEditeeFor:
                }
        // YifJavaSecretViewer>>#javaSetEditeeFor:
        }//putDataIntoUIFields
            // YifJavaSecretViewer>>#javaSetEditeeFor:

public Viewable getEditee() {
    // YifJavaSecretViewer>>#javaGetEditeeFor:
        return this.editee;
    // YifJavaSecretViewer>>#javaGetEditeeFor:
```

```
        }//getEditee
    // YifJavaSecretViewer>>#javaGetEditeeFor:
public Null(boolean makeControls) {//constructor
            // YifJavaSecretViewer>>#javaConstructorFor:
        super();                                            //preliminaries
                                            //
YifJavaSecretViewer>>#javaConstructorFor:
                                                //preliminaries
                                            //
YifJavaSecretViewer>>#javaConstructorFor:
        GridBagLayout gbl = new GridBagLayout();
            //preliminaries                           //
YifJavaSecretViewer>>#javaConstructorFor:
        this.setLayout(gbl);
//preliminaries                                 //
YifJavaSecretViewer>>#javaConstructorFor:
        GridBagConstraints gbc = new GridBagConstraints();
                            //preliminaries              //
YifJavaSecretViewer>>#javaConstructorFor:
        gbc.fill = GridBagConstraints.BOTH;
            //preliminaries                           //
YifJavaSecretViewer>>#javaConstructorFor:
                                                //preliminaries
                                            //
YifJavaSecretViewer>>#javaConstructorFor:
        Border border = (Border)(new
BorderUIResource.BevelBorderUIResource(javax.swing.border.BevelBorder.RAI
SED));      // YifJavaSecretViewer>>#javaConstructorFor:
        this.setBorder(border);
    // YifJavaSecretViewer>>#javaConstructorFor:

JLabel title_label = new JLabel("CustomerRecord", JLabel.CENTER);
                    // YifJavaSecretViewer>>#javaConstructorFor:
        this.add(title_label);
    // YifJavaSecretViewer>>#javaConstructorFor:

if (makeControls) {
            // YifJavaSecretViewer>>#editorCommandButtonsFrom:view:

JButton cancelButton = new JButton("Cancel");
                    //
YifJavaSecretViewer>>#editorCommandButtonsFrom:view:
```

```
                    this.add(cancelButton);
                    // YifJavaSecretViewer>>#editorCommandButtonsFrom:view:
                    cancelButton.addActionListener(
                            // YifJavaSecretViewer>>#editorCommandButtonsFrom:view:
                                new ActionListener() {
                                    //
YifJavaSecretViewer>>#editorCommandButtonsFrom:view:
                                    public void actionPerformed(ActionEvent ae) {
System.exit(0); }                                           //
YifJavaSecretViewer>>#editorCommandButtonsFrom:view:
                                    }
                            //
YifJavaSecretViewer>>#editorCommandButtonsFrom:view:
                            );
                    // YifJavaSecretViewer>>#editorCommandButtonsFrom:view:

/*Find button goes here*/
                    // YifJavaSecretViewer>>#editorCommandButtonsFrom:view:
                    JButton saveButton = new JButton("Save");
                            //
YifJavaSecretViewer>>#editorCommandButtonsFrom:view:
                    this.add(saveButton);
                    // YifJavaSecretViewer>>#editorCommandButtonsFrom:view:
                    saveButton.addActionListener
                            // YifJavaSecretViewer>>#editorCommandButtonsFrom:view:
                            (
        // YifJavaSecretViewer>>#editorCommandButtonsFrom:view:
                                new ActionListener() {
                                    // YifJavaSecretViewer>>#editorCommandButtonsFrom:view:
                                    public void actionPerformed(ActionEvent ae) {
                                        //
YifJavaSecretViewer>>#editorCommandButtonsFrom:view:
                                        if (Null.this.editee != null) {
                                            // YifJavaSecretViewer>>#editorCommandButtonsFrom:view:
                                                Null.this.writeUIToEditee();
                                            // YifJavaSecretViewer>>#editorCommandButtonsFrom:view:
                                        }
                            // YifJavaSecretViewer>>#editorCommandButtonsFrom:view:
                                    }//actionPerformed
                            // YifJavaSecretViewer>>#editorCommandButtonsFrom:view:
                                }
                    // YifJavaSecretViewer>>#editorCommandButtonsFrom:view:
                            );
                    // YifJavaSecretViewer>>#editorCommandButtonsFrom:view:
```

```
            } // if(makeControls)
              //
YifJavaSecretViewer>>#editorCommandButtonsFrom:view:
        }//constructor
    // YifJavaSecretViewer>>#javaConstructorFor:
public void writeUIToEditee() {
    // YifJavaSecretViewer>>#javaWriteUIToEditeeFor:

}/*writeUIToEditee*/
  // YifJavaSecretViewer>>#javaWriteUIToEditeeFor:
}//Null                                                        //
YifJavaInnerClassCode>>#asJava public class Edit extends RemoteViewer {
        // YifJavaInnerClassCode>>#asJava
        private JTextField customerIdEditor;
            // YifJavaSecretViewer>>#javaVariableDefFor:
        private JTextField customerNameEditor;
            // YifJavaSecretViewer>>#javaVariableDefFor:
        private JTextField customerAddressEditor;
            // YifJavaSecretViewer>>#javaVariableDefFor:
        private JTextField contractNumberEditor;
            // YifJavaSecretViewer>>#javaVariableDefFor:
        private CustomerRecord editee;
           // YifJavaSecretViewer>>#javaVarsFor:
public void setEditee(Viewable editee) {
    // YifJavaSecretViewer>>#javaSetEditeeFor:
       Revel.howl("Trying to set editee, and it is " + (editee == null ? "null" :
"not null"));              // YifJavaSecretViewer>>#javaSetEditeeFor:
       this.editee = (CustomerRecord) editee;
           // YifJavaSecretViewer>>#javaSetEditeeFor:
      }//setEditee
    // YifJavaSecretViewer>>#javaSetEditeeFor:
public void putDataIntoUIFields() {
       // YifJavaSecretViewer>>#javaSetEditeeFor:
       // Write the data from (this.editee) into the UI components
              // YifJavaSecretViewer>>#javaSetEditeeFor:
         try {
// YifJavaSecretViewer>>#javaSetEditeeFor:
                customerIdEditor.setText(editee.getCustomerId());
                        //
YifJavaPrimitiveViewStringTextField>>#javaPutDataFieldIntoUI:
                customerNameEditor.setText(editee.getCustomerName());
                        //
YifJavaPrimitiveViewStringTextField>>#javaPutDataFieldIntoUI:
```

```
                customerAddressEditor.setText(editee.getCustomerAddress());
                                        //
YifJavaPrimitiveViewStringTextField>>#javaPutDataFieldIntoUI:
                contractNumberEditor.setText(editee.getContractNumber());
                                        //
YifJavaPrimitiveViewStringTextField>>#javaPutDataFieldIntoUI:
        } catch(Exception re) {
        // YifJavaSecretViewer>>#javaSetEditeeFor:
                System.err.println(" Doom in
CustomerRecordRemoteViewer.Edit.putDataIntoUIFields - " + re);
    // YifJavaSecretViewer>>#javaSetEditeeFor:
                }
    // YifJavaSecretViewer>>#javaSetEditeeFor:
        }//putDataIntoUIFields
        // YifJavaSecretViewer>>#javaSetEditeeFor:

public Viewable getEditee() {
    // YifJavaSecretViewer>>#javaGetEditeeFor:
        return this.editee;
    // YifJavaSecretViewer>>#javaGetEditeeFor:
        }//getEditee
    // YifJavaSecretViewer>>#javaGetEditeeFor:
public Edit(boolean makeControls) {//constructor
        // YifJavaSecretViewer>>#javaConstructorFor:
        super();                                                //preliminaries
                                        //
YifJavaSecretViewer>>#javaConstructorFor:
                                                        //preliminaries
                                        //
YifJavaSecretViewer>>#javaConstructorFor:
        GridBagLayout gbl = new GridBagLayout();
                //preliminaries                                 //
YifJavaSecretViewer>>#javaConstructorFor:
        this.setLayout(gbl);
//preliminaries                                                  //
YifJavaSecretViewer>>#javaConstructorFor:
        GridBagConstraints gbc = new GridBagConstraints();
                        //preliminaries                         //
YifJavaSecretViewer>>#javaConstructorFor:
        gbc.fill = GridBagConstraints.BOTH;
                //preliminaries                                 //
YifJavaSecretViewer>>#javaConstructorFor:
                                                        //preliminaries
                                        //
YifJavaSecretViewer>>#javaConstructorFor:
```

```java
        Border border = (Border)(new
BorderUIResource.BevelBorderUIResource(javax.swing.border.BevelBorder.RAI
SED));       // YifJavaSecretViewer>>#javaConstructorFor:
        this.setBorder(border);
    // YifJavaSecretViewer>>#javaConstructorFor:

JLabel title_label = new JLabel("CustomerRecord", JLabel.CENTER);
                        // YifJavaSecretViewer>>#javaConstructorFor:
        this.add(title_label);
    // YifJavaSecretViewer>>#javaConstructorFor:

{
// YifJavaSecretViewer>>#javaEditorBuilderForView:attributeViewSpec:n:
        JLabel customerIdEditor_label = new JLabel("customerId:",
JLabel.CENTER);                          //
YifJavaSecretViewer>>#javaEditorBuilderForView:attributeViewSpec:n:
        gbc.weightx = 0.0;
        // YifJavaSecretViewer>>#javaEditorBuilderForView:attributeViewSpec:n:
        gbc.gridy = 1;
    // YifJavaSecretViewer>>#javaEditorBuilderForView:attributeViewSpec:n:
        gbl.setConstraints(customerIdEditor_label, gbc);
            //
YifJavaSecretViewer>>#javaEditorBuilderForView:attributeViewSpec:n:
        this.add(customerIdEditor_label);
            //
YifJavaSecretViewer>>#javaEditorBuilderForView:attributeViewSpec:n:

customerIdEditor = (new JTextField(40));
            //
YifJavaSecretViewer>>#javaEditorBuilderForView:attributeViewSpec:n:

gbc.weightx = 1.0;
        // YifJavaSecretViewer>>#javaEditorBuilderForView:attributeViewSpec:n:
        gbl.setConstraints(customerIdEditor, gbc);
            //
YifJavaSecretViewer>>#javaEditorBuilderForView:attributeViewSpec:n:
        this.add(customerIdEditor);
            //
YifJavaSecretViewer>>#javaEditorBuilderForView:attributeViewSpec:n:
        }
    // YifJavaSecretViewer>>#javaEditorBuilderForView:attributeViewSpec:n:

{
    // YifJavaSecretViewer>>#javaEditorBuilderForView:attributeViewSpec:n:
```

```
        JLabel customerNameEditor_label = new JLabel("customerName:",
JLabel.CENTER);                            //
YifJavaSecretViewer>>#javaEditorBuilderForView:attributeViewSpec:n:
        gbc.weightx = 0.0;
            // YifJavaSecretViewer>>#javaEditorBuilderForView:attributeViewSpec:n:
        gbc.gridy = 2;
        // YifJavaSecretViewer>>#javaEditorBuilderForView:attributeViewSpec:n:
        gbl.setConstraints(customerNameEditor_label, gbc);
                    //
YifJavaSecretViewer>>#javaEditorBuilderForView:attributeViewSpec:n:
        this.add(customerNameEditor_label);
            //
YifJavaSecretViewer>>#javaEditorBuilderForView:attributeViewSpec:n:

customerNameEditor = (new JTextField(40));
                //
YifJavaSecretViewer>>#javaEditorBuilderForView:attributeViewSpec:n:

gbc.weightx = 1.0;
        // YifJavaSecretViewer>>#javaEditorBuilderForView:attributeViewSpec:n:
        gbl.setConstraints(customerNameEditor, gbc);
                //
YifJavaSecretViewer>>#javaEditorBuilderForView:attributeViewSpec:n:
        this.add(customerNameEditor);
            //
YifJavaSecretViewer>>#javaEditorBuilderForView:attributeViewSpec:n:
        }
// YifJavaSecretViewer>>#javaEditorBuilderForView:attributeViewSpec:n:

{
// YifJavaSecretViewer>>#javaEditorBuilderForView:attributeViewSpec:n:
        JLabel customerAddressEditor_label = new JLabel("customerAddress:",
JLabel.CENTER);                            //
YifJavaSecretViewer>>#javaEditorBuilderForView:attributeViewSpec:n:
        gbc.weightx = 0.0;
            // YifJavaSecretViewer>>#javaEditorBuilderForView:attributeViewSpec:n:
        gbc.gridy = 3;
        // YifJavaSecretViewer>>#javaEditorBuilderForView:attributeViewSpec:n:
        gbl.setConstraints(customerAddressEditor_label, gbc);
                    //
YifJavaSecretViewer>>#javaEditorBuilderForView:attributeViewSpec:n:
        this.add(customerAddressEditor_label);
            //
YifJavaSecretViewer>>#javaEditorBuilderForView:attributeViewSpec:n:
```

```
            customerAddressEditor = (new JTextField(40));
                //
YifJavaSecretViewer>>#javaEditorBuilderForView:attributeViewSpec:n:

gbc.weightx = 1.0;
            // YifJavaSecretViewer>>#javaEditorBuilderForView:attributeViewSpec:n:
            gbl.setConstraints(customerAddressEditor, gbc);
                //
YifJavaSecretViewer>>#javaEditorBuilderForView:attributeViewSpec:n:
            this.add(customerAddressEditor);
                //
YifJavaSecretViewer>>#javaEditorBuilderForView:attributeViewSpec:n:
            }
// YifJavaSecretViewer>>#javaEditorBuilderForView:attributeViewSpec:n:

{
// YifJavaSecretViewer>>#javaEditorBuilderForView:attributeViewSpec:n:
            JLabel contractNumberEditor_label = new JLabel("contractNumber:",
JLabel.CENTER);                //
YifJavaSecretViewer>>#javaEditorBuilderForView:attributeViewSpec:n:
            gbc.weightx = 0.0;
            // YifJavaSecretViewer>>#javaEditorBuilderForView:attributeViewSpec:n:
            gbc.gridy = 4;
            // YifJavaSecretViewer>>#javaEditorBuilderForView:attributeViewSpec:n:
            gbl.setConstraints(contractNumberEditor_label, gbc);
                //
YifJavaSecretViewer>>#javaEditorBuilderForView:attributeViewSpec:n:
            this.add(contractNumberEditor_label);
                //
YifJavaSecretViewer>>#javaEditorBuilderForView:attributeViewSpec:n:

contractNumberEditor = (new JTextField(40));
                //
YifJavaSecretViewer>>#javaEditorBuilderForView:attributeViewSpec:n:

gbc.weightx = 1.0;
            // YifJavaSecretViewer>>#javaEditorBuilderForView:attributeViewSpec:n:
            gbl.setConstraints(contractNumberEditor, gbc);
                //
YifJavaSecretViewer>>#javaEditorBuilderForView:attributeViewSpec:n:
            this.add(contractNumberEditor);
                //
YifJavaSecretViewer>>#javaEditorBuilderForView:attributeViewSpec:n:
            }
// YifJavaSecretViewer>>#javaEditorBuilderForView:attributeViewSpec:n:
```

```
                    if (makeControls) {
                    // YifJavaSecretViewer>>#editorCommandButtonsFrom:view:

JButton cancelButton = new JButton("Cancel");
                            //
YifJavaSecretViewer>>#editorCommandButtonsFrom:view:
            this.add(cancelButton);
            // YifJavaSecretViewer>>#editorCommandButtonsFrom:view:
            cancelButton.addActionListener(
                    // YifJavaSecretViewer>>#editorCommandButtonsFrom:view:
                    new ActionListener() {
                            //
YifJavaSecretViewer>>#editorCommandButtonsFrom:view:
                                public void actionPerformed(ActionEvent ae) {
System.exit(0); }                                       //
YifJavaSecretViewer>>#editorCommandButtonsFrom:view:
                                }
                    //
YifJavaSecretViewer>>#editorCommandButtonsFrom:view:
                            );
                    // YifJavaSecretViewer>>#editorCommandButtonsFrom:view:

/*Find button goes here*/
                    // YifJavaSecretViewer>>#editorCommandButtonsFrom:view:
                    JButton saveButton = new JButton("Save");
                            //
YifJavaSecretViewer>>#editorCommandButtonsFrom:view:
            this.add(saveButton);
            // YifJavaSecretViewer>>#editorCommandButtonsFrom:view:
            saveButton.addActionListener
                    // YifJavaSecretViewer>>#editorCommandButtonsFrom:view:
                    (
    // YifJavaSecretViewer>>#editorCommandButtonsFrom:view:
                    new ActionListener() {
                    // YifJavaSecretViewer>>#editorCommandButtonsFrom:view:
                        public void actionPerformed(ActionEvent ae) {
                            //
YifJavaSecretViewer>>#editorCommandButtonsFrom:view:
                            if (Edit.this.editee != null) {
                            // YifJavaSecretViewer>>#editorCommandButtonsFrom:view:
                                Edit.this.writeUIToEditee();
                                // YifJavaSecretViewer>>#editorCommandButtonsFrom:view:
```

```
                    }
// YifJavaSecretViewer>>#editorCommandButtonsFrom:view:
            }//actionPerformed
        // YifJavaSecretViewer>>#editorCommandButtonsFrom:view:
            }
// YifJavaSecretViewer>>#editorCommandButtonsFrom:view:
            );
// YifJavaSecretViewer>>#editorCommandButtonsFrom:view:

} // if(makeControls)
        //
YifJavaSecretViewer>>#editorCommandButtonsFrom:view:
        }//constructor
    // YifJavaSecretViewer>>#javaConstructorFor:
public void writeUIToEditee() {
    // YifJavaSecretViewer>>#javaWriteUIToEditeeFor:
try{    Edit.this.editee.setCustomerId((( (JTextField)
customerIdEditor).getText()));               //
YifJavaPrimitiveViewStringTextField(YifJavaPrimitiveViewAbstract)>>#javaWr
iteFieldToEditee:attributeViewSpec:view:
        Edit.this.editee.setCustomerName((( (JTextField)
customerNameEditor).getText()));             //
YifJavaPrimitiveViewStringTextField(YifJavaPrimitiveViewAbstract)>>#javaWr
iteFieldToEditee:attributeViewSpec:view:
        Edit.this.editee.setCustomerAddress((( (JTextField)
customerAddressEditor).getText()));          //
YifJavaPrimitiveViewStringTextField(YifJavaPrimitiveViewAbstract)>>#javaWr
iteFieldToEditee:attributeViewSpec:view:
        Edit.this.editee.setContractNumber((( (JTextField)
contractNumberEditor).getText()));           //
YifJavaPrimitiveViewStringTextField(YifJavaPrimitiveViewAbstract)>>#javaWr
iteFieldToEditee:attributeViewSpec:view:
        } catch(RemoteException re) {
            // YifJavaSecretViewer>>#javaWriteUIToEditeeFor:
                Revel.howl("trouble in writeUIToEditee() - " + re);
                    // YifJavaSecretViewer>>#javaWriteUIToEditeeFor:
                re.printStackTrace();
            // YifJavaSecretViewer>>#javaWriteUIToEditeeFor:
            }
    // YifJavaSecretViewer>>#javaWriteUIToEditeeFor:

}/*writeUIToEditee*/
 // YifJavaSecretViewer>>#javaWriteUIToEditeeFor:
}//Edit                                                         //
YifJavaInnerClassCode>>#asJava
```

}//end class definition
// YifJavaSecretViewer(YifJavaSecretClassSpec)>>#javaClassDefinition File: inputManifestForCustomerRecord.txt Name: ebPackage/CustomerRecordB.class
    Java-Bean: True File: configCustomerRecordDepDesc.bat setlocal set JET_DIR=E:\WebSphere\Appserver\samples\ejs copy E:\WebSphere\Appserver\eb\EJBDeveloper\CustomerRecord.xml %JET_DIR%\CustomerRecord.xml cd %JET_DIR% jet -f CustomerRecord.xml delete %JET_DIR%\CustomerRecord.xml endlocal

A complete, high-level workflow description is generated to customize the workflow engine:

File: EBMApp.fdl

CODEPAGE 437

PERSON    SARAHLANG
        PERSON_ID  SARAHLANG
        FIRST_NAME    Sarah
        LAST_NAME Lang
    END    SARAHLANG PERSON    JOHNSMITH
        PERSON_ID  JOHNSMITH
        FIRST_NAME    John
        LAST_NAME Smith
    END    JOHNSMITH

- 27 -

```
PERSON    PEDROGOMEZ
      PERSON_ID  PEDROGOMEZ
      FIRST_NAME      Pedro
      LAST_NAME Homez
END   PEDROGOMEZ PERSON    CINDYLONG
      PERSON_ID  CINDYLONG
      FIRST_NAME      Cindy
      LAST_NAME Long
END   CINDYLONG PERSON    JULIEDAVIES
      PERSON_ID  JULIEDAVIES
      FIRST_NAME      Julie
      LAST_NAME Davies
END   JULIEDAVIES ROLE  customer
      RELATED_PERSON SARAHLANG
END   customer

ROLE  CMC
      RELATED_PERSON JOHNSMITH
END   CMC

ROLE  level1
      RELATED_PERSON PEDROGOMEZ
END   level1

ROLE  level2
      RELATED_PERSON CINDYLONG
END   level2

ROLE  level3
      RELATED_PERSON JULIEDAVIES
END   level3

PROGRAM   'IN' ('Default Data Structure','Default Data Structure')
      PARAMETER       'IN'
      WINNT PATH_AND_FILENAME  'java'
      ENVIRONMENT     'SET CLASSPATH=%CLASSPATH%;D:\tmp\'
END   'IN'

PROGRAM   'OUT' ('Default Data Structure','Default Data Structure')
```

```
        PARAMETER       'OUT'
        WINNT PATH_AND_FILENAME  'java'
        ENVIRONMENT     'SET CLASSPATH=%CLASSPATH%;D:\tmp\'
END     'OUT'

PROGRAM   'have problem' ('Default Data Structure','Default Data Structure')
        PARAMETER       'haveproblem'
        WINNT PATH_AND_FILENAME  'java'
        ENVIRONMENT     'SET CLASSPATH=%CLASSPATH%;D:\tmp\'
END     'have problem'

PROGRAM   'identify customer' ('Default Data Structure','Default Data
Structure')
        PARAMETER       'identifycustomer'
        WINNT PATH_AND_FILENAME  'java'
        ENVIRONMENT     'SET CLASSPATH=%CLASSPATH%;D:\tmp\'
END     'identify customer'

PROGRAM   'identify request type' ('Default Data Structure','Default Data
Structure')
        PARAMETER       'identifyrequesttype'
        WINNT PATH_AND_FILENAME  'java'
        ENVIRONMENT     'SET CLASSPATH=%CLASSPATH%;D:\tmp\'
END     'identify request type'

PROGRAM   'verify entitlement' ('Default Data Structure','Default Data
Structure')
        PARAMETER       'verifyentitlement'
        WINNT PATH_AND_FILENAME  'java'
        ENVIRONMENT     'SET CLASSPATH=%CLASSPATH%;D:\tmp\'
END     'verify entitlement'

PROGRAM   'receive rejection' ('Default Data Structure','Default Data Structure')
        PARAMETER       'receiverejection'
        WINNT PATH_AND_FILENAME  'java'
        ENVIRONMENT     'SET CLASSPATH=%CLASSPATH%;D:\tmp\'
END     'receive rejection'

PROGRAM   'receive resolution' ('Default Data Structure','Default Data
Structure')
        PARAMETER       'receiveresolution'
        WINNT PATH_AND_FILENAME  'java'
        ENVIRONMENT     'SET CLASSPATH=%CLASSPATH%;D:\tmp\'
END     'receive resolution'
```

```
PROGRAM   'get problem description' ('Default Data Structure','Default Data
Structure')
        PARAMETER      'getproblemdescription'
        WINNT PATH_AND_FILENAME  'java'
        ENVIRONMENT    'SET CLASSPATH=%CLASSPATH%;D:\tmp\'
END     'get problem description'

PROGRAM   'level1 has easy answer' ('Default Data Structure','Default Data
Structure')
        PARAMETER      'level1haseasyanswer'
        WINNT PATH_AND_FILENAME  'java'
        ENVIRONMENT    'SET CLASSPATH=%CLASSPATH%;D:\tmp\'
END     'level1 has easy answer'

PROGRAM   'find record of similar problem' ('Default Data Structure','Default
Data Structure')
        PARAMETER      'findrecordofsimilarproblem'
        WINNT PATH_AND_FILENAME  'java'
        ENVIRONMENT    'SET CLASSPATH=%CLASSPATH%;D:\tmp\'
END     'find record of similar problem'

PROGRAM   'determine component and write up problem' ('Default Data
Structure','Default Data Structure')
        PARAMETER      'determinecomponentandwriteupproblem'
        WINNT PATH_AND_FILENAME  'java'
        ENVIRONMENT    'SET CLASSPATH=%CLASSPATH%;D:\tmp\'
END     'determine component and write up problem'

PROGRAM   'try to deal with the problem' ('Default Data Structure','Default Data
Structure')
        PARAMETER      'trytodealwiththeproblem'
        WINNT PATH_AND_FILENAME  'java'
        ENVIRONMENT    'SET CLASSPATH=%CLASSPATH%;D:\tmp\'
END     'try to deal with the problem'

PROGRAM   'is it a new problem' ('Default Data Structure','Default Data
Structure')
        PARAMETER      'isitanewproblem'
        WINNT PATH_AND_FILENAME  'java'
        ENVIRONMENT    'SET CLASSPATH=%CLASSPATH%;D:\tmp\'
END     'is it a new problem'

PROGRAM   'attach to APAR' ('Default Data Structure','Default Data Structure')
        PARAMETER      'attachtoAPAR'
        WINNT PATH_AND_FILENAME  'java'
```

```
        ENVIRONMENT    'SET CLASSPATH=%CLASSPATH%;D:\tmp\'
END   'attach to APAR'

PROGRAM   'make new APAR' ('Default Data Structure','Default Data
Structure')
        PARAMETER      'makenewAPAR'
        WINNT PATH_AND_FILENAME  'java'
        ENVIRONMENT    'SET CLASSPATH=%CLASSPATH%;D:\tmp\'
END   'make new APAR'

PROGRAM   'fix the product' ('Default Data Structure','Default Data Structure')
        PARAMETER      'fixtheproduct'
        WINNT PATH_AND_FILENAME  'java'
        ENVIRONMENT    'SET CLASSPATH=%CLASSPATH%;D:\tmp\'
END   'fix the product'

PROGRAM   'inform the customer' ('Default Data Structure','Default Data
Structure')
        PARAMETER      'informthecustomer'
        WINNT PATH_AND_FILENAME  'java'
        ENVIRONMENT    'SET CLASSPATH=%CLASSPATH%;D:\tmp\'
END   'inform the customer'

PROCESS   'CallCenter' ('Default Data Structure','Default Data Structure')
        PROMPT_AT_PROCESS_START
        STAFF_INHERITED PROGRAM_ACTIVITY    'IN' ('Default Data Structure','Default Data
Structure')
                PROGRAM   'IN'
                DONE_BY PROCESS_STARTER END
        END   'IN'

PROGRAM_ACTIVITY    'OUT' ('Default Data Structure','Default Data
Structure')
                PROGRAM   'OUT'
                DONE_BY PROCESS_STARTER END
        END   'OUT'

PROGRAM_ACTIVITY    'have problem' ('Default Data
Structure','Default Data Structure')
                PROGRAM   'have problem'
                DONE_BY MEMBER OF ROLE    customer END
        END   'have problem'
```

```
        PROGRAM_ACTIVITY      'identify customer' ('Default Data
Structure','Default Data Structure')
            PROGRAM   'identify customer'
                DONE_BY MEMBER OF ROLE     cmc END
        END   'identify customer'

PROGRAM_ACTIVITY      'identify request type' ('Default Data
Structure','Default Data Structure')
            PROGRAM   'identify request type'
                DONE_BY MEMBER OF ROLE     cmc END
        END   'identify request type'

PROGRAM_ACTIVITY      'verify entitlement' ('Default Data
Structure','Default Data Structure')
            PROGRAM   'verify entitlement'
                DONE_BY MEMBER OF ROLE     cmc END
        END   'verify entitlement'

PROGRAM_ACTIVITY      'receive rejection' ('Default Data
Structure','Default Data Structure')
            PROGRAM   'receive rejection'
                DONE_BY MEMBER OF ROLE     customer END
        END   'receive rejection'

PROGRAM_ACTIVITY      'receive resolution' ('Default Data
Structure','Default Data Structure')
            PROGRAM   'receive resolution'
                DONE_BY MEMBER OF ROLE     customer END
        END   'receive resolution'

PROGRAM_ACTIVITY      'get problem description' ('Default Data
Structure','Default Data Structure')
            PROGRAM   'get problem description'
                DONE_BY MEMBER OF ROLE     level1 END
        END   'get problem description'

PROGRAM_ACTIVITY      'level1 has easy answer' ('Default Data
Structure','Default Data Structure')
            PROGRAM   'level1 has easy answer'
                DONE_BY MEMBER OF ROLE     level1 END
        END   'level1 has easy answer'

PROGRAM_ACTIVITY      'find record of similar problem' ('Default
Data Structure','Default Data Structure')
            PROGRAM   'find record of similar problem'
```

- 32 -

```
            DONE_BY MEMBER OF ROLE    level1 END
    END    'find record of similar problem'

PROGRAM_ACTIVITY    'determine component and write up problem'
('Default Data Structure','Default Data Structure')
            PROGRAM    'determine component and write up problem'
            DONE_BY MEMBER OF ROLE    level1 END
    END    'determine component and write up problem'

PROGRAM_ACTIVITY    'try to deal with the problem' ('Default Data
Structure','Default Data Structure')
            PROGRAM    'try to deal with the problem'
            DONE_BY MEMBER OF ROLE    level2 END
    END    'try to deal with the problem'

PROGRAM_ACTIVITY    'is it a new problem' ('Default Data
Structure','Default Data Structure')
            PROGRAM    'is it a new problem'
            DONE_BY MEMBER OF ROLE    level2 END
    END    'is it a new problem'

PROGRAM_ACTIVITY    'attach to APAR' ('Default Data
Structure','Default Data Structure')
            PROGRAM    'attach to APAR'
            DONE_BY MEMBER OF ROLE    level2 END
    END    'attach to APAR'

PROGRAM_ACTIVITY    'make new APAR' ('Default Data
Structure','Default Data Structure')
            PROGRAM    'make new APAR'
            DONE_BY MEMBER OF ROLE    level2 END
    END    'make new APAR'

PROGRAM_ACTIVITY    'fix the product' ('Default Data
Structure','Default Data Structure')
            PROGRAM    'fix the product'
            DONE_BY MEMBER OF ROLE    level3 END
    END    'fix the product'

PROGRAM_ACTIVITY    'inform the customer' ('Default Data
Structure','Default Data Structure')
            PROGRAM    'inform the customer'
            DONE_BY MEMBER OF ROLE    level3 END
    END    'inform the customer'
```

CONTROL FROM 'IN' TO 'have problem'
    WHEN RC = 'start'

CONTROL FROM 'have problem' TO 'identify customer'
    WHEN RC = 'call'

CONTROL FROM 'identify customer' TO 'identify request type'
    WHEN RC = 'ok'

CONTROL FROM 'identify request type' TO 'verify entitlement'
    WHEN RC = 'identified'

CONTROL FROM 'verify entitlement' TO 'receive rejection'
    WHEN RC = 'not entitled'

CONTROL FROM 'verify entitlement' TO 'get problem description'
    WHEN RC = 'entitled'

CONTROL FROM 'get problem description' TO 'level1 has easy answer'
    WHEN RC = 'ok'

CONTROL FROM 'level1 has easy answer' TO 'receive resolution'
    WHEN RC = 'yes'

CONTROL FROM 'level1 has easy answer' TO 'find record of similar problem'
    WHEN RC = 'no'

CONTROL FROM 'find record of similar problem' TO 'determine component and write up problem'
    WHEN RC = 'not found'

CONTROL FROM 'find record of similar problem' TO 'receive resolution'
    WHEN RC = 'found'

CONTROL FROM 'determine component and write up problem' TO 'try to deal with the problem'
    WHEN RC = 'forward'

CONTROL FROM 'try to deal with the problem' TO 'receive resolution'

```
            WHEN RC = 'fixed'

CONTROL FROM    'try to deal with the problem'  TO    'is it a new
problem'
            WHEN RC = 'cannot fix'

CONTROL FROM    'is it a new problem'  TO    'attach to APAR'
            WHEN RC = 'old problem'

CONTROL FROM    'is it a new problem'  TO    'make new APAR'
            WHEN RC = 'new problem'

CONTROL FROM    'make new APAR'        TO    'fix the product'
            WHEN RC = 'made'

CONTROL FROM    'attach to APAR'       TO    'fix the product'
            WHEN RC = 'attached'

CONTROL FROM    'fix the product'      TO    'inform the customer'
            WHEN RC = 'release fix'

VIEWDEF
            VIEW        'Null'
            OBJECT              'ebPackage.APAR'
            VARIABLE    'anAPAR'
            ROLE        'customer'
            STAGE               'OUT'
    ENDVIEWDEF
    VIEWDEF
            VIEW        'Null'
            OBJECT              'ebPackage.APAR'
            VARIABLE    'anAPAR'
            ROLE        'customer'
            STAGE               'fix the product'
    ENDVIEWDEF
    VIEWDEF
            VIEW        'Null'
            OBJECT              'ebPackage.APAR'
            VARIABLE    'anAPAR'
            ROLE        'customer'
            STAGE               'receive rejection'
    ENDVIEWDEF
    VIEWDEF
            VIEW        'Null'
            OBJECT              'ebPackage.APAR'
```

```
              VARIABLE    'anAPAR'
              ROLE        'customer'
              STAGE              'have problem'
       ENDVIEWDEF
       VIEWDEF
              VIEW        'Null'
              OBJECT             'ebPackage.APAR'
              VARIABLE    'anAPAR'
              ROLE        'customer'
              STAGE              'identify customer'
       ENDVIEWDEF
       VIEWDEF
              VIEW        'Null'
              OBJECT             'ebPackage.APAR'
              VARIABLE    'anAPAR'
              ROLE        'customer'
              STAGE              'determine component and write up problem'
       ENDVIEWDEF
       VIEWDEF
              VIEW        'Null'
              OBJECT             'ebPackage.APAR'
              VARIABLE    'anAPAR'
              ROLE        'customer'
              STAGE              'find record of similar problem'
       ENDVIEWDEF
       VIEWDEF
              VIEW        'Null'
              OBJECT             'ebPackage.APAR'
              VARIABLE    'anAPAR'
              ROLE        'customer'
              STAGE              'attach to APAR'
       ENDVIEWDEF
       VIEWDEF
              VIEW        'Null'
              OBJECT             'ebPackage.APAR'
              VARIABLE    'anAPAR'
              ROLE        'customer'
              STAGE              'is it a new problem'
       ENDVIEWDEF
       VIEWDEF
              VIEW        'Null'
              OBJECT             'ebPackage.APAR'
              VARIABLE    'anAPAR'
              ROLE        'customer'
              STAGE              'receive resolution'
```

```
ENDVIEWDEF
VIEWDEF
      VIEW       'Null'
      OBJECT            'ebPackage.APAR'
      VARIABLE   'anAPAR'
      ROLE       'customer'
      STAGE             'try to deal with the problem'
ENDVIEWDEF
VIEWDEF
      VIEW       'Null'
      OBJECT            'ebPackage.APAR'
      VARIABLE   'anAPAR'
      ROLE       'customer'
      STAGE             'identify request type'
ENDVIEWDEF
VIEWDEF
      VIEW       'Null'
      OBJECT            'ebPackage.APAR'
      VARIABLE   'anAPAR'
      ROLE       'customer'
      STAGE             'inform the customer'
ENDVIEWDEF
VIEWDEF
      VIEW       'Null'
      OBJECT            'ebPackage.APAR'
      VARIABLE   'anAPAR'
      ROLE       'customer'
      STAGE             'make new APAR'
ENDVIEWDEF
VIEWDEF
      VIEW       'Null'
      OBJECT            'ebPackage.APAR'
      VARIABLE   'anAPAR'
      ROLE       'customer'
      STAGE             'verify entitlement'
ENDVIEWDEF
VIEWDEF
      VIEW       'Null'
      OBJECT            'ebPackage.APAR'
      VARIABLE   'anAPAR'
      ROLE       'customer'
      STAGE             'IN'
ENDVIEWDEF
VIEWDEF
      VIEW       'Null'
```

```
            OBJECT      'ebPackage.APAR'
            VARIABLE    'anAPAR'
            ROLE        'customer'
            STAGE       'level1 has easy answer'
ENDVIEWDEF
VIEWDEF
            VIEW        'Null'
            OBJECT      'ebPackage.APAR'
            VARIABLE    'anAPAR'
            ROLE        'customer'
            STAGE       'get problem description'
ENDVIEWDEF
VIEWDEF
            VIEW        'Null'
            OBJECT      'ebPackage.APAR'
            VARIABLE    'anAPAR'
            ROLE        'cmc'
            STAGE       'OUT'
ENDVIEWDEF
VIEWDEF
            VIEW        'Null'
            OBJECT      'ebPackage.APAR'
            VARIABLE    'anAPAR'
            ROLE        'cmc'
            STAGE       'fix the product'
ENDVIEWDEF
VIEWDEF
            VIEW        'Null'
            OBJECT      'ebPackage.APAR'
            VARIABLE    'anAPAR'
            ROLE        'cmc'
            STAGE       'receive rejection'
ENDVIEWDEF
VIEWDEF
            VIEW        'Null'
            OBJECT      'ebPackage.APAR'
            VARIABLE    'anAPAR'
            ROLE        'cmc'
            STAGE       'have problem'
ENDVIEWDEF
VIEWDEF
            VIEW        'Null'
            OBJECT      'ebPackage.APAR'
            VARIABLE    'anAPAR'
            ROLE        'cmc'
```

```
            STAGE           'identify customer'
ENDVIEWDEF
VIEWDEF
            VIEW            'Null'
            OBJECT          'ebPackage.APAR'
            VARIABLE        'anAPAR'
            ROLE            'cmc'
            STAGE           'determine component and write up problem'
ENDVIEWDEF
VIEWDEF
            VIEW            'Null'
            OBJECT          'ebPackage.APAR'
            VARIABLE        'anAPAR'
            ROLE            'cmc'
            STAGE           'find record of similar problem'
ENDVIEWDEF
VIEWDEF
            VIEW            'Null'
            OBJECT          'ebPackage.APAR'
            VARIABLE        'anAPAR'
            ROLE            'cmc'
            STAGE           'attach to APAR'
ENDVIEWDEF
VIEWDEF
            VIEW            'Null'
            OBJECT          'ebPackage.APAR'
            VARIABLE        'anAPAR'
            ROLE            'cmc'
            STAGE           'is it a new problem'
ENDVIEWDEF
VIEWDEF
            VIEW            'Null'
            OBJECT          'ebPackage.APAR'
            VARIABLE        'anAPAR'
            ROLE            'cmc'
            STAGE           'receive resolution'
ENDVIEWDEF
VIEWDEF
            VIEW            'Null'
            OBJECT          'ebPackage.APAR'
            VARIABLE        'anAPAR'
            ROLE            'cmc'
            STAGE           'try to deal with the problem'
ENDVIEWDEF
VIEWDEF
```

```
            VIEW        'Null'
            OBJECT              'ebPackage.APAR'
            VARIABLE    'anAPAR'
            ROLE        'cmc'
            STAGE               'identify request type'
ENDVIEWDEF
VIEWDEF
            VIEW        'Null'
            OBJECT              'ebPackage.APAR'
            VARIABLE    'anAPAR'
            ROLE        'cmc'
            STAGE               'inform the customer'
ENDVIEWDEF
VIEWDEF
            VIEW        'Null'
            OBJECT              'ebPackage.APAR'
            VARIABLE    'anAPAR'
            ROLE        'cmc'
            STAGE               'make new APAR'
ENDVIEWDEF
VIEWDEF
            VIEW        'Null'
            OBJECT              'ebPackage.APAR'
            VARIABLE    'anAPAR'
            ROLE        'cmc'
            STAGE               'verify entitlement'
ENDVIEWDEF
VIEWDEF
            VIEW        'Null'
            OBJECT              'ebPackage.APAR'
            VARIABLE    'anAPAR'
            ROLE        'cmc'
            STAGE               'IN'
ENDVIEWDEF
VIEWDEF
            VIEW        'Null'
            OBJECT              'ebPackage.APAR'
            VARIABLE    'anAPAR'
            ROLE        'cmc'
            STAGE               'level1 has easy answer'
ENDVIEWDEF
VIEWDEF
            VIEW        'Null'
            OBJECT              'ebPackage.APAR'
            VARIABLE    'anAPAR'
```

```
        ROLE       'cmc'
        STAGE            'get problem description'
ENDVIEWDEF
VIEWDEF
        VIEW       'Null'
        OBJECT           'ebPackage.APAR'
        VARIABLE   'anAPAR'
        ROLE       'level3'
        STAGE            'OUT'
ENDVIEWDEF
VIEWDEF
        VIEW       'Null'
        OBJECT           'ebPackage.APAR'
        VARIABLE   'anAPAR'
        ROLE       'level3'
        STAGE            'fix the product'
ENDVIEWDEF
VIEWDEF
        VIEW       'Null'
        OBJECT           'ebPackage.APAR'
        VARIABLE   'anAPAR'
        ROLE       'level3'
        STAGE            'receive rejection'
ENDVIEWDEF
VIEWDEF
        VIEW       'Null'
        OBJECT           'ebPackage.APAR'
        VARIABLE   'anAPAR'
        ROLE       'level3'
        STAGE            'have problem'
ENDVIEWDEF
VIEWDEF
        VIEW       'Null'
        OBJECT           'ebPackage.APAR'
        VARIABLE   'anAPAR'
        ROLE       'level3'
        STAGE            'identify customer'
ENDVIEWDEF
VIEWDEF
        VIEW       'Null'
        OBJECT           'ebPackage.APAR'
        VARIABLE   'anAPAR'
        ROLE       'level3'
        STAGE            'determine component and write up problem'
ENDVIEWDEF
```

- 41 -

```
VIEWDEF
      VIEW        'Null'
      OBJECT      'ebPackage.APAR'
      VARIABLE    'anAPAR'
      ROLE        'level3'
      STAGE       'find record of similar problem'
ENDVIEWDEF
VIEWDEF
      VIEW        'Null'
      OBJECT      'ebPackage.APAR'
      VARIABLE    'anAPAR'
      ROLE        'level3'
      STAGE       'attach to APAR'
ENDVIEWDEF
VIEWDEF
      VIEW        'Null'
      OBJECT      'ebPackage.APAR'
      VARIABLE    'anAPAR'
      ROLE        'level3'
      STAGE       'is it a new problem'
ENDVIEWDEF
VIEWDEF
      VIEW        'Null'
      OBJECT      'ebPackage.APAR'
      VARIABLE    'anAPAR'
      ROLE        'level3'
      STAGE       'receive resolution'
ENDVIEWDEF
VIEWDEF
      VIEW        'Null'
      OBJECT      'ebPackage.APAR'
      VARIABLE    'anAPAR'
      ROLE        'level3'
      STAGE       'try to deal with the problem'
ENDVIEWDEF
VIEWDEF
      VIEW        'Null'
      OBJECT      'ebPackage.APAR'
      VARIABLE    'anAPAR'
      ROLE        'level3'
      STAGE       'identify request type'
ENDVIEWDEF
VIEWDEF
      VIEW        'Null'
      OBJECT      'ebPackage.APAR'
```

- 42 -

```
            VARIABLE    'anAPAR'
            ROLE        'level3'
            STAGE               'inform the customer'
ENDVIEWDEF
VIEWDEF
            VIEW        'Null'
            OBJECT              'ebPackage.APAR'
            VARIABLE    'anAPAR'
            ROLE        'level3'
            STAGE               'make new APAR'
ENDVIEWDEF
VIEWDEF
            VIEW        'Null'
            OBJECT              'ebPackage.APAR'
            VARIABLE    'anAPAR'
            ROLE        'level3'
            STAGE               'verify entitlement'
ENDVIEWDEF
VIEWDEF
            VIEW        'Null'
            OBJECT              'ebPackage.APAR'
            VARIABLE    'anAPAR'
            ROLE        'level3'
            STAGE               'IN'
ENDVIEWDEF
VIEWDEF
            VIEW        'Null'
            OBJECT              'ebPackage.APAR'
            VARIABLE    'anAPAR'
            ROLE        'level3'
            STAGE               'level1 has easy answer'
ENDVIEWDEF
VIEWDEF
            VIEW        'Null'
            OBJECT              'ebPackage.APAR'
            VARIABLE    'anAPAR'
            ROLE        'level3'
            STAGE               'get problem description'
ENDVIEWDEF
VIEWDEF
            VIEW        'Null'
            OBJECT              'ebPackage.APAR'
            VARIABLE    'anAPAR'
            ROLE        'level1'
            STAGE               'OUT'
```

- 43 -

```
ENDVIEWDEF
VIEWDEF
        VIEW        'Null'
        OBJECT            'ebPackage.APAR'
        VARIABLE    'anAPAR'
        ROLE        'level1'
        STAGE             'fix the product'
ENDVIEWDEF
VIEWDEF
        VIEW        'Null'
        OBJECT            'ebPackage.APAR'
        VARIABLE    'anAPAR'
        ROLE        'level1'
        STAGE             'receive rejection'
ENDVIEWDEF
VIEWDEF
        VIEW        'Null'
        OBJECT            'ebPackage.APAR'
        VARIABLE    'anAPAR'
        ROLE        'level1'
        STAGE             'have problem'
ENDVIEWDEF
VIEWDEF
        VIEW        'Null'
        OBJECT            'ebPackage.APAR'
        VARIABLE    'anAPAR'
        ROLE        'level1'
        STAGE             'identify customer'
ENDVIEWDEF
VIEWDEF
        VIEW        'Null'
        OBJECT            'ebPackage.APAR'
        VARIABLE    'anAPAR'
        ROLE        'level1'
        STAGE             'determine component and write up problem'
ENDVIEWDEF
VIEWDEF
        VIEW        'Null'
        OBJECT            'ebPackage.APAR'
        VARIABLE    'anAPAR'
        ROLE        'level1'
        STAGE             'find record of similar problem'
ENDVIEWDEF
VIEWDEF
        VIEW        'Null'
```

```
            OBJECT      'ebPackage.APAR'
            VARIABLE    'anAPAR'
            ROLE        'level1'
            STAGE       'attach to APAR'
ENDVIEWDEF
VIEWDEF
            VIEW        'Null'
            OBJECT      'ebPackage.APAR'
            VARIABLE    'anAPAR'
            ROLE        'level1'
            STAGE       'is it a new problem'
ENDVIEWDEF
VIEWDEF
            VIEW        'Null'
            OBJECT      'ebPackage.APAR'
            VARIABLE    'anAPAR'
            ROLE        'level1'
            STAGE       'receive resolution'
ENDVIEWDEF
VIEWDEF
            VIEW        'Null'
            OBJECT      'ebPackage.APAR'
            VARIABLE    'anAPAR'
            ROLE        'level1'
            STAGE       'try to deal with the problem'
ENDVIEWDEF
VIEWDEF
            VIEW        'Null'
            OBJECT      'ebPackage.APAR'
            VARIABLE    'anAPAR'
            ROLE        'level1'
            STAGE       'identify request type'
ENDVIEWDEF
VIEWDEF
            VIEW        'Null'
            OBJECT      'ebPackage.APAR'
            VARIABLE    'anAPAR'
            ROLE        'level1'
            STAGE       'inform the customer'
ENDVIEWDEF
VIEWDEF
            VIEW        'Null'
            OBJECT      'ebPackage.APAR'
            VARIABLE    'anAPAR'
            ROLE        'level1'
```

```
        STAGE           'make new APAR'
ENDVIEWDEF
VIEWDEF
        VIEW            'Null'
        OBJECT          'ebPackage.APAR'
        VARIABLE        'anAPAR'
        ROLE            'level1'
        STAGE           'verify entitlement'
ENDVIEWDEF
VIEWDEF
        VIEW            'Null'
        OBJECT          'ebPackage.APAR'
        VARIABLE        'anAPAR'
        ROLE            'level1'
        STAGE           'IN'
ENDVIEWDEF
VIEWDEF
        VIEW            'Null'
        OBJECT          'ebPackage.APAR'
        VARIABLE        'anAPAR'
        ROLE            'level1'
        STAGE           'level1 has easy answer'
ENDVIEWDEF
VIEWDEF
        VIEW            'Null'
        OBJECT          'ebPackage.APAR'
        VARIABLE        'anAPAR'
        ROLE            'level1'
        STAGE           'get problem description'
ENDVIEWDEF
VIEWDEF
        VIEW            'Null'
        OBJECT          'ebPackage.APAR'
        VARIABLE        'anAPAR'
        ROLE            'level2'
        STAGE           'OUT'
ENDVIEWDEF
VIEWDEF
        VIEW            'Null'
        OBJECT          'ebPackage.APAR'
        VARIABLE        'anAPAR'
        ROLE            'level2'
        STAGE           'fix the product'
ENDVIEWDEF
VIEWDEF
```

```
           VIEW        'Null'
           OBJECT             'ebPackage.APAR'
           VARIABLE    'anAPAR'
           ROLE        'level2'
           STAGE              'receive rejection'
ENDVIEWDEF
VIEWDEF
           VIEW        'Null'
           OBJECT             'ebPackage.APAR'
           VARIABLE    'anAPAR'
           ROLE        'level2'
           STAGE              'have problem'
ENDVIEWDEF
VIEWDEF
           VIEW        'Null'
           OBJECT             'ebPackage.APAR'
           VARIABLE    'anAPAR'
           ROLE        'level2'
           STAGE              'identify customer'
ENDVIEWDEF
VIEWDEF
           VIEW        'Null'
           OBJECT             'ebPackage.APAR'
           VARIABLE    'anAPAR'
           ROLE        'level2'
           STAGE              'determine component and write up problem'
ENDVIEWDEF
VIEWDEF
           VIEW        'Null'
           OBJECT             'ebPackage.APAR'
           VARIABLE    'anAPAR'
           ROLE        'level2'
           STAGE              'find record of similar problem'
ENDVIEWDEF
VIEWDEF
           VIEW        'Edit'
           OBJECT             'ebPackage.APAR'
           VARIABLE    'anAPAR'
           ROLE        'level2'
           STAGE              'attach to APAR'
ENDVIEWDEF
VIEWDEF
           VIEW        'Null'
           OBJECT             'ebPackage.APAR'
           VARIABLE    'anAPAR'
```

- 47 -

```
        ROLE       'level2'
        STAGE           'is it a new problem'
ENDVIEWDEF
VIEWDEF
        VIEW       'Null'
        OBJECT          'ebPackage.APAR'
        VARIABLE   'anAPAR'
        ROLE       'level2'
        STAGE           'receive resolution'
ENDVIEWDEF
VIEWDEF
        VIEW       'Null'
        OBJECT          'ebPackage.APAR'
        VARIABLE   'anAPAR'
        ROLE       'level2'
        STAGE           'try to deal with the problem'
ENDVIEWDEF
VIEWDEF
        VIEW       'Null'
        OBJECT          'ebPackage.APAR'
        VARIABLE   'anAPAR'
        ROLE       'level2'
        STAGE           'identify request type'
ENDVIEWDEF
VIEWDEF
        VIEW       'Null'
        OBJECT          'ebPackage.APAR'
        VARIABLE   'anAPAR'
        ROLE       'level2'
        STAGE           'inform the customer'
ENDVIEWDEF
VIEWDEF
        VIEW       'Edit'
        OBJECT          'ebPackage.APAR'
        VARIABLE   'anAPAR'
        ROLE       'level2'
        STAGE           'make new APAR'
ENDVIEWDEF
VIEWDEF
        VIEW       'Null'
        OBJECT          'ebPackage.APAR'
        VARIABLE   'anAPAR'
        ROLE       'level2'
        STAGE           'verify entitlement'
ENDVIEWDEF
```

- 48 -

```
VIEWDEF
      VIEW        'Null'
      OBJECT      'ebPackage.APAR'
      VARIABLE    'anAPAR'
      ROLE        'level2'
      STAGE       'IN'
ENDVIEWDEF
VIEWDEF
      VIEW        'Null'
      OBJECT      'ebPackage.APAR'
      VARIABLE    'anAPAR'
      ROLE        'level2'
      STAGE       'level1 has easy answer'
ENDVIEWDEF
VIEWDEF
      VIEW        'Null'
      OBJECT      'ebPackage.APAR'
      VARIABLE    'anAPAR'
      ROLE        'level2'
      STAGE       'get problem description'
ENDVIEWDEF
VIEWDEF
      VIEW        'Null'
      OBJECT      'ebPackage.CustomerRecord'
      VARIABLE    'aCustomerRecord'
      ROLE        'customer'
      STAGE       'OUT'
ENDVIEWDEF
VIEWDEF
      VIEW        'Null'
      OBJECT      'ebPackage.CustomerRecord'
      VARIABLE    'aCustomerRecord'
      ROLE        'customer'
      STAGE       'fix the product'
ENDVIEWDEF
VIEWDEF
      VIEW        'Null'
      OBJECT      'ebPackage.CustomerRecord'
      VARIABLE    'aCustomerRecord'
      ROLE        'customer'
      STAGE       'receive rejection'
ENDVIEWDEF
VIEWDEF
      VIEW        'Null'
      OBJECT      'ebPackage.CustomerRecord'
```

```
                VARIABLE    'aCustomerRecord'
                ROLE        'customer'
                STAGE           'have problem'
        ENDVIEWDEF
        VIEWDEF
                VIEW        'Null'
                OBJECT          'ebPackage.CustomerRecord'
                VARIABLE    'aCustomerRecord'
                ROLE        'customer'
                STAGE           'identify customer'
        ENDVIEWDEF
        VIEWDEF
                VIEW        'Null'
                OBJECT          'ebPackage.CustomerRecord'
                VARIABLE    'aCustomerRecord'
                ROLE        'customer'
                STAGE           'determine component and write up problem'
        ENDVIEWDEF
        VIEWDEF
                VIEW        'Null'
                OBJECT          'ebPackage.CustomerRecord'
                VARIABLE    'aCustomerRecord'
                ROLE        'customer'
                STAGE           'find record of similar problem'
        ENDVIEWDEF
        VIEWDEF
                VIEW        'Null'
                OBJECT          'ebPackage.CustomerRecord'
                VARIABLE    'aCustomerRecord'
                ROLE        'customer'
                STAGE           'attach to APAR'
        ENDVIEWDEF
        VIEWDEF
                VIEW        'Null'
                OBJECT          'ebPackage.CustomerRecord'
                VARIABLE    'aCustomerRecord'
                ROLE        'customer'
                STAGE           'is it a new problem'
        ENDVIEWDEF
        VIEWDEF
                VIEW        'Null'
                OBJECT          'ebPackage.CustomerRecord'
                VARIABLE    'aCustomerRecord'
                ROLE        'customer'
                STAGE           'receive resolution'
```

```
ENDVIEWDEF
VIEWDEF
        VIEW       'Null'
        OBJECT             'ebPackage.CustomerRecord'
        VARIABLE   'aCustomerRecord'
        ROLE       'customer'
        STAGE              'try to deal with the problem'
ENDVIEWDEF
VIEWDEF
        VIEW       'Null'
        OBJECT             'ebPackage.CustomerRecord'
        VARIABLE   'aCustomerRecord'
        ROLE       'customer'
        STAGE              'identify request type'
ENDVIEWDEF
VIEWDEF
        VIEW       'Null'
        OBJECT             'ebPackage.CustomerRecord'
        VARIABLE   'aCustomerRecord'
        ROLE       'customer'
        STAGE              'inform the customer'
ENDVIEWDEF
VIEWDEF
        VIEW       'Null'
        OBJECT             'ebPackage.CustomerRecord'
        VARIABLE   'aCustomerRecord'
        ROLE       'customer'
        STAGE              'make new APAR'
ENDVIEWDEF
VIEWDEF
        VIEW       'Null'
        OBJECT             'ebPackage.CustomerRecord'
        VARIABLE   'aCustomerRecord'
        ROLE       'customer'
        STAGE              'verify entitlement'
ENDVIEWDEF
VIEWDEF
        VIEW       'Null'
        OBJECT             'ebPackage.CustomerRecord'
        VARIABLE   'aCustomerRecord'
        ROLE       'customer'
        STAGE              'IN'
ENDVIEWDEF
VIEWDEF
        VIEW       'Null'
```

```
            OBJECT      'ebPackage.CustomerRecord'
            VARIABLE    'aCustomerRecord'
            ROLE        'customer'
            STAGE       'level1 has easy answer'
ENDVIEWDEF
VIEWDEF
            VIEW        'Null'
            OBJECT      'ebPackage.CustomerRecord'
            VARIABLE    'aCustomerRecord'
            ROLE        'customer'
            STAGE       'get problem description'
ENDVIEWDEF
VIEWDEF
            VIEW        'Null'
            OBJECT      'ebPackage.CustomerRecord'
            VARIABLE    'aCustomerRecord'
            ROLE        'cmc'
            STAGE       'OUT'
ENDVIEWDEF
VIEWDEF
            VIEW        'Null'
            OBJECT      'ebPackage.CustomerRecord'
            VARIABLE    'aCustomerRecord'
            ROLE        'cmc'
            STAGE       'fix the product'
ENDVIEWDEF
VIEWDEF
            VIEW        'Null'
            OBJECT      'ebPackage.CustomerRecord'
            VARIABLE    'aCustomerRecord'
            ROLE        'cmc'
            STAGE       'receive rejection'
ENDVIEWDEF
VIEWDEF
            VIEW        'Null'
            OBJECT      'ebPackage.CustomerRecord'
            VARIABLE    'aCustomerRecord'
            ROLE        'cmc'
            STAGE       'have problem'
ENDVIEWDEF
VIEWDEF
            VIEW        'Null'
            OBJECT      'ebPackage.CustomerRecord'
            VARIABLE    'aCustomerRecord'
            ROLE        'cmc'
```

- 52 -

```
            STAGE       'identify customer'
ENDVIEWDEF
VIEWDEF
            VIEW        'Null'
            OBJECT      'ebPackage.CustomerRecord'
            VARIABLE    'aCustomerRecord'
            ROLE        'cmc'
            STAGE       'determine component and write up problem'
ENDVIEWDEF
VIEWDEF
            VIEW        'Null'
            OBJECT      'ebPackage.CustomerRecord'
            VARIABLE    'aCustomerRecord'
            ROLE        'cmc'
            STAGE       'find record of similar problem'
ENDVIEWDEF
VIEWDEF
            VIEW        'Null'
            OBJECT      'ebPackage.CustomerRecord'
            VARIABLE    'aCustomerRecord'
            ROLE        'cmc'
            STAGE       'attach to APAR'
ENDVIEWDEF
VIEWDEF
            VIEW        'Null'
            OBJECT      'ebPackage.CustomerRecord'
            VARIABLE    'aCustomerRecord'
            ROLE        'cmc'
            STAGE       'is it a new problem'
ENDVIEWDEF
VIEWDEF
            VIEW        'Null'
            OBJECT      'ebPackage.CustomerRecord'
            VARIABLE    'aCustomerRecord'
            ROLE        'cmc'
            STAGE       'receive resolution'
ENDVIEWDEF
VIEWDEF
            VIEW        'Null'
            OBJECT      'ebPackage.CustomerRecord'
            VARIABLE    'aCustomerRecord'
            ROLE        'cmc'
            STAGE       'try to deal with the problem'
ENDVIEWDEF
VIEWDEF
```

```
        VIEW       'Edit'
        OBJECT            'ebPackage.CustomerRecord'
        VARIABLE   'aCustomerRecord'
        ROLE       'cmc'
        STAGE             'identify request type'
ENDVIEWDEF
VIEWDEF
        VIEW       'Null'
        OBJECT            'ebPackage.CustomerRecord'
        VARIABLE   'aCustomerRecord'
        ROLE       'cmc'
        STAGE             'inform the customer'
ENDVIEWDEF
VIEWDEF
        VIEW       'Null'
        OBJECT            'ebPackage.CustomerRecord'
        VARIABLE   'aCustomerRecord'
        ROLE       'cmc'
        STAGE             'make new APAR'
ENDVIEWDEF
VIEWDEF
        VIEW       'Edit'
        OBJECT            'ebPackage.CustomerRecord'
        VARIABLE   'aCustomerRecord'
        ROLE       'cmc'
        STAGE             'verify entitlement'
ENDVIEWDEF
VIEWDEF
        VIEW       'Null'
        OBJECT            'ebPackage.CustomerRecord'
        VARIABLE   'aCustomerRecord'
        ROLE       'cmc'
        STAGE             'IN'
ENDVIEWDEF
VIEWDEF
        VIEW       'Null'
        OBJECT            'ebPackage.CustomerRecord'
        VARIABLE   'aCustomerRecord'
        ROLE       'cmc'
        STAGE             'level1 has easy answer'
ENDVIEWDEF
VIEWDEF
        VIEW       'Null'
        OBJECT            'ebPackage.CustomerRecord'
        VARIABLE   'aCustomerRecord'
```

```
                ROLE        'cmc'
                STAGE       'get problem description'
        ENDVIEWDEF
        VIEWDEF
                VIEW        'Null'
                OBJECT      'ebPackage.CustomerRecord'
                VARIABLE    'aCustomerRecord'
                ROLE        'level3'
                STAGE       'OUT'
        ENDVIEWDEF
        VIEWDEF
                VIEW        'Null'
                OBJECT      'ebPackage.CustomerRecord'
                VARIABLE    'aCustomerRecord'
                ROLE        'level3'
                STAGE       'fix the product'
        ENDVIEWDEF
        VIEWDEF
                VIEW        'Null'
                OBJECT      'ebPackage.CustomerRecord'
                VARIABLE    'aCustomerRecord'
                ROLE        'level3'
                STAGE       'receive rejection'
        ENDVIEWDEF
        VIEWDEF
                VIEW        'Null'
                OBJECT      'ebPackage.CustomerRecord'
                VARIABLE    'aCustomerRecord'
                ROLE        'level3'
                STAGE       'have problem'
        ENDVIEWDEF
        VIEWDEF
                VIEW        'Null'
                OBJECT      'ebPackage.CustomerRecord'
                VARIABLE    'aCustomerRecord'
                ROLE        'level3'
                STAGE       'identify customer'
        ENDVIEWDEF
        VIEWDEF
                VIEW        'Null'
                OBJECT      'ebPackage.CustomerRecord'
                VARIABLE    'aCustomerRecord'
                ROLE        'level3'
                STAGE       'determine component and write up problem'
        ENDVIEWDEF
```

```
VIEWDEF
      VIEW         'Null'
      OBJECT              'ebPackage.CustomerRecord'
      VARIABLE     'aCustomerRecord'
      ROLE         'level3'
      STAGE               'find record of similar problem'
ENDVIEWDEF
VIEWDEF
      VIEW         'Null'
      OBJECT              'ebPackage.CustomerRecord'
      VARIABLE     'aCustomerRecord'
      ROLE         'level3'
      STAGE               'attach to APAR'
ENDVIEWDEF
VIEWDEF
      VIEW         'Null'
      OBJECT              'ebPackage.CustomerRecord'
      VARIABLE     'aCustomerRecord'
      ROLE         'level3'
      STAGE               'is it a new problem'
ENDVIEWDEF
VIEWDEF
      VIEW         'Null'
      OBJECT              'ebPackage.CustomerRecord'
      VARIABLE     'aCustomerRecord'
      ROLE         'level3'
      STAGE               'receive resolution'
ENDVIEWDEF
VIEWDEF
      VIEW         'Null'
      OBJECT              'ebPackage.CustomerRecord'
      VARIABLE     'aCustomerRecord'
      ROLE         'level3'
      STAGE               'try to deal with the problem'
ENDVIEWDEF
VIEWDEF
      VIEW         'Null'
      OBJECT              'ebPackage.CustomerRecord'
      VARIABLE     'aCustomerRecord'
      ROLE         'level3'
      STAGE               'identify request type'
ENDVIEWDEF
VIEWDEF
      VIEW         'Null'
      OBJECT              'ebPackage.CustomerRecord'
```

```
            VARIABLE    'aCustomerRecord'
            ROLE        'level3'
            STAGE              'inform the customer'
ENDVIEWDEF
VIEWDEF
            VIEW        'Null'
            OBJECT             'ebPackage.CustomerRecord'
            VARIABLE    'aCustomerRecord'
            ROLE        'level3'
            STAGE              'make new APAR'
ENDVIEWDEF
VIEWDEF
            VIEW        'Null'
            OBJECT             'ebPackage.CustomerRecord'
            VARIABLE    'aCustomerRecord'
            ROLE        'level3'
            STAGE              'verify entitlement'
ENDVIEWDEF
VIEWDEF
            VIEW        'Null'
            OBJECT             'ebPackage.CustomerRecord'
            VARIABLE    'aCustomerRecord'
            ROLE        'level3'
            STAGE              'IN'
ENDVIEWDEF
VIEWDEF
            VIEW        'Null'
            OBJECT             'ebPackage.CustomerRecord'
            VARIABLE    'aCustomerRecord'
            ROLE        'level3'
            STAGE              'level1 has easy answer'
ENDVIEWDEF
VIEWDEF
            VIEW        'Null'
            OBJECT             'ebPackage.CustomerRecord'
            VARIABLE    'aCustomerRecord'
            ROLE        'level3'
            STAGE              'get problem description'
ENDVIEWDEF
VIEWDEF
            VIEW        'Null'
            OBJECT             'ebPackage.CustomerRecord'
            VARIABLE    'aCustomerRecord'
            ROLE        'level1'
            STAGE              'OUT'
```

- 57 -

```
ENDVIEWDEF
VIEWDEF
      VIEW       'Null'
      OBJECT              'ebPackage.CustomerRecord'
      VARIABLE   'aCustomerRecord'
      ROLE       'level1'
      STAGE              'fix the product'
ENDVIEWDEF
VIEWDEF
      VIEW       'Null'
      OBJECT              'ebPackage.CustomerRecord'
      VARIABLE   'aCustomerRecord'
      ROLE       'level1'
      STAGE              'receive rejection'
ENDVIEWDEF
VIEWDEF
      VIEW       'Null'
      OBJECT              'ebPackage.CustomerRecord'
      VARIABLE   'aCustomerRecord'
      ROLE       'level1'
      STAGE              'have problem'
ENDVIEWDEF
VIEWDEF
      VIEW       'Null'
      OBJECT              'ebPackage.CustomerRecord'
      VARIABLE   'aCustomerRecord'
      ROLE       'level1'
      STAGE              'identify customer'
ENDVIEWDEF
VIEWDEF
      VIEW       'Edit'
      OBJECT              'ebPackage.CustomerRecord'
      VARIABLE   'aCustomerRecord'
      ROLE       'level1'
      STAGE              'determine component and write up problem'
ENDVIEWDEF
VIEWDEF
      VIEW       'Edit'
      OBJECT              'ebPackage.CustomerRecord'
      VARIABLE   'aCustomerRecord'
      ROLE       'level1'
      STAGE              'find record of similar problem'
ENDVIEWDEF
VIEWDEF
      VIEW       'Null'
```

```
            OBJECT        'ebPackage.CustomerRecord'
            VARIABLE      'aCustomerRecord'
            ROLE          'level1'
            STAGE         'attach to APAR'
ENDVIEWDEF
VIEWDEF
            VIEW          'Null'
            OBJECT        'ebPackage.CustomerRecord'
            VARIABLE      'aCustomerRecord'
            ROLE          'level1'
            STAGE         'is it a new problem'
ENDVIEWDEF
VIEWDEF
            VIEW          'Null'
            OBJECT        'ebPackage.CustomerRecord'
            VARIABLE      'aCustomerRecord'
            ROLE          'level1'
            STAGE         'receive resolution'
ENDVIEWDEF
VIEWDEF
            VIEW          'Null'
            OBJECT        'ebPackage.CustomerRecord'
            VARIABLE      'aCustomerRecord'
            ROLE          'level1'
            STAGE         'try to deal with the problem'
ENDVIEWDEF
VIEWDEF
            VIEW          'Null'
            OBJECT        'ebPackage.CustomerRecord'
            VARIABLE      'aCustomerRecord'
            ROLE          'level1'
            STAGE         'identify request type'
ENDVIEWDEF
VIEWDEF
            VIEW          'Null'
            OBJECT        'ebPackage.CustomerRecord'
            VARIABLE      'aCustomerRecord'
            ROLE          'level1'
            STAGE         'inform the customer'
ENDVIEWDEF
VIEWDEF
            VIEW          'Null'
            OBJECT        'ebPackage.CustomerRecord'
            VARIABLE      'aCustomerRecord'
            ROLE          'level1'
```

```
            STAGE           'make new APAR'
ENDVIEWDEF
VIEWDEF
            VIEW            'Null'
            OBJECT          'ebPackage.CustomerRecord'
            VARIABLE        'aCustomerRecord'
            ROLE            'level1'
            STAGE           'verify entitlement'
ENDVIEWDEF
VIEWDEF
            VIEW            'Null'
            OBJECT          'ebPackage.CustomerRecord'
            VARIABLE        'aCustomerRecord'
            ROLE            'level1'
            STAGE           'IN'
ENDVIEWDEF
VIEWDEF
            VIEW            'Edit'
            OBJECT          'ebPackage.CustomerRecord'
            VARIABLE        'aCustomerRecord'
            ROLE            'level1'
            STAGE           'level1 has easy answer'
ENDVIEWDEF
VIEWDEF
            VIEW            'Edit'
            OBJECT          'ebPackage.CustomerRecord'
            VARIABLE        'aCustomerRecord'
            ROLE            'level1'
            STAGE           'get problem description'
ENDVIEWDEF
VIEWDEF
            VIEW            'Null'
            OBJECT          'ebPackage.CustomerRecord'
            VARIABLE        'aCustomerRecord'
            ROLE            'level2'
            STAGE           'OUT'
ENDVIEWDEF
VIEWDEF
            VIEW            'Null'
            OBJECT          'ebPackage.CustomerRecord'
            VARIABLE        'aCustomerRecord'
            ROLE            'level2'
            STAGE           'fix the product'
ENDVIEWDEF
VIEWDEF
```

```
            VIEW        'Null'
            OBJECT              'ebPackage.CustomerRecord'
            VARIABLE    'aCustomerRecord'
            ROLE        'level2'
            STAGE               'receive rejection'
ENDVIEWDEF
VIEWDEF
            VIEW        'Null'
            OBJECT              'ebPackage.CustomerRecord'
            VARIABLE    'aCustomerRecord'
            ROLE        'level2'
            STAGE               'have problem'
ENDVIEWDEF
VIEWDEF
            VIEW        'Null'
            OBJECT              'ebPackage.CustomerRecord'
            VARIABLE    'aCustomerRecord'
            ROLE        'level2'
            STAGE               'identify customer'
ENDVIEWDEF
VIEWDEF
            VIEW        'Null'
            OBJECT              'ebPackage.CustomerRecord'
            VARIABLE    'aCustomerRecord'
            ROLE        'level2'
            STAGE               'determine component and write up problem'
ENDVIEWDEF
VIEWDEF
            VIEW        'Null'
            OBJECT              'ebPackage.CustomerRecord'
            VARIABLE    'aCustomerRecord'
            ROLE        'level2'
            STAGE               'find record of similar problem'
ENDVIEWDEF
VIEWDEF
            VIEW        'Edit'
            OBJECT              'ebPackage.CustomerRecord'
            VARIABLE    'aCustomerRecord'
            ROLE        'level2'
            STAGE               'attach to APAR'
ENDVIEWDEF
VIEWDEF
            VIEW        'Edit'
            OBJECT              'ebPackage.CustomerRecord'
            VARIABLE    'aCustomerRecord'
```

- 61 -

```
            ROLE      'level2'
            STAGE         'is it a new problem'
ENDVIEWDEF
VIEWDEF
            VIEW      'Null'
            OBJECT        'ebPackage.CustomerRecord'
            VARIABLE  'aCustomerRecord'
            ROLE      'level2'
            STAGE         'receive resolution'
ENDVIEWDEF
VIEWDEF
            VIEW      'Null'
            OBJECT        'ebPackage.CustomerRecord'
            VARIABLE  'aCustomerRecord'
            ROLE      'level2'
            STAGE         'try to deal with the problem'
ENDVIEWDEF
VIEWDEF
            VIEW      'Null'
            OBJECT        'ebPackage.CustomerRecord'
            VARIABLE  'aCustomerRecord'
            ROLE      'level2'
            STAGE         'identify request type'
ENDVIEWDEF
VIEWDEF
            VIEW      'Null'
            OBJECT        'ebPackage.CustomerRecord'
            VARIABLE  'aCustomerRecord'
            ROLE      'level2'
            STAGE         'inform the customer'
ENDVIEWDEF
VIEWDEF
            VIEW      'Edit'
            OBJECT        'ebPackage.CustomerRecord'
            VARIABLE  'aCustomerRecord'
            ROLE      'level2'
            STAGE         'make new APAR'
ENDVIEWDEF
VIEWDEF
            VIEW      'Null'
            OBJECT        'ebPackage.CustomerRecord'
            VARIABLE  'aCustomerRecord'
            ROLE      'level2'
            STAGE         'verify entitlement'
ENDVIEWDEF
```

- 62 -

```
VIEWDEF
      VIEW          'Null'
      OBJECT             'ebPackage.CustomerRecord'
      VARIABLE  'aCustomerRecord'
      ROLE      'level2'
      STAGE              'IN'
ENDVIEWDEF
VIEWDEF
      VIEW          'Null'
      OBJECT             'ebPackage.CustomerRecord'
      VARIABLE  'aCustomerRecord'
      ROLE      'level2'
      STAGE              'level1 has easy answer'
ENDVIEWDEF
VIEWDEF
      VIEW          'Null'
      OBJECT             'ebPackage.CustomerRecord'
      VARIABLE  'aCustomerRecord'
      ROLE      'level2'
      STAGE              'get problem description'
ENDVIEWDEF
VIEWDEF
      VIEW          'Null'
      OBJECT             'ebPackage.CustRepository'
      VARIABLE  'aCustomerRepository'
      ROLE      'customer'
      STAGE              'OUT'
ENDVIEWDEF
VIEWDEF
      VIEW          'Null'
      OBJECT             'ebPackage.CustRepository'
      VARIABLE  'aCustomerRepository'
      ROLE      'customer'
      STAGE              'fix the product'
ENDVIEWDEF
VIEWDEF
      VIEW          'Null'
      OBJECT             'ebPackage.CustRepository'
      VARIABLE  'aCustomerRepository'
      ROLE      'customer'
      STAGE              'receive rejection'
ENDVIEWDEF
VIEWDEF
      VIEW          'Null'
      OBJECT             'ebPackage.CustRepository'
```

```
            VARIABLE    'aCustomerRepository'
            ROLE        'customer'
            STAGE            'have problem'
ENDVIEWDEF
VIEWDEF
            VIEW        'Null'
            OBJECT          'ebPackage.CustRepository'
            VARIABLE    'aCustomerRepository'
            ROLE        'customer'
            STAGE            'identify customer'
ENDVIEWDEF
VIEWDEF
            VIEW        'Null'
            OBJECT          'ebPackage.CustRepository'
            VARIABLE    'aCustomerRepository'
            ROLE        'customer'
            STAGE            'determine component and write up problem'
ENDVIEWDEF
VIEWDEF
            VIEW        'Null'
            OBJECT          'ebPackage.CustRepository'
            VARIABLE    'aCustomerRepository'
            ROLE        'customer'
            STAGE            'find record of similar problem'
ENDVIEWDEF
VIEWDEF
            VIEW        'Null'
            OBJECT          'ebPackage.CustRepository'
            VARIABLE    'aCustomerRepository'
            ROLE        'customer'
            STAGE            'attach to APAR'
ENDVIEWDEF
VIEWDEF
            VIEW        'Null'
            OBJECT          'ebPackage.CustRepository'
            VARIABLE    'aCustomerRepository'
            ROLE        'customer'
            STAGE            'is it a new problem'
ENDVIEWDEF
VIEWDEF
            VIEW        'Null'
            OBJECT          'ebPackage.CustRepository'
            VARIABLE    'aCustomerRepository'
            ROLE        'customer'
            STAGE            'receive resolution'
```

- 64 -

```
ENDVIEWDEF
VIEWDEF
    VIEW        'Null'
    OBJECT      'ebPackage.CustRepository'
    VARIABLE    'aCustomerRepository'
    ROLE        'customer'
    STAGE       'try to deal with the problem'
ENDVIEWDEF
VIEWDEF
    VIEW        'Null'
    OBJECT      'ebPackage.CustRepository'
    VARIABLE    'aCustomerRepository'
    ROLE        'customer'
    STAGE       'identify request type'
ENDVIEWDEF
VIEWDEF
    VIEW        'Null'
    OBJECT      'ebPackage.CustRepository'
    VARIABLE    'aCustomerRepository'
    ROLE        'customer'
    STAGE       'inform the customer'
ENDVIEWDEF
VIEWDEF
    VIEW        'Null'
    OBJECT      'ebPackage.CustRepository'
    VARIABLE    'aCustomerRepository'
    ROLE        'customer'
    STAGE       'make new APAR'
ENDVIEWDEF
VIEWDEF
    VIEW        'Null'
    OBJECT      'ebPackage.CustRepository'
    VARIABLE    'aCustomerRepository'
    ROLE        'customer'
    STAGE       'verify entitlement'
ENDVIEWDEF
VIEWDEF
    VIEW        'Null'
    OBJECT      'ebPackage.CustRepository'
    VARIABLE    'aCustomerRepository'
    ROLE        'customer'
    STAGE       'IN'
ENDVIEWDEF
VIEWDEF
    VIEW        'Null'
```

```
            OBJECT      'ebPackage.CustRepository'
            VARIABLE    'aCustomerRepository'
            ROLE        'customer'
            STAGE       'level1 has easy answer'
ENDVIEWDEF
VIEWDEF
            VIEW        'Null'
            OBJECT      'ebPackage.CustRepository'
            VARIABLE    'aCustomerRepository'
            ROLE        'customer'
            STAGE       'get problem description'
ENDVIEWDEF
VIEWDEF
            VIEW        'Null'
            OBJECT      'ebPackage.CustRepository'
            VARIABLE    'aCustomerRepository'
            ROLE        'cmc'
            STAGE       'OUT'
ENDVIEWDEF
VIEWDEF
            VIEW        'Null'
            OBJECT      'ebPackage.CustRepository'
            VARIABLE    'aCustomerRepository'
            ROLE        'cmc'
            STAGE       'fix the product'
ENDVIEWDEF
VIEWDEF
            VIEW        'Null'
            OBJECT      'ebPackage.CustRepository'
            VARIABLE    'aCustomerRepository'
            ROLE        'cmc'
            STAGE       'receive rejection'
ENDVIEWDEF
VIEWDEF
            VIEW        'Null'
            OBJECT      'ebPackage.CustRepository'
            VARIABLE    'aCustomerRepository'
            ROLE        'cmc'
            STAGE       'have problem'
ENDVIEWDEF
VIEWDEF
            VIEW        'Edit'
            OBJECT      'ebPackage.CustRepository'
            VARIABLE    'aCustomerRepository'
            ROLE        'cmc'
```

```
          STAGE         'identify customer'
ENDVIEWDEF
VIEWDEF
          VIEW          'Null'
          OBJECT        'ebPackage.CustRepository'
          VARIABLE      'aCustomerRepository'
          ROLE          'cmc'
          STAGE         'determine component and write up problem'
ENDVIEWDEF
VIEWDEF
          VIEW          'Null'
          OBJECT        'ebPackage.CustRepository'
          VARIABLE      'aCustomerRepository'
          ROLE          'cmc'
          STAGE         'find record of similar problem'
ENDVIEWDEF
VIEWDEF
          VIEW          'Null'
          OBJECT        'ebPackage.CustRepository'
          VARIABLE      'aCustomerRepository'
          ROLE          'cmc'
          STAGE         'attach to APAR'
ENDVIEWDEF
VIEWDEF
          VIEW          'Null'
          OBJECT        'ebPackage.CustRepository'
          VARIABLE      'aCustomerRepository'
          ROLE          'cmc'
          STAGE         'is it a new problem'
ENDVIEWDEF
VIEWDEF
          VIEW          'Null'
          OBJECT        'ebPackage.CustRepository'
          VARIABLE      'aCustomerRepository'
          ROLE          'cmc'
          STAGE         'receive resolution'
ENDVIEWDEF
VIEWDEF
          VIEW          'Null'
          OBJECT        'ebPackage.CustRepository'
          VARIABLE      'aCustomerRepository'
          ROLE          'cmc'
          STAGE         'try to deal with the problem'
ENDVIEWDEF
VIEWDEF
```

- 67 -

```
            VIEW        'Null'
            OBJECT              'ebPackage.CustRepository'
            VARIABLE    'aCustomerRepository'
            ROLE        'cmc'
            STAGE               'identify request type'
ENDVIEWDEF
VIEWDEF
            VIEW        'Null'
            OBJECT              'ebPackage.CustRepository'
            VARIABLE    'aCustomerRepository'
            ROLE        'cmc'
            STAGE               'inform the customer'
ENDVIEWDEF
VIEWDEF
            VIEW        'Null'
            OBJECT              'ebPackage.CustRepository'
            VARIABLE    'aCustomerRepository'
            ROLE        'cmc'
            STAGE               'make new APAR'
ENDVIEWDEF
VIEWDEF
            VIEW        'Null'
            OBJECT              'ebPackage.CustRepository'
            VARIABLE    'aCustomerRepository'
            ROLE        'cmc'
            STAGE               'verify entitlement'
ENDVIEWDEF
VIEWDEF
            VIEW        'Null'
            OBJECT              'ebPackage.CustRepository'
            VARIABLE    'aCustomerRepository'
            ROLE        'cmc'
            STAGE               'IN'
ENDVIEWDEF
VIEWDEF
            VIEW        'Null'
            OBJECT              'ebPackage.CustRepository'
            VARIABLE    'aCustomerRepository'
            ROLE        'cmc'
            STAGE               'level1 has easy answer'
ENDVIEWDEF
VIEWDEF
            VIEW        'Null'
            OBJECT              'ebPackage.CustRepository'
            VARIABLE    'aCustomerRepository'
```

- 68 -

```
            ROLE       'cmc'
            STAGE             'get problem description'
ENDVIEWDEF
VIEWDEF
            VIEW       'Null'
            OBJECT            'ebPackage.CustRepository'
            VARIABLE   'aCustomerRepository'
            ROLE       'level3'
            STAGE             'OUT'
ENDVIEWDEF
VIEWDEF
            VIEW       'Null'
            OBJECT            'ebPackage.CustRepository'
            VARIABLE   'aCustomerRepository'
            ROLE       'level3'
            STAGE             'fix the product'
ENDVIEWDEF
VIEWDEF
            VIEW       'Null'
            OBJECT            'ebPackage.CustRepository'
            VARIABLE   'aCustomerRepository'
            ROLE       'level3'
            STAGE             'receive rejection'
ENDVIEWDEF
VIEWDEF
            VIEW       'Null'
            OBJECT            'ebPackage.CustRepository'
            VARIABLE   'aCustomerRepository'
            ROLE       'level3'
            STAGE             'have problem'
ENDVIEWDEF
VIEWDEF
            VIEW       'Null'
            OBJECT            'ebPackage.CustRepository'
            VARIABLE   'aCustomerRepository'
            ROLE       'level3'
            STAGE             'identify customer'
ENDVIEWDEF
VIEWDEF
            VIEW       'Null'
            OBJECT            'ebPackage.CustRepository'
            VARIABLE   'aCustomerRepository'
            ROLE       'level3'
            STAGE             'determine component and write up problem'
ENDVIEWDEF
```

- 69 -

```
VIEWDEF
        VIEW        'Null'
        OBJECT              'ebPackage.CustRepository'
        VARIABLE    'aCustomerRepository'
        ROLE        'level3'
        STAGE               'find record of similar problem'
ENDVIEWDEF
VIEWDEF
        VIEW        'Null'
        OBJECT              'ebPackage.CustRepository'
        VARIABLE    'aCustomerRepository'
        ROLE        'level3'
        STAGE               'attach to APAR'
ENDVIEWDEF
VIEWDEF
        VIEW        'Null'
        OBJECT              'ebPackage.CustRepository'
        VARIABLE    'aCustomerRepository'
        ROLE        'level3'
        STAGE               'is it a new problem'
ENDVIEWDEF
VIEWDEF
        VIEW        'Null'
        OBJECT              'ebPackage.CustRepository'
        VARIABLE    'aCustomerRepository'
        ROLE        'level3'
        STAGE               'receive resolution'
ENDVIEWDEF
VIEWDEF
        VIEW        'Null'
        OBJECT              'ebPackage.CustRepository'
        VARIABLE    'aCustomerRepository'
        ROLE        'level3'
        STAGE               'try to deal with the problem'
ENDVIEWDEF
VIEWDEF
        VIEW        'Null'
        OBJECT              'ebPackage.CustRepository'
        VARIABLE    'aCustomerRepository'
        ROLE        'level3'
        STAGE               'identify request type'
ENDVIEWDEF
VIEWDEF
        VIEW        'Null'
        OBJECT              'ebPackage.CustRepository'
```

- 70 -

```
                VARIABLE    'aCustomerRepository'
                ROLE        'level3'
                STAGE               'inform the customer'
        ENDVIEWDEF
        VIEWDEF
                VIEW        'Null'
                OBJECT              'ebPackage.CustRepository'
                VARIABLE    'aCustomerRepository'
                ROLE        'level3'
                STAGE               'make new APAR'
        ENDVIEWDEF
        VIEWDEF
                VIEW        'Null'
                OBJECT              'ebPackage.CustRepository'
                VARIABLE    'aCustomerRepository'
                ROLE        'level3'
                STAGE               'verify entitlement'
        ENDVIEWDEF
        VIEWDEF
                VIEW        'Null'
                OBJECT              'ebPackage.CustRepository'
                VARIABLE    'aCustomerRepository'
                ROLE        'level3'
                STAGE               'IN'
        ENDVIEWDEF
        VIEWDEF
                VIEW        'Null'
                OBJECT              'ebPackage.CustRepository'
                VARIABLE    'aCustomerRepository'
                ROLE        'level3'
                STAGE               'level1 has easy answer'
        ENDVIEWDEF
        VIEWDEF
                VIEW        'Null'
                OBJECT              'ebPackage.CustRepository'
                VARIABLE    'aCustomerRepository'
                ROLE        'level3'
                STAGE               'get problem description'
        ENDVIEWDEF
        VIEWDEF
                VIEW        'Null'
                OBJECT              'ebPackage.CustRepository'
                VARIABLE    'aCustomerRepository'
                ROLE        'level1'
                STAGE               'OUT'
```

```
ENDVIEWDEF
VIEWDEF
        VIEW        'Null'
        OBJECT            'ebPackage.CustRepository'
        VARIABLE    'aCustomerRepository'
        ROLE        'level1'
        STAGE             'fix the product'
ENDVIEWDEF
VIEWDEF
        VIEW        'Null'
        OBJECT            'ebPackage.CustRepository'
        VARIABLE    'aCustomerRepository'
        ROLE        'level1'
        STAGE             'receive rejection'
ENDVIEWDEF
VIEWDEF
        VIEW        'Null'
        OBJECT            'ebPackage.CustRepository'
        VARIABLE    'aCustomerRepository'
        ROLE        'level1'
        STAGE             'have problem'
ENDVIEWDEF
VIEWDEF
        VIEW        'Null'
        OBJECT            'ebPackage.CustRepository'
        VARIABLE    'aCustomerRepository'
        ROLE        'level1'
        STAGE             'identify customer'
ENDVIEWDEF
VIEWDEF
        VIEW        'Null'
        OBJECT            'ebPackage.CustRepository'
        VARIABLE    'aCustomerRepository'
        ROLE        'level1'
        STAGE             'determine component and write up problem'
ENDVIEWDEF
VIEWDEF
        VIEW        'Null'
        OBJECT            'ebPackage.CustRepository'
        VARIABLE    'aCustomerRepository'
        ROLE        'level1'
        STAGE             'find record of similar problem'
ENDVIEWDEF
VIEWDEF
        VIEW        'Null'
```

```
            OBJECT          'ebPackage.CustRepository'
            VARIABLE        'aCustomerRepository'
            ROLE            'level1'
            STAGE           'attach to APAR'
ENDVIEWDEF
VIEWDEF
            VIEW            'Null'
            OBJECT          'ebPackage.CustRepository'
            VARIABLE        'aCustomerRepository'
            ROLE            'level1'
            STAGE           'is it a new problem'
ENDVIEWDEF
VIEWDEF
            VIEW            'Null'
            OBJECT          'ebPackage.CustRepository'
            VARIABLE        'aCustomerRepository'
            ROLE            'level1'
            STAGE           'receive resolution'
ENDVIEWDEF
VIEWDEF
            VIEW            'Null'
            OBJECT          'ebPackage.CustRepository'
            VARIABLE        'aCustomerRepository'
            ROLE            'level1'
            STAGE           'try to deal with the problem'
ENDVIEWDEF
VIEWDEF
            VIEW            'Null'
            OBJECT          'ebPackage.CustRepository'
            VARIABLE        'aCustomerRepository'
            ROLE            'level1'
            STAGE           'identify request type'
ENDVIEWDEF
VIEWDEF
            VIEW            'Null'
            OBJECT          'ebPackage.CustRepository'
            VARIABLE        'aCustomerRepository'
            ROLE            'level1'
            STAGE           'inform the customer'
ENDVIEWDEF
VIEWDEF
            VIEW            'Null'
            OBJECT          'ebPackage.CustRepository'
            VARIABLE        'aCustomerRepository'
            ROLE            'level1'
```

```
        STAGE      'make new APAR'
ENDVIEWDEF
VIEWDEF
        VIEW       'Null'
        OBJECT     'ebPackage.CustRepository'
        VARIABLE   'aCustomerRepository'
        ROLE       'level1'
        STAGE      'verify entitlement'
ENDVIEWDEF
VIEWDEF
        VIEW       'Null'
        OBJECT     'ebPackage.CustRepository'
        VARIABLE   'aCustomerRepository'
        ROLE       'level1'
        STAGE      'IN'
ENDVIEWDEF
VIEWDEF
        VIEW       'Null'
        OBJECT     'ebPackage.CustRepository'
        VARIABLE   'aCustomerRepository'
        ROLE       'level1'
        STAGE      'level1 has easy answer'
ENDVIEWDEF
VIEWDEF
        VIEW       'Null'
        OBJECT     'ebPackage.CustRepository'
        VARIABLE   'aCustomerRepository'
        ROLE       'level1'
        STAGE      'get problem description'
ENDVIEWDEF
VIEWDEF
        VIEW       'Null'
        OBJECT     'ebPackage.CustRepository'
        VARIABLE   'aCustomerRepository'
        ROLE       'level2'
        STAGE      'OUT'
ENDVIEWDEF
VIEWDEF
        VIEW       'Null'
        OBJECT     'ebPackage.CustRepository'
        VARIABLE   'aCustomerRepository'
        ROLE       'level2'
        STAGE      'fix the product'
ENDVIEWDEF
VIEWDEF
```

```
            VIEW       'Null'
            OBJECT         'ebPackage.CustRepository'
            VARIABLE   'aCustomerRepository'
            ROLE       'level2'
            STAGE          'receive rejection'
ENDVIEWDEF
VIEWDEF
            VIEW       'Null'
            OBJECT         'ebPackage.CustRepository'
            VARIABLE   'aCustomerRepository'
            ROLE       'level2'
            STAGE          'have problem'
ENDVIEWDEF
VIEWDEF
            VIEW       'Null'
            OBJECT         'ebPackage.CustRepository'
            VARIABLE   'aCustomerRepository'
            ROLE       'level2'
            STAGE          'identify customer'
ENDVIEWDEF
VIEWDEF
            VIEW       'Null'
            OBJECT         'ebPackage.CustRepository'
            VARIABLE   'aCustomerRepository'
            ROLE       'level2'
            STAGE          'determine component and write up problem'
ENDVIEWDEF
VIEWDEF
            VIEW       'Null'
            OBJECT         'ebPackage.CustRepository'
            VARIABLE   'aCustomerRepository'
            ROLE       'level2'
            STAGE          'find record of similar problem'
ENDVIEWDEF
VIEWDEF
            VIEW       'Null'
            OBJECT         'ebPackage.CustRepository'
            VARIABLE   'aCustomerRepository'
            ROLE       'level2'
            STAGE          'attach to APAR'
ENDVIEWDEF
VIEWDEF
            VIEW       'Null'
            OBJECT         'ebPackage.CustRepository'
            VARIABLE   'aCustomerRepository'
```

```
            ROLE         'level2'
            STAGE           'is it a new problem'
ENDVIEWDEF
VIEWDEF
            VIEW         'Null'
            OBJECT          'ebPackage.CustRepository'
            VARIABLE     'aCustomerRepository'
            ROLE         'level2'
            STAGE           'receive resolution'
ENDVIEWDEF
VIEWDEF
            VIEW         'Null'
            OBJECT          'ebPackage.CustRepository'
            VARIABLE     'aCustomerRepository'
            ROLE         'level2'
            STAGE           'try to deal with the problem'
ENDVIEWDEF
VIEWDEF
            VIEW         'Null'
            OBJECT          'ebPackage.CustRepository'
            VARIABLE     'aCustomerRepository'
            ROLE         'level2'
            STAGE           'identify request type'
ENDVIEWDEF
VIEWDEF
            VIEW         'Null'
            OBJECT          'ebPackage.CustRepository'
            VARIABLE     'aCustomerRepository'
            ROLE         'level2'
            STAGE           'inform the customer'
ENDVIEWDEF
VIEWDEF
            VIEW         'Null'
            OBJECT          'ebPackage.CustRepository'
            VARIABLE     'aCustomerRepository'
            ROLE         'level2'
            STAGE           'make new APAR'
ENDVIEWDEF
VIEWDEF
            VIEW         'Null'
            OBJECT          'ebPackage.CustRepository'
            VARIABLE     'aCustomerRepository'
            ROLE         'level2'
            STAGE           'verify entitlement'
ENDVIEWDEF
```

```
VIEWDEF
    VIEW        'Null'
    OBJECT            'ebPackage.CustRepository'
    VARIABLE    'aCustomerRepository'
    ROLE        'level2'
    STAGE             'IN'
ENDVIEWDEF
VIEWDEF
    VIEW        'Null'
    OBJECT            'ebPackage.CustRepository'
    VARIABLE    'aCustomerRepository'
    ROLE        'level2'
    STAGE             'level1 has easy answer'
ENDVIEWDEF
VIEWDEF
    VIEW        'Null'
    OBJECT            'ebPackage.CustRepository'
    VARIABLE    'aCustomerRepository'
    ROLE        'level2'
    STAGE             'get problem description'
ENDVIEWDEF
VIEWDEF
    VIEW        'Null'
    OBJECT            'ebPackage.ProblemRecord'
    VARIABLE    'aProblemRecord'
    ROLE        'customer'
    STAGE             'OUT'
ENDVIEWDEF
VIEWDEF
    VIEW        'Null'
    OBJECT            'ebPackage.ProblemRecord'
    VARIABLE    'aProblemRecord'
    ROLE        'customer'
    STAGE             'fix the product'
ENDVIEWDEF
VIEWDEF
    VIEW        'Null'
    OBJECT            'ebPackage.ProblemRecord'
    VARIABLE    'aProblemRecord'
    ROLE        'customer'
    STAGE             'receive rejection'
ENDVIEWDEF
VIEWDEF
    VIEW        'Null'
    OBJECT            'ebPackage.ProblemRecord'
```

```
                VARIABLE    'aProblemRecord'
                ROLE        'customer'
                STAGE           'have problem'
        ENDVIEWDEF
        VIEWDEF
                VIEW        'Null'
                OBJECT          'ebPackage.ProblemRecord'
                VARIABLE    'aProblemRecord'
                ROLE        'customer'
                STAGE           'identify customer'
        ENDVIEWDEF
        VIEWDEF
                VIEW        'Null'
                OBJECT          'ebPackage.ProblemRecord'
                VARIABLE    'aProblemRecord'
                ROLE        'customer'
                STAGE           'determine component and write up problem'
        ENDVIEWDEF
        VIEWDEF
                VIEW        'Null'
                OBJECT          'ebPackage.ProblemRecord'
                VARIABLE    'aProblemRecord'
                ROLE        'customer'
                STAGE           'find record of similar problem'
        ENDVIEWDEF
        VIEWDEF
                VIEW        'Null'
                OBJECT          'ebPackage.ProblemRecord'
                VARIABLE    'aProblemRecord'
                ROLE        'customer'
                STAGE           'attach to APAR'
        ENDVIEWDEF
        VIEWDEF
                VIEW        'Null'
                OBJECT          'ebPackage.ProblemRecord'
                VARIABLE    'aProblemRecord'
                ROLE        'customer'
                STAGE           'is it a new problem'
        ENDVIEWDEF
        VIEWDEF
                VIEW        'Null'
                OBJECT          'ebPackage.ProblemRecord'
                VARIABLE    'aProblemRecord'
                ROLE        'customer'
                STAGE           'receive resolution'
```

- 78 -

```
ENDVIEWDEF
VIEWDEF
        VIEW        'Null'
        OBJECT          'ebPackage.ProblemRecord'
        VARIABLE    'aProblemRecord'
        ROLE        'customer'
        STAGE           'try to deal with the problem'
ENDVIEWDEF
VIEWDEF
        VIEW        'Null'
        OBJECT          'ebPackage.ProblemRecord'
        VARIABLE    'aProblemRecord'
        ROLE        'customer'
        STAGE           'identify request type'
ENDVIEWDEF
VIEWDEF
        VIEW        'Null'
        OBJECT          'ebPackage.ProblemRecord'
        VARIABLE    'aProblemRecord'
        ROLE        'customer'
        STAGE           'inform the customer'
ENDVIEWDEF
VIEWDEF
        VIEW        'Null'
        OBJECT          'ebPackage.ProblemRecord'
        VARIABLE    'aProblemRecord'
        ROLE        'customer'
        STAGE           'make new APAR'
ENDVIEWDEF
VIEWDEF
        VIEW        'Null'
        OBJECT          'ebPackage.ProblemRecord'
        VARIABLE    'aProblemRecord'
        ROLE        'customer'
        STAGE           'verify entitlement'
ENDVIEWDEF
VIEWDEF
        VIEW        'Null'
        OBJECT          'ebPackage.ProblemRecord'
        VARIABLE    'aProblemRecord'
        ROLE        'customer'
        STAGE           'IN'
ENDVIEWDEF
VIEWDEF
        VIEW        'Null'
```

```
            OBJECT      'ebPackage.ProblemRecord'
            VARIABLE    'aProblemRecord'
            ROLE        'customer'
            STAGE       'level1 has easy answer'
ENDVIEWDEF
VIEWDEF
            VIEW        'Null'
            OBJECT      'ebPackage.ProblemRecord'
            VARIABLE    'aProblemRecord'
            ROLE        'customer'
            STAGE       'get problem description'
ENDVIEWDEF
VIEWDEF
            VIEW        'Null'
            OBJECT      'ebPackage.ProblemRecord'
            VARIABLE    'aProblemRecord'
            ROLE        'cmc'
            STAGE       'OUT'
ENDVIEWDEF
VIEWDEF
            VIEW        'Null'
            OBJECT      'ebPackage.ProblemRecord'
            VARIABLE    'aProblemRecord'
            ROLE        'cmc'
            STAGE       'fix the product'
ENDVIEWDEF
VIEWDEF
            VIEW        'Null'
            OBJECT      'ebPackage.ProblemRecord'
            VARIABLE    'aProblemRecord'
            ROLE        'cmc'
            STAGE       'receive rejection'
ENDVIEWDEF
VIEWDEF
            VIEW        'Null'
            OBJECT      'ebPackage.ProblemRecord'
            VARIABLE    'aProblemRecord'
            ROLE        'cmc'
            STAGE       'have problem'
ENDVIEWDEF
VIEWDEF
            VIEW        'Null'
            OBJECT      'ebPackage.ProblemRecord'
            VARIABLE    'aProblemRecord'
            ROLE        'cmc'
```

```
        STAGE           'identify customer'
ENDVIEWDEF
VIEWDEF
        VIEW            'Null'
        OBJECT          'ebPackage.ProblemRecord'
        VARIABLE        'aProblemRecord'
        ROLE            'cmc'
        STAGE           'determine component and write up problem'
ENDVIEWDEF
VIEWDEF
        VIEW            'Null'
        OBJECT          'ebPackage.ProblemRecord'
        VARIABLE        'aProblemRecord'
        ROLE            'cmc'
        STAGE           'find record of similar problem'
ENDVIEWDEF
VIEWDEF
        VIEW            'Null'
        OBJECT          'ebPackage.ProblemRecord'
        VARIABLE        'aProblemRecord'
        ROLE            'cmc'
        STAGE           'attach to APAR'
ENDVIEWDEF
VIEWDEF
        VIEW            'Null'
        OBJECT          'ebPackage.ProblemRecord'
        VARIABLE        'aProblemRecord'
        ROLE            'cmc'
        STAGE           'is it a new problem'
ENDVIEWDEF
VIEWDEF
        VIEW            'Null'
        OBJECT          'ebPackage.ProblemRecord'
        VARIABLE        'aProblemRecord'
        ROLE            'cmc'
        STAGE           'receive resolution'
ENDVIEWDEF
VIEWDEF
        VIEW            'Null'
        OBJECT          'ebPackage.ProblemRecord'
        VARIABLE        'aProblemRecord'
        ROLE            'cmc'
        STAGE           'try to deal with the problem'
ENDVIEWDEF
VIEWDEF
```

```
        VIEW       'Edit'
        OBJECT            'ebPackage.ProblemRecord'
        VARIABLE   'aProblemRecord'
        ROLE       'cmc'
        STAGE             'identify request type'
ENDVIEWDEF
VIEWDEF
        VIEW       'Null'
        OBJECT            'ebPackage.ProblemRecord'
        VARIABLE   'aProblemRecord'
        ROLE       'cmc'
        STAGE             'inform the customer'
ENDVIEWDEF
VIEWDEF
        VIEW       'Null'
        OBJECT            'ebPackage.ProblemRecord'
        VARIABLE   'aProblemRecord'
        ROLE       'cmc'
        STAGE             'make new APAR'
ENDVIEWDEF
VIEWDEF
        VIEW       'Edit'
        OBJECT            'ebPackage.ProblemRecord'
        VARIABLE   'aProblemRecord'
        ROLE       'cmc'
        STAGE             'verify entitlement'
ENDVIEWDEF
VIEWDEF
        VIEW       'Null'
        OBJECT            'ebPackage.ProblemRecord'
        VARIABLE   'aProblemRecord'
        ROLE       'cmc'
        STAGE             'IN'
ENDVIEWDEF
VIEWDEF
        VIEW       'Null'
        OBJECT            'ebPackage.ProblemRecord'
        VARIABLE   'aProblemRecord'
        ROLE       'cmc'
        STAGE             'level1 has easy answer'
ENDVIEWDEF
VIEWDEF
        VIEW       'Null'
        OBJECT            'ebPackage.ProblemRecord'
        VARIABLE   'aProblemRecord'
```

```
            ROLE        'cmc'
            STAGE            'get problem description'
ENDVIEWDEF
VIEWDEF
            VIEW        'Null'
            OBJECT           'ebPackage.ProblemRecord'
            VARIABLE    'aProblemRecord'
            ROLE        'level3'
            STAGE            'OUT'
ENDVIEWDEF
VIEWDEF
            VIEW        'Null'
            OBJECT           'ebPackage.ProblemRecord'
            VARIABLE    'aProblemRecord'
            ROLE        'level3'
            STAGE            'fix the product'
ENDVIEWDEF
VIEWDEF
            VIEW        'Null'
            OBJECT           'ebPackage.ProblemRecord'
            VARIABLE    'aProblemRecord'
            ROLE        'level3'
            STAGE            'receive rejection'
ENDVIEWDEF
VIEWDEF
            VIEW        'Null'
            OBJECT           'ebPackage.ProblemRecord'
            VARIABLE    'aProblemRecord'
            ROLE        'level3'
            STAGE            'have problem'
ENDVIEWDEF
VIEWDEF
            VIEW        'Null'
            OBJECT           'ebPackage.ProblemRecord'
            VARIABLE    'aProblemRecord'
            ROLE        'level3'
            STAGE            'identify customer'
ENDVIEWDEF
VIEWDEF
            VIEW        'Null'
            OBJECT           'ebPackage.ProblemRecord'
            VARIABLE    'aProblemRecord'
            ROLE        'level3'
            STAGE            'determine component and write up problem'
ENDVIEWDEF
```

```
VIEWDEF
    VIEW        'Null'
    OBJECT      'ebPackage.ProblemRecord'
    VARIABLE    'aProblemRecord'
    ROLE        'level3'
    STAGE       'find record of similar problem'
ENDVIEWDEF
VIEWDEF
    VIEW        'Null'
    OBJECT      'ebPackage.ProblemRecord'
    VARIABLE    'aProblemRecord'
    ROLE        'level3'
    STAGE       'attach to APAR'
ENDVIEWDEF
VIEWDEF
    VIEW        'Null'
    OBJECT      'ebPackage.ProblemRecord'
    VARIABLE    'aProblemRecord'
    ROLE        'level3'
    STAGE       'is it a new problem'
ENDVIEWDEF
VIEWDEF
    VIEW        'Null'
    OBJECT      'ebPackage.ProblemRecord'
    VARIABLE    'aProblemRecord'
    ROLE        'level3'
    STAGE       'receive resolution'
ENDVIEWDEF
VIEWDEF
    VIEW        'Null'
    OBJECT      'ebPackage.ProblemRecord'
    VARIABLE    'aProblemRecord'
    ROLE        'level3'
    STAGE       'try to deal with the problem'
ENDVIEWDEF
VIEWDEF
    VIEW        'Null'
    OBJECT      'ebPackage.ProblemRecord'
    VARIABLE    'aProblemRecord'
    ROLE        'level3'
    STAGE       'identify request type'
ENDVIEWDEF
VIEWDEF
    VIEW        'Null'
    OBJECT      'ebPackage.ProblemRecord'
```

- 84 -

```
                VARIABLE    'aProblemRecord'
                ROLE        'level3'
                STAGE           'inform the customer'
        ENDVIEWDEF
        VIEWDEF
                VIEW        'Null'
                OBJECT          'ebPackage.ProblemRecord'
                VARIABLE    'aProblemRecord'
                ROLE        'level3'
                STAGE           'make new APAR'
        ENDVIEWDEF
        VIEWDEF
                VIEW        'Null'
                OBJECT          'ebPackage.ProblemRecord'
                VARIABLE    'aProblemRecord'
                ROLE        'level3'
                STAGE           'verify entitlement'
        ENDVIEWDEF
        VIEWDEF
                VIEW        'Null'
                OBJECT          'ebPackage.ProblemRecord'
                VARIABLE    'aProblemRecord'
                ROLE        'level3'
                STAGE           'IN'
        ENDVIEWDEF
        VIEWDEF
                VIEW        'Null'
                OBJECT          'ebPackage.ProblemRecord'
                VARIABLE    'aProblemRecord'
                ROLE        'level3'
                STAGE           'level1 has easy answer'
        ENDVIEWDEF
        VIEWDEF
                VIEW        'Null'
                OBJECT          'ebPackage.ProblemRecord'
                VARIABLE    'aProblemRecord'
                ROLE        'level3'
                STAGE           'get problem description'
        ENDVIEWDEF
        VIEWDEF
                VIEW        'Null'
                OBJECT          'ebPackage.ProblemRecord'
                VARIABLE    'aProblemRecord'
                ROLE        'level1'
                STAGE           'OUT'
```

- 85 -

```
ENDVIEWDEF
VIEWDEF
        VIEW        'Null'
        OBJECT          'ebPackage.ProblemRecord'
        VARIABLE    'aProblemRecord'
        ROLE        'level1'
        STAGE           'fix the product'
ENDVIEWDEF
VIEWDEF
        VIEW        'Null'
        OBJECT          'ebPackage.ProblemRecord'
        VARIABLE    'aProblemRecord'
        ROLE        'level1'
        STAGE           'receive rejection'
ENDVIEWDEF
VIEWDEF
        VIEW        'Null'
        OBJECT          'ebPackage.ProblemRecord'
        VARIABLE    'aProblemRecord'
        ROLE        'level1'
        STAGE           'have problem'
ENDVIEWDEF
VIEWDEF
        VIEW        'Null'
        OBJECT          'ebPackage.ProblemRecord'
        VARIABLE    'aProblemRecord'
        ROLE        'level1'
        STAGE           'identify customer'
ENDVIEWDEF
VIEWDEF
        VIEW        'Edit'
        OBJECT          'ebPackage.ProblemRecord'
        VARIABLE    'aProblemRecord'
        ROLE        'level1'
        STAGE           'determine component and write up problem'
ENDVIEWDEF
VIEWDEF
        VIEW        'Edit'
        OBJECT          'ebPackage.ProblemRecord'
        VARIABLE    'aProblemRecord'
        ROLE        'level1'
        STAGE           'find record of similar problem'
ENDVIEWDEF
VIEWDEF
        VIEW        'Null'
```

```
            OBJECT         'ebPackage.ProblemRecord'
            VARIABLE       'aProblemRecord'
            ROLE           'level1'
            STAGE              'attach to APAR'
ENDVIEWDEF
VIEWDEF
            VIEW           'Null'
            OBJECT         'ebPackage.ProblemRecord'
            VARIABLE       'aProblemRecord'
            ROLE           'level1'
            STAGE              'is it a new problem'
ENDVIEWDEF
VIEWDEF
            VIEW           'Null'
            OBJECT         'ebPackage.ProblemRecord'
            VARIABLE       'aProblemRecord'
            ROLE           'level1'
            STAGE              'receive resolution'
ENDVIEWDEF
VIEWDEF
            VIEW           'Null'
            OBJECT         'ebPackage.ProblemRecord'
            VARIABLE       'aProblemRecord'
            ROLE           'level1'
            STAGE              'try to deal with the problem'
ENDVIEWDEF
VIEWDEF
            VIEW           'Null'
            OBJECT         'ebPackage.ProblemRecord'
            VARIABLE       'aProblemRecord'
            ROLE           'level1'
            STAGE              'identify request type'
ENDVIEWDEF
VIEWDEF
            VIEW           'Null'
            OBJECT         'ebPackage.ProblemRecord'
            VARIABLE       'aProblemRecord'
            ROLE           'level1'
            STAGE              'inform the customer'
ENDVIEWDEF
VIEWDEF
            VIEW           'Null'
            OBJECT         'ebPackage.ProblemRecord'
            VARIABLE       'aProblemRecord'
            ROLE           'level1'
```

```
            STAGE       'make new APAR'
ENDVIEWDEF
VIEWDEF
            VIEW        'Null'
            OBJECT          'ebPackage.ProblemRecord'
            VARIABLE    'aProblemRecord'
            ROLE        'level1'
            STAGE       'verify entitlement'
ENDVIEWDEF
VIEWDEF
            VIEW        'Null'
            OBJECT          'ebPackage.ProblemRecord'
            VARIABLE    'aProblemRecord'
            ROLE        'level1'
            STAGE       'IN'
ENDVIEWDEF
VIEWDEF
            VIEW        'Edit'
            OBJECT          'ebPackage.ProblemRecord'
            VARIABLE    'aProblemRecord'
            ROLE        'level1'
            STAGE       'level1 has easy answer'
ENDVIEWDEF
VIEWDEF
            VIEW        'Edit'
            OBJECT          'ebPackage.ProblemRecord'
            VARIABLE    'aProblemRecord'
            ROLE        'level1'
            STAGE       'get problem description'
ENDVIEWDEF
VIEWDEF
            VIEW        'Null'
            OBJECT          'ebPackage.ProblemRecord'
            VARIABLE    'aProblemRecord'
            ROLE        'level2'
            STAGE       'OUT'
ENDVIEWDEF
VIEWDEF
            VIEW        'Null'
            OBJECT          'ebPackage.ProblemRecord'
            VARIABLE    'aProblemRecord'
            ROLE        'level2'
            STAGE       'fix the product'
ENDVIEWDEF
VIEWDEF
```

```
            VIEW        'Null'
            OBJECT              'ebPackage.ProblemRecord'
            VARIABLE    'aProblemRecord'
            ROLE        'level2'
            STAGE               'receive rejection'
ENDVIEWDEF
VIEWDEF
            VIEW        'Null'
            OBJECT              'ebPackage.ProblemRecord'
            VARIABLE    'aProblemRecord'
            ROLE        'level2'
            STAGE               'have problem'
ENDVIEWDEF
VIEWDEF
            VIEW        'Null'
            OBJECT              'ebPackage.ProblemRecord'
            VARIABLE    'aProblemRecord'
            ROLE        'level2'
            STAGE               'identify customer'
ENDVIEWDEF
VIEWDEF
            VIEW        'Null'
            OBJECT              'ebPackage.ProblemRecord'
            VARIABLE    'aProblemRecord'
            ROLE        'level2'
            STAGE               'determine component and write up problem'
ENDVIEWDEF
VIEWDEF
            VIEW        'Null'
            OBJECT              'ebPackage.ProblemRecord'
            VARIABLE    'aProblemRecord'
            ROLE        'level2'
            STAGE               'find record of similar problem'
ENDVIEWDEF
VIEWDEF
            VIEW        'Edit'
            OBJECT              'ebPackage.ProblemRecord'
            VARIABLE    'aProblemRecord'
            ROLE        'level2'
            STAGE               'attach to APAR'
ENDVIEWDEF
VIEWDEF
            VIEW        'Edit'
            OBJECT              'ebPackage.ProblemRecord'
            VARIABLE    'aProblemRecord'
```

```
            ROLE        'level2'
            STAGE           'is it a new problem'
ENDVIEWDEF
VIEWDEF
            VIEW        'Null'
            OBJECT          'ebPackage.ProblemRecord'
            VARIABLE    'aProblemRecord'
            ROLE        'level2'
            STAGE           'receive resolution'
ENDVIEWDEF
VIEWDEF
            VIEW        'Edit'
            OBJECT          'ebPackage.ProblemRecord'
            VARIABLE    'aProblemRecord'
            ROLE        'level2'
            STAGE           'try to deal with the problem'
ENDVIEWDEF
VIEWDEF
            VIEW        'Null'
            OBJECT          'ebPackage.ProblemRecord'
            VARIABLE    'aProblemRecord'
            ROLE        'level2'
            STAGE           'identify request type'
ENDVIEWDEF
VIEWDEF
            VIEW        'Null'
            OBJECT          'ebPackage.ProblemRecord'
            VARIABLE    'aProblemRecord'
            ROLE        'level2'
            STAGE           'inform the customer'
ENDVIEWDEF
VIEWDEF
            VIEW        'Edit'
            OBJECT          'ebPackage.ProblemRecord'
            VARIABLE    'aProblemRecord'
            ROLE        'level2'
            STAGE           'make new APAR'
ENDVIEWDEF
VIEWDEF
            VIEW        'Null'
            OBJECT          'ebPackage.ProblemRecord'
            VARIABLE    'aProblemRecord'
            ROLE        'level2'
            STAGE           'verify entitlement'
ENDVIEWDEF
```

- 90 -

```
            VIEWDEF
                    VIEW        'Null'
                    OBJECT              'ebPackage.ProblemRecord'
                    VARIABLE    'aProblemRecord'
                    ROLE        'level2'
                    STAGE               'IN'
            ENDVIEWDEF
            VIEWDEF
                    VIEW        'Null'
                    OBJECT              'ebPackage.ProblemRecord'
                    VARIABLE    'aProblemRecord'
                    ROLE        'level2'
                    STAGE               'level1 has easy answer'
            ENDVIEWDEF
            VIEWDEF
                    VIEW        'Null'
                    OBJECT              'ebPackage.ProblemRecord'
                    VARIABLE    'aProblemRecord'
                    ROLE        'level2'
                    STAGE               'get problem description'
            ENDVIEWDEF
    END     'CallCenter'
```

File: EBProcessCallCenterCode.java

```java
package ebPackage;

import java.rmi.*;
import java.util.*;
import javax.naming.*;
import javax.ejb.*;

public class EBProcessCallCenterCode implements EBCodeHooks{
private CustRepository      aCustomerRepository;
private CustomerRecord      aCustomerRecord;
private ProblemRecord       aProblemRecord;
private APAR anAPAR;
private CustRepositoryHome xCustRepositoryHome;
private CustomerRecordHome xCustomerRecordHome;
private ProblemRecordHome xProblemRecordHome;
private APARHome xAPARHome;
public EBProcessCallCenterCode(){
        super();
```

```
        try {
                Properties p = new Properties();
                p.put(Context.INITIAL_CONTEXT_FACTORY,
                        "com.ibm.jndi.CosNaming.CNInitialContextFactory");
                p.put("java.naming.provider.url","iiop://localhost:9019");
                InitialContext ic = new InitialContext(p);
                //lookup the home for each object in this process
                //Okay, lazy initialization would probably be better
                Object tmpObj;
                tmpObj = ic.lookup("CustRepositoryHome");
                xCustRepositoryHome =
CustRepositoryHomeHelper.narrow((org.omg.CORBA.Object)tmpObj);
                tmpObj = ic.lookup("CustomerRecordHome");
                xCustomerRecordHome =
CustomerRecordHomeHelper.narrow((org.omg.CORBA.Object)tmpObj);
                tmpObj = ic.lookup("ProblemRecordHome");
                xProblemRecordHome =
ProblemRecordHomeHelper.narrow((org.omg.CORBA.Object)tmpObj);
                tmpObj = ic.lookup("APARHome");
                xAPARHome =
APARHomeHelper.narrow((org.omg.CORBA.Object)tmpObj);
                System.out.println("Got all EJB homes okay");
        } catch(Exception e) {
                System.out.println("Problem getting EJB homes: "+e.getMessage());
        }//catch
}
public String getVariableInstanceId(String varName){
        try{
                if(varName.equalsIgnoreCase("aCustomerRepository")){
                        return ((String)aCustomerRepository.getInstanceId());
                } if(varName.equalsIgnoreCase("aCustomerRecord")){
                        return ((String)aCustomerRecord.getInstanceId());
                } if(varName.equalsIgnoreCase("aProblemRecord")){
                        return ((String)aProblemRecord.getInstanceId());
                } if(varName.equalsIgnoreCase("anAPAR")){
                        return ((String)anAPAR.getInstanceId());
                }
```

```
        } catch(Exception e){
                System.out.println("could not get instance id/primaryKey for
object: "+e.getMessage());
        }
        return null;} public void codeOnStartingStage(String stageName){
        if (stageName.equalsIgnoreCase("haveProblem")){
                haveProblemCodeOnStartingStage();
        }       else if (stageName.equalsIgnoreCase("identifyCustomer")){
                identifyCustomerCodeOnStartingStage();
        }       else if (stageName.equalsIgnoreCase("identifyRequestType")){
                identifyRequestTypeCodeOnStartingStage();
        }       else if (stageName.equalsIgnoreCase("verifyEntitlement")){
                verifyEntitlementCodeOnStartingStage();
        }       else if (stageName.equalsIgnoreCase("receiveRejection")){
                receiveRejectionCodeOnStartingStage();
        }       else if (stageName.equalsIgnoreCase("receiveResolution")){
                receiveResolutionCodeOnStartingStage();
        }       else if (stageName.equalsIgnoreCase("getProblemDescription")){
                getProblemDescriptionCodeOnStartingStage();
        }       else if (stageName.equalsIgnoreCase("level1HasEasyAnswer")){
                level1HasEasyAnswerCodeOnStartingStage();
        }       else if
(stageName.equalsIgnoreCase("findRecordOfSimilarProblem")){
                findRecordOfSimilarProblemCodeOnStartingStage();
        }       else if
(stageName.equalsIgnoreCase("determineComponentAndWriteUpProblem")){
                determineComponentAndWriteUpProblemCodeOnStartingStage();
        }       else if
(stageName.equalsIgnoreCase("tryToDealWithTheProblem")){
                tryToDealWithTheProblemCodeOnStartingStage();
        }       else if (stageName.equalsIgnoreCase("isItANewProblem")){
                isItANewProblemCodeOnStartingStage();
        }       else if (stageName.equalsIgnoreCase("attachToAPAR")){
                attachToAPARCodeOnStartingStage();
        }       else if (stageName.equalsIgnoreCase("makeNewAPAR")){
                makeNewAPARCodeOnStartingStage();
        }       else if (stageName.equalsIgnoreCase("fixTheProduct")){
                fixTheProductCodeOnStartingStage();
        }       else if (stageName.equalsIgnoreCase("informTheCustomer")){
                informTheCustomerCodeOnStartingStage();
        }       else {
                //NB NB someone tried giving me an invalid stage name
```

```
                System.out.println("Invalid stage name for
codeOnStartingStage()");
        } //else
} private void haveProblemCodeOnStartingStage(){
        //user method code from eb
        try {
                //NB NB this is code to be run before the stage is started
/*CustomerRecord c = xCustomerRecordHome.create();
c.setCustomerId("11111");
c.setCustomerName("Jean Belliveau");
c.setCustomerAddress("St. Catherines street");
c.setContractNumber("x6346wef8");

c = xCustomerRecordHome.create();
c.setCustomerId("3647fd");
c.setCustomerName("Maurice Richard");
c.setCustomerAddress("Chicoutimi");
c.setContractNumber("m9nn8");

c = xCustomerRecordHome.create();
c.setCustomerId("675h8");
c.setCustomerName("Larry Robinson");
c.setCustomerAddress("Mississauga");
c.setContractNumber("0n78v7895");

c = xCustomerRecordHome.create();
c.setCustomerId("675h8");
c.setCustomerName("Guy Lafleur");
c.setCustomerAddress("St. Denis");
c.setContractNumber("4p36789");
*/
        } catch(Exception e){
                System.out.println("caught an exception in user code: "+e);
        }
} private void identifyCustomerCodeOnStartingStage(){
        //user method code from eb
        try {

} catch(Exception e){
                System.out.println("caught an exception in user code: "+e);
        }
```

```
        } private void identifyRequestTypeCodeOnStartingStage(){
                //user method code from eb
                try {

} catch(Exception e){
                        System.out.println("caught an exception in user code: "+e);
                }
        } private void verifyEntitlementCodeOnStartingStage(){
                //user method code from eb
                try {

} catch(Exception e){
                        System.out.println("caught an exception in user code: "+e);
                }
        } private void receiveRejectionCodeOnStartingStage(){
                //user method code from eb
                try {

} catch(Exception e){
                        System.out.println("caught an exception in user code: "+e);
                }
        } private void receiveResolutionCodeOnStartingStage(){
                //user method code from eb
                try {

} catch(Exception e){
                        System.out.println("caught an exception in user code: "+e);
                }
        } private void getProblemDescriptionCodeOnStartingStage(){
                //user method code from eb
                try {

} catch(Exception e){
                        System.out.println("caught an exception in user code: "+e);
                }
```

```
        } private void level1HasEasyAnswerCodeOnStartingStage(){
                //user method code from eb
                try {

} catch(Exception e){
                        System.out.println("caught an exception in user code: "+e);
                }
        } private void findRecordOfSimilarProblemCodeOnStartingStage(){
                //user method code from eb
                try {

} catch(Exception e){
                        System.out.println("caught an exception in user code: "+e);
                }
        } private void determineComponentAndWriteUpProblemCodeOnStartingStage(){
                //user method code from eb
                try {

} catch(Exception e){
                        System.out.println("caught an exception in user code: "+e);
                }
        } private void tryToDealWithTheProblemCodeOnStartingStage(){
                //user method code from eb
                try {

} catch(Exception e){
                        System.out.println("caught an exception in user code: "+e);
                }
        } private void isItANewProblemCodeOnStartingStage(){
                //user method code from eb
                try {

} catch(Exception e){
                        System.out.println("caught an exception in user code: "+e);
                }
```

```
        } private void attachToAPARCodeOnStartingStage(){
                //user method code from eb
                try {

} catch(Exception e){
                        System.out.println("caught an exception in user code: "+e);
                }
        } private void makeNewAPARCodeOnStartingStage(){
                //user method code from eb
                try {

} catch(Exception e){
                        System.out.println("caught an exception in user code: "+e);
                }
        } private void fixTheProductCodeOnStartingStage(){
                //user method code from eb
                try {

} catch(Exception e){
                        System.out.println("caught an exception in user code: "+e);
                }
        } private void informTheCustomerCodeOnStartingStage(){
                //user method code from eb
                try {

} catch(Exception e){
                        System.out.println("caught an exception in user code: "+e);
                }
        } public void objectPrep(String stageName, String varName){
        try{
                if (stageName.equalsIgnoreCase("IN")){
                        System.out.println("In ObjectPrep() for stage: "+stageName+" varName: "+varName);
```

```
    } //if(stageName)

if (stageName.equalsIgnoreCase("OUT")){
            System.out.println("In ObjectPrep() for stage: "+stageName+"
varName: "+varName);

} //if(stageName)

if (stageName.equalsIgnoreCase("haveProblem")){
            System.out.println("In ObjectPrep() for stage: "+stageName+"
varName: "+varName);

} //if(stageName)

if (stageName.equalsIgnoreCase("identifyCustomer")){
            System.out.println("In ObjectPrep() for stage: "+stageName+"
varName: "+varName);
            if (varName.equalsIgnoreCase("aCustomerRepository")){
                    //NB NB FIND ANDOR CREATE
                    boolean newVarCreated = false;
                    boolean execdFind = false;
                    boolean find = false;
                    boolean findIfMissing = false;
                    boolean create = false;
                    boolean createIfMissing = true;
                    boolean createIfNotFound = false;
                    System.out.println("In ObjectPrep() for stage:
"+stageName+" varName: "+varName);
                    System.out.println("\tfind: "+find+" findIfMissing:
"+findIfMissing+" createIfNotFound: "+createIfNotFound);
                    System.out.println("\tcreate: "+create+" createIfMissing:
"+createIfMissing);
                    CustRepository foundCustRepository = null;

if(((find)||(findIfMissing&&aCustomerRepository==null))&&!create){
                            execdFind=true;
                            foundCustRepository =
findACustomerRepositoryInIdentifyCustomer();
                            if(foundCustRepository==null){
                                    System.out.println("find returned null,
create?");
                                    // find failed, see if we were supposed to
create one as a last resort
                                    if(createIfNotFound||createIfMissing){
```

```
                                        foundCustRepository =
createACustomerRepositoryInIdentifyCustomer();
                                        newVarCreated = true;
                                        System.out.println("created object:
aCustomerRepository instanceId/primaryKey:
"+foundCustRepository.getInstanceId());
                                } else {
                                        //MODELING ERROR: object not
found and not supposed to create one System.out.println("aCustomerRepositorynot found and not supposed to create
one!!! Please update model and regenerate.");
                                        return;
                                } //else(createIfMissing)
                        } else {
                                System.out.println("found object:
aCustomerRepository instanceId/primaryKey:
"+foundCustRepository.getInstanceId());
                        }
                } else {
                        if(createIfMissing||create){
                                foundCustRepository =
createACustomerRepositoryInIdentifyCustomer();
                                newVarCreated=true;
                                System.out.println("created object:
+aCustomerRepository InstanceId/primaryKey:
"+foundCustRepository.getInstanceId());
                        }//if(createIfMissing)
                } //if(find)
                if(execdFind||newVarCreated){
                        //if here, either did a find or create
                        //NB NB NB Assign object to variable here
                        //NB NB NB something like:
                        aCustomerRepository = foundCustRepository;
                        if(newVarCreated){
                                //initialize the new var
initializeACustomerRepositoryInIdentifyCustomer();
                        }//if(newVarCreated)
                } //if(find||...)
            } //if(varName)

} //if(stageName)

if (stageName.equalsIgnoreCase("identifyRequestType")){
```

```java
            System.out.println("In ObjectPrep() for stage: "+stageName+" varName: "+varName);
                if (varName.equalsIgnoreCase("aProblemRecord")){
                    //NB NB FIND ANDOR CREATE
                    boolean newVarCreated = false;
                    boolean execdFind = false;
                    boolean find = false;
                    boolean findIfMissing = false;
                    boolean create = false;
                    boolean createIfMissing = true;
                    boolean createIfNotFound = false;
                    System.out.println("In ObjectPrep() for stage: "+stageName+" varName: "+varName);
                    System.out.println("\tfind: "+find+" findIfMissing: "+findIfMissing+" createIfNotFound: "+createIfNotFound);
                    System.out.println("\tcreate: "+create+" createIfMissing: "+createIfMissing);
                    ProblemRecord foundProblemRecord = null;

if(((find)||(findIfMissing&&aProblemRecord==null))&&!create){
                        execdFind=true;
                        foundProblemRecord = findAProblemRecordInIdentifyRequestType();
                            if(foundProblemRecord==null){
                                System.out.println("find returned null, create?");
                                // find failed, see if we were supposed to create one as a last resort
                                if(createIfNotFound||createIfMissing){
                                    foundProblemRecord = createAProblemRecordInIdentifyRequestType();
                                    newVarCreated = true;
                                    System.out.println("created object: aProblemRecord instanceId/primaryKey: "+foundProblemRecord.getInstanceId());
                                } else {
                                    //MODELING ERROR: object not found and not supposed to create one
                                    System.out.println("aProblemRecordnot found and not supposed to create one!!! Please update model and regenerate.");
                                    return;
                                } //else(createIfMissing)
                            } else {
```

```
                            System.out.println("found object:
aProblemRecord instanceId/primaryKey:
"+foundProblemRecord.getInstanceId());
                            }
                  } else {
                            if(createIfMissing||create){
                                      foundProblemRecord =
createAProblemRecordInIdentifyRequestType();
                                      newVarCreated=true;
                                      System.out.println("created object:
+aProblemRecord InstanceId/primaryKey:
"+foundProblemRecord.getInstanceId());
                            }//if(createIfMissing)
                  } //if(find)
                  if(execdFind||newVarCreated){
                            //if here, either did a find or create
                            //NB NB NB Assign object to variable here
                            //NB NB NB something like:
                            aProblemRecord = foundProblemRecord;
                            if(newVarCreated){
                                      //initialize the new var
initializeAProblemRecordInIdentifyRequestType();
                            }//if(newVarCreated)
                  } //if(find||...)
         } //if(varName)

if (varName.equalsIgnoreCase("aCustomerRecord")){
                  //NB NB FIND ANDOR CREATE
                  boolean newVarCreated = false;
                  boolean execdFind = false;
                  boolean find = false;
                  boolean findIfMissing = true;
                  boolean create = false;
                  boolean createIfMissing = false;
                  boolean createIfNotFound = false;
                  System.out.println("In ObjectPrep() for stage:
"+stageName+" varName: "+varName);
                  System.out.println("\tfind: "+find+" findIfMissing:
"+findIfMissing+" createIfNotFound: "+createIfNotFound);
                  System.out.println("\tcreate: "+create+" createIfMissing:
"+createIfMissing);
                  CustomerRecord foundCustomerRecord = null;

if(((find)||(findIfMissing&&aCustomerRecord==null))&&!create){
```

```
                                execdFind=true;
                                foundCustomerRecord =
findACustomerRecordInIdentifyRequestType();
                                        if(foundCustomerRecord==null){
                                                System.out.println("find returned null,
create?");
                                        // find failed, see if we were supposed to
create one as a last resort
                                                if(createIfNotFound||createIfMissing){
                                                        foundCustomerRecord =
createACustomerRecordInIdentifyRequestType();
                                                        newVarCreated = true;
                                                        System.out.println("created object:
aCustomerRecord instanceId/primaryKey:
"+foundCustomerRecord.getInstanceId());
                                                } else {
                                                        //MODELING ERROR: object not
found and not supposed to create one System.out.println("aCustomerRecordnot found and not supposed to create one!!!
Please update model and regenerate.");
                                                        return;
                                                } //else(createIfMissing)
                                        } else {
                                                System.out.println("found object:
aCustomerRecord instanceId/primaryKey:
"+foundCustomerRecord.getInstanceId());
                                        }
                                } else {
                                        if(createIfMissing||create){
                                                foundCustomerRecord =
createACustomerRecordInIdentifyRequestType();
                                                newVarCreated=true;
                                                System.out.println("created object:
+aCustomerRecord InstanceId/primaryKey:
"+foundCustomerRecord.getInstanceId());
                                        }//if(createIfMissing)
                                } //if(find)
                                if(execdFind||newVarCreated){
                                        //if here, either did a find or create
                                        //NB NB NB Assign object to variable here
                                        //NB NB NB something like:
                                        aCustomerRecord = foundCustomerRecord;
                                        if(newVarCreated){
                                                //initialize the new var
```

```
                initializeACustomerRecordInIdentifyRequestType();
                                }//if(newVarCreated)
                        } //if(findll...)
                } //if(varName)

} //if(stageName)

if (stageName.equalsIgnoreCase("verifyEntitlement")){
                System.out.println("In ObjectPrep() for stage: "+stageName+" varName: "+varName);
                        if (varName.equalsIgnoreCase("aProblemRecord")){
                                //NB NB FIND ANDOR CREATE
                                boolean newVarCreated = false;
                                boolean execdFind = false;
                                boolean find = false;
                                boolean findIfMissing = false;
                                boolean create = false;
                                boolean createIfMissing = false;
                                boolean createIfNotFound = false;
                                System.out.println("In ObjectPrep() for stage: "+stageName+" varName: "+varName);
                                System.out.println("\tfind: "+find+" findIfMissing: "+findIfMissing+" createIfNotFound: "+createIfNotFound);
                                System.out.println("\tcreate: "+create+" createIfMissing: "+createIfMissing);
                                ProblemRecord foundProblemRecord = null;

if(((find)ll(findIfMissing&&aProblemRecord==null))&&!create){
                                        execdFind=true;
                                        foundProblemRecord = findAProblemRecordInVerifyEntitlement();
                                        if(foundProblemRecord==null){
                                                System.out.println("find returned null, create?");
                                                // find failed, see if we were supposed to create one as a last resort
                                                if(createIfNotFoundllcreateIfMissing){
                                                        foundProblemRecord = createAProblemRecordInVerifyEntitlement();
                                                        newVarCreated = true;
                                                        System.out.println("created object: aProblemRecord instanceId/primaryKey: "+foundProblemRecord.getInstanceId());
                                                } else {
```

```
                                            //MODELING ERROR: object not
found and not supposed to create one System.out.println("aProblemRecordnot found and not supposed to create one!!!
Please update model and regenerate.");
                                            return;
                                    } //else(createIfMissing)
                            } else {
                                    System.out.println("found object:
aProblemRecord instanceId/primaryKey:
"+foundProblemRecord.getInstanceId());
                            }
                    } else {
                            if(createIfMissing||create){
                                    foundProblemRecord =
createAProblemRecordInVerifyEntitlement();
                                            newVarCreated=true;
                                            System.out.println("created object:
+aProblemRecord InstanceId/primaryKey:
"+foundProblemRecord.getInstanceId());
                                    }//if(createIfMissing)
                    } //if(find)
                    if(execdFind||newVarCreated){
                            //if here, either did a find or create
                            //NB NB NB Assign object to variable here
                            //NB NB NB something like:
                            aProblemRecord = foundProblemRecord;
                            if(newVarCreated){
                                    //initialize the new var initializeAProblemRecordInVerifyEntitlement();
                            }//if(newVarCreated)
                    } //if(find||...)
            } //if(varName)

if (varName.equalsIgnoreCase("aCustomerRecord")){
                    //NB NB FIND ANDOR CREATE
                    boolean newVarCreated = false;
                    boolean execdFind = false;
                    boolean find = false;
                    boolean findIfMissing = false;
                    boolean create = false;
                    boolean createIfMissing = false;
                    boolean createIfNotFound = false;
```

```
                System.out.println("In ObjectPrep() for stage:
"+stageName+" varName: "+varName);
                System.out.println("\tfind: "+find+" findIfMissing:
"+findIfMissing+" createIfNotFound: "+createIfNotFound);
                System.out.println("\tcreate: "+create+" createIfMissing:
"+createIfMissing);
                CustomerRecord foundCustomerRecord = null;

if(((find)||(findIfMissing&&aCustomerRecord==null))&&!create){
                    execdFind=true;
                    foundCustomerRecord =
findACustomerRecordInVerifyEntitlement();
                    if(foundCustomerRecord==null){
                        System.out.println("find returned null,
create?");
                        // find failed, see if we were supposed to
create one as a last resort
                        if(createIfNotFound||createIfMissing){
                            foundCustomerRecord =
createACustomerRecordInVerifyEntitlement();
                            newVarCreated = true;
                            System.out.println("created object:
aCustomerRecord instanceId/primaryKey:
"+foundCustomerRecord.getInstanceId());
                        } else {
                            //MODELING ERROR: object not
found and not supposed to create one System.out.println("aCustomerRecordnot found and not supposed to create one!!!
Please update model and regenerate.");
                            return;
                        } //else(createIfMissing)
                    } else {
                        System.out.println("found object:
aCustomerRecord instanceId/primaryKey:
"+foundCustomerRecord.getInstanceId());
                    }
                } else {
                    if(createIfMissing||create){
                        foundCustomerRecord =
createACustomerRecordInVerifyEntitlement();
                        newVarCreated=true;
                        System.out.println("created object:
+aCustomerRecord InstanceId/primaryKey:
"+foundCustomerRecord.getInstanceId());
```

```
                    }//if(createIfMissing)
            } //if(find)
            if(execdFind||newVarCreated){
                    //if here, either did a find or create
                    //NB NB NB Assign object to variable here
                    //NB NB NB something like:
                    aCustomerRecord = foundCustomerRecord;
                    if(newVarCreated){
                            //initialize the new var initializeACustomerRecordInVerifyEntitlement();
                    }//if(newVarCreated)
            } //if(find||...)
        } //if(varName)

} //if(stageName)

if (stageName.equalsIgnoreCase("receiveRejection")){
            System.out.println("In ObjectPrep() for stage: "+stageName+" varName: "+varName);

} //if(stageName)

if (stageName.equalsIgnoreCase("receiveResolution")){
            System.out.println("In ObjectPrep() for stage: "+stageName+" varName: "+varName);

} //if(stageName)

if (stageName.equalsIgnoreCase("getProblemDescription")){
            System.out.println("In ObjectPrep() for stage: "+stageName+" varName: "+varName);
            if (varName.equalsIgnoreCase("aProblemRecord")){
                    //NB NB FIND ANDOR CREATE
                    boolean newVarCreated = false;
                    boolean execdFind = false;
                    boolean find = false;
                    boolean findIfMissing = false;
                    boolean create = false;
                    boolean createIfMissing = false;
                    boolean createIfNotFound = false;
                    System.out.println("In ObjectPrep() for stage: "+stageName+" varName: "+varName);
                    System.out.println("\tfind: "+find+" findIfMissing: "+findIfMissing+" createIfNotFound: "+createIfNotFound);
```

```
                        System.out.println("\tcreate: "+create+" createIfMissing:
"+createIfMissing);
                        ProblemRecord foundProblemRecord = null;

if(((find)||(findIfMissing&&aProblemRecord==null))&&!create){
                                execdFind=true;
                                foundProblemRecord =
findAProblemRecordInGetProblemDescription();
                                if(foundProblemRecord==null){
                                        System.out.println("find returned null,
create?");
                                        // find failed, see if we were supposed to
create one as a last resort
                                        if(createIfNotFound||createIfMissing){
                                                foundProblemRecord =
createAProblemRecordInGetProblemDescription();
                                                newVarCreated = true;
                                                System.out.println("created object:
aProblemRecord instanceId/primaryKey:
"+foundProblemRecord.getInstanceId());
                                        } else {
                                                //MODELING ERROR: object not
found and not supposed to create one System.out.println("aProblemRecordnot found and not supposed to create one!!!
Please update model and regenerate.");
                                                return;
                                        } //else(createIfMissing)
                                } else {
                                        System.out.println("found object:
aProblemRecord instanceId/primaryKey:
"+foundProblemRecord.getInstanceId());
                                }
                        } else {
                                if(createIfMissing||create){
                                        foundProblemRecord =
createAProblemRecordInGetProblemDescription();
                                        newVarCreated=true;
                                        System.out.println("created object:
+aProblemRecord InstanceId/primaryKey:
"+foundProblemRecord.getInstanceId());
                                }//if(createIfMissing)
                        } //if(find)
                        if(execdFind||newVarCreated){
                                //if here, either did a find or create
```

```
                    //NB NB NB Assign object to variable here
                    //NB NB NB something like:
                    aProblemRecord = foundProblemRecord;
                    if(newVarCreated){
                            //initialize the new var initializeAProblemRecordInGetProblemDescription();
                            }//if(newVarCreated)
                    } //if(findll...)
            } //if(varName)

if (varName.equalsIgnoreCase("aCustomerRecord")){
                        //NB NB FIND ANDOR CREATE
                        boolean newVarCreated = false;
                        boolean execdFind = false;
                        boolean find = false;
                        boolean findIfMissing = false;
                        boolean create = false;
                        boolean createIfMissing = false;
                        boolean createIfNotFound = false;
                        System.out.println("In ObjectPrep() for stage:
"+stageName+" varName: "+varName);
                        System.out.println("\tfind: "+find+" findIfMissing:
"+findIfMissing+" createIfNotFound: "+createIfNotFound);
                        System.out.println("\tcreate: "+create+" createIfMissing:
"+createIfMissing);
                        CustomerRecord foundCustomerRecord = null;

if(((find)||(findIfMissing&&aCustomerRecord==null))&&!create){
                                execdFind=true;
                                foundCustomerRecord =
findACustomerRecordInGetProblemDescription();
                                if(foundCustomerRecord==null){
                                        System.out.println("find returned null,
create?");
                                        // find failed, see if we were supposed to
create one as a last resort
                                        if(createIfNotFound||createIfMissing){
                                                foundCustomerRecord =
createACustomerRecordInGetProblemDescription();
                                                newVarCreated = true;
                                                System.out.println("created object:
aCustomerRecord instanceId/primaryKey:
"+foundCustomerRecord.getInstanceId());
                                        } else {
```

```
                                        //MODELING ERROR: object not
found and not supposed to create one System.out.println("aCustomerRecordnot found and not supposed to create one!!!
Please update model and regenerate.");
                                        return;
                            } //else(createIfMissing)
                    } else {
                                    System.out.println("found object:
aCustomerRecord instanceId/primaryKey:
"+foundCustomerRecord.getInstanceId());
                            }
                    } else {
                            if(createIfMissing||create){
                                    foundCustomerRecord =
createACustomerRecordInGetProblemDescription();
                                    newVarCreated=true;
                                    System.out.println("created object:
+aCustomerRecord InstanceId/primaryKey:
"+foundCustomerRecord.getInstanceId());
                            }//if(createIfMissing)
                    } //if(find)
                    if(execdFind||newVarCreated){
                            //if here, either did a find or create
                            //NB NB NB Assign object to variable here
                            //NB NB NB something like:
                            aCustomerRecord = foundCustomerRecord;
                            if(newVarCreated){
                                    //initialize the new var
initializeACustomerRecordInGetProblemDescription();
                            }//if(newVarCreated)
                    } //if(find||...)
            } //if(varName)

} //if(stageName)

if (stageName.equalsIgnoreCase("level1HasEasyAnswer")){
            System.out.println("In ObjectPrep() for stage: "+stageName+"
varName: "+varName);
            if (varName.equalsIgnoreCase("aProblemRecord")){
                    //NB NB FIND ANDOR CREATE
                    boolean newVarCreated = false;
                    boolean execdFind = false;
                    boolean find = false;
```

```
                boolean findIfMissing = false;
                boolean create = false;
                boolean createIfMissing = false;
                boolean createIfNotFound = false;
                System.out.println("In ObjectPrep() for stage:
"+stageName+" varName: "+varName);
                System.out.println("\tfind: "+find+" findIfMissing:
"+findIfMissing+" createIfNotFound: "+createIfNotFound);
                System.out.println("\tcreate: "+create+" createIfMissing:
"+createIfMissing);
                ProblemRecord foundProblemRecord = null;

if(((find)||(findIfMissing&&aProblemRecord==null))&&!create){
                        execdFind=true;
                        foundProblemRecord =
findAProblemRecordInLevel1HasEasyAnswer();
                        if(foundProblemRecord==null){
                                System.out.println("find returned null,
create?");
                                // find failed, see if we were supposed to
create one as a last resort
                                if(createIfNotFound||createIfMissing){
                                        foundProblemRecord =
createAProblemRecordInLevel1HasEasyAnswer();
                                        newVarCreated = true;
                                        System.out.println("created object:
aProblemRecord instanceId/primaryKey:
"+foundProblemRecord.getInstanceId());
                                } else {
                                        //MODELING ERROR: object not
found and not supposed to create one System.out.println("aProblemRecordnot found and not supposed to create one!!!
Please update model and regenerate.");
                                        return;
                                } //else(createIfMissing)
                        } else {
                                System.out.println("found object:
aProblemRecord instanceId/primaryKey:
"+foundProblemRecord.getInstanceId());
                        }
                } else {
                        if(createIfMissing||create){
                                foundProblemRecord =
createAProblemRecordInLevel1HasEasyAnswer();
```

```
                                        newVarCreated=true;
                                        System.out.println("created object:
+aProblemRecord InstanceId/primaryKey:
"+foundProblemRecord.getInstanceId());
                                }//if(createIfMissing)
                        } //if(find)
                        if(execdFind||newVarCreated){
                                //if here, either did a find or create
                                //NB NB NB Assign object to variable here
                                //NB NB NB something like:
                                aProblemRecord = foundProblemRecord;
                                if(newVarCreated){
                                        //initialize the new var initializeAProblemRecordInLevel1HasEasyAnswer();
                                }//if(newVarCreated)
                        } //if(findII...)
                } //if(varName)

if (varName.equalsIgnoreCase("aCustomerRecord")){
                        //NB NB FIND ANDOR CREATE
                        boolean newVarCreated = false;
                        boolean execdFind = false;
                        boolean find = false;
                        boolean findIfMissing = false;
                        boolean create = false;
                        boolean createIfMissing = false;
                        boolean createIfNotFound = false;
                        System.out.println("In ObjectPrep() for stage:
"+stageName+" varName: "+varName);
                        System.out.println("\tfind: "+find+" findIfMissing:
"+findIfMissing+" createIfNotFound: "+createIfNotFound);
                        System.out.println("\tcreate: "+create+" createIfMissing:
"+createIfMissing);
                        CustomerRecord foundCustomerRecord = null;

if(((find)||(findIfMissing&&aCustomerRecord==null))&&!create){
                                execdFind=true;
                                foundCustomerRecord =
findACustomerRecordInLevel1HasEasyAnswer();
                                if(foundCustomerRecord==null){
                                        System.out.println("find returned null,
create?");
                                        // find failed, see if we were supposed to
create one as a last resort
```

```
                                if(createIfNotFound||createIfMissing){
                                        foundCustomerRecord =
createACustomerRecordInLevel1HasEasyAnswer();
                                        newVarCreated = true;
                                        System.out.println("created object:
aCustomerRecord instanceId/primaryKey:
"+foundCustomerRecord.getInstanceId());
                                } else {
                                        //MODELING ERROR: object not
found and not supposed to create one System.out.println("aCustomerRecordnot found and not supposed to create one!!!
Please update model and regenerate.");
                                        return;
                                } //else(createIfMissing)
                        } else {
                                System.out.println("found object:
aCustomerRecord instanceId/primaryKey:
"+foundCustomerRecord.getInstanceId());
                        }
                } else {
                        if(createIfMissing||create){
                                foundCustomerRecord =
createACustomerRecordInLevel1HasEasyAnswer();
                                        newVarCreated=true;
                                        System.out.println("created object:
+aCustomerRecord InstanceId/primaryKey:
"+foundCustomerRecord.getInstanceId());
                        }//if(createIfMissing)
                } //if(find)
                if(execdFind||newVarCreated){
                        //if here, either did a find or create
                        //NB NB NB Assign object to variable here
                        //NB NB NB something like:
                        aCustomerRecord = foundCustomerRecord;
                        if(newVarCreated){
                                //initialize the new var
initializeACustomerRecordInLevel1HasEasyAnswer();
                        }//if(newVarCreated)
                } //if(find||...)
        } //if(varName)

} //if(stageName)
```

```
            if (stageName.equalsIgnoreCase("findRecordOfSimilarProblem")){
                    System.out.println("In ObjectPrep() for stage: "+stageName+"
varName: "+varName);
                        if (varName.equalsIgnoreCase("aProblemRecord")){
                                //NB NB FIND ANDOR CREATE
                                boolean newVarCreated = false;
                                boolean execdFind = false;
                                boolean find = false;
                                boolean findIfMissing = false;
                                boolean create = false;
                                boolean createIfMissing = false;
                                boolean createIfNotFound = false;
                                System.out.println("In ObjectPrep() for stage:
"+stageName+" varName: "+varName);
                                System.out.println("\tfind: "+find+" findIfMissing:
"+findIfMissing+" createIfNotFound: "+createIfNotFound);
                                System.out.println("\tcreate: "+create+" createIfMissing:
"+createIfMissing);
                                ProblemRecord foundProblemRecord = null;

if(((find)||(findIfMissing&&aProblemRecord==null))&&!create){
                                        execdFind=true;
                                        foundProblemRecord =
findAProblemRecordInFindRecordOfSimilarProblem();
                                        if(foundProblemRecord==null){
                                                System.out.println("find returned null,
create?");
                                                // find failed, see if we were supposed to
create one as a last resort
                                                if(createIfNotFound||createIfMissing){
                                                        foundProblemRecord =
createAProblemRecordInFindRecordOfSimilarProblem();
                                                        newVarCreated = true;
                                                        System.out.println("created object:
aProblemRecord instanceId/primaryKey:
"+foundProblemRecord.getInstanceId());
                                                } else {
                                                        //MODELING ERROR: object not
found and not supposed to create one System.out.println("aProblemRecordnot found and not supposed to create one!!!
Please update model and regenerate.");
                                                        return;
                                                } //else(createIfMissing)
                                        } else {
```

```
                                        System.out.println("found object:
aProblemRecord instanceId/primaryKey:
"+foundProblemRecord.getInstanceId());
                                }
                        } else {
                                if(createIfMissing||create){
                                        foundProblemRecord =
createAProblemRecordInFindRecordOfSimilarProblem();
                                        newVarCreated=true;
                                        System.out.println("created object:
+aProblemRecord InstanceId/primaryKey:
"+foundProblemRecord.getInstanceId());
                                }//if(createIfMissing)
                        } //if(find)
                        if(execdFind||newVarCreated){
                                //if here, either did a find or create
                                //NB NB NB Assign object to variable here
                                //NB NB NB something like:
                                aProblemRecord = foundProblemRecord;
                                if(newVarCreated){
                                        //initialize the new var initializeAProblemRecordInFindRecordOfSimilarProblem();
                                }//if(newVarCreated)
                        } //if(find||...)
                } //if(varName)

if (varName.equalsIgnoreCase("aCustomerRecord")){
                        //NB NB FIND ANDOR CREATE
                        boolean newVarCreated = false;
                        boolean execdFind = false;
                        boolean find = false;
                        boolean findIfMissing = false;
                        boolean create = false;
                        boolean createIfMissing = false;
                        boolean createIfNotFound = false;
                        System.out.println("In ObjectPrep() for stage:
"+stageName+" varName: "+varName);
                        System.out.println("\tfind: "+find+" findIfMissing:
"+findIfMissing+" createIfNotFound: "+createIfNotFound);
                        System.out.println("\tcreate: "+create+" createIfMissing:
"+createIfMissing);
                        CustomerRecord foundCustomerRecord = null;

if(((find)||(findIfMissing&&aCustomerRecord==null))&&!create){
```

```
                              execdFind=true;
                              foundCustomerRecord =
findACustomerRecordInFindRecordOfSimilarProblem();
                                       if(foundCustomerRecord==null){
                                              System.out.println("find returned null,
create?");
                                              // find failed, see if we were supposed to
create one as a last resort
                                              if(createIfNotFound||createIfMissing){
                                                     foundCustomerRecord =
createACustomerRecordInFindRecordOfSimilarProblem();
                                                     newVarCreated = true;
                                                     System.out.println("created object:
aCustomerRecord instanceId/primaryKey:
"+foundCustomerRecord.getInstanceId());
                                              } else {
                                                     //MODELING ERROR: object not
found and not supposed to create one System.out.println("aCustomerRecordnot found and not supposed to create one!!!
Please update model and regenerate.");
                                                     return;
                                              } //else(createIfMissing)
                                       } else {
                                              System.out.println("found object:
aCustomerRecord instanceId/primaryKey:
"+foundCustomerRecord.getInstanceId());
                                       }
                               } else {
                                       if(createIfMissing||create){
                                              foundCustomerRecord =
createACustomerRecordInFindRecordOfSimilarProblem();
                                              newVarCreated=true;
                                              System.out.println("created object:
+aCustomerRecord InstanceId/primaryKey:
"+foundCustomerRecord.getInstanceId());
                                       }//if(createIfMissing)
                               } //if(find)
                               if(execdFind||newVarCreated){
                                       //if here, either did a find or create
                                       //NB NB NB Assign object to variable here
                                       //NB NB NB something like:
                                       aCustomerRecord = foundCustomerRecord;
                                       if(newVarCreated){
                                              //initialize the new var
```

```
initializeACustomerRecordInFindRecordOfSimilarProblem();
                        }//if(newVarCreated)
                }  //if(findll...)
        } //if(varName)

} //if(stageName)

if
(stageName.equalsIgnoreCase("determineComponentAndWriteUpProblem")){
                System.out.println("In ObjectPrep() for stage: "+stageName+"
varName: "+varName);
                if (varName.equalsIgnoreCase("aProblemRecord")){
                        //NB NB FIND ANDOR CREATE
                        boolean newVarCreated = false;
                        boolean execdFind = false;
                        boolean find = false;
                        boolean findIfMissing = false;
                        boolean create = false;
                        boolean createIfMissing = false;
                        boolean createIfNotFound = false;
                        System.out.println("In ObjectPrep() for stage:
"+stageName+" varName: "+varName);
                        System.out.println("\tfind: "+find+" findIfMissing:
"+findIfMissing+" createIfNotFound: "+createIfNotFound);
                        System.out.println("\tcreate: "+create+" createIfMissing:
"+createIfMissing);
                        ProblemRecord foundProblemRecord = null;

if(((find)||(findIfMissing&&aProblemRecord==null))&&!create){
                                execdFind=true;
                                foundProblemRecord =
findAProblemRecordInDetermineComponentAndWriteUpProblem();
                                if(foundProblemRecord==null){
                                        System.out.println("find returned null,
create?");
                                        // find failed, see if we were supposed to
create one as a last resort
                                        if(createIfNotFound||createIfMissing){
                                                foundProblemRecord =
createAProblemRecordInDetermineComponentAndWriteUpProblem();
                                                newVarCreated = true;
                                                System.out.println("created object:
aProblemRecord instanceId/primaryKey:
"+foundProblemRecord.getInstanceId());
```

```
                    } else {
                            //MODELING ERROR: object not
found and not supposed to create one System.out.println("aProblemRecordnot found and not supposed to create one!!!
Please update model and regenerate.");
                                    return;
                            } //else(createIfMissing)
                    } else {
                            System.out.println("found object:
aProblemRecord instanceId/primaryKey:
"+foundProblemRecord.getInstanceId());
                    }
            } else {
                    if(createIfMissing||create){
                            foundProblemRecord =
createAProblemRecordInDetermineComponentAndWriteUpProblem();
                                    newVarCreated=true;
                            System.out.println("created object:
+aProblemRecord InstanceId/primaryKey:
"+foundProblemRecord.getInstanceId());
                    }//if(createIfMissing)
            } //if(find)
            if(execdFind||newVarCreated){
                    //if here, either did a find or create
                    //NB NB NB Assign object to variable here
                    //NB NB NB something like:
                    aProblemRecord = foundProblemRecord;
                    if(newVarCreated){
                            //initialize the new var
initializeAProblemRecordInDetermineComponentAndWriteUpProblem();
                    }//if(newVarCreated)
            } //if(find||...)
    } //if(varName)

if (varName.equalsIgnoreCase("aCustomerRecord")){
                    //NB NB FIND ANDOR CREATE
                    boolean newVarCreated = false;
                    boolean execdFind = false;
                    boolean find = false;
                    boolean findIfMissing = false;
                    boolean create = false;
                    boolean createIfMissing = false;
                    boolean createIfNotFound = false;
```

```
                System.out.println("In ObjectPrep() for stage:
"+stageName+" varName: "+varName);
                System.out.println("\tfind: "+find+" findIfMissing:
"+findIfMissing+" createIfNotFound: "+createIfNotFound);
                System.out.println("\tcreate: "+create+" createIfMissing:
"+createIfMissing);
                CustomerRecord foundCustomerRecord = null;

if(((find)||(findIfMissing&&aCustomerRecord==null))&&!create){
                        execdFind=true;
                        foundCustomerRecord =
findACustomerRecordInDetermineComponentAndWriteUpProblem();
                        if(foundCustomerRecord==null){
                                System.out.println("find returned null,
create?");
                                // find failed, see if we were supposed to
create one as a last resort
                                if(createIfNotFound||createIfMissing){
                                        foundCustomerRecord =
createACustomerRecordInDetermineComponentAndWriteUpProblem();
                                        newVarCreated = true;
                                        System.out.println("created object:
aCustomerRecord instanceId/primaryKey:
"+foundCustomerRecord.getInstanceId());
                                } else {
                                        //MODELING ERROR: object not
found and not supposed to create one System.out.println("aCustomerRecordnot found and not supposed to create one!!!
Please update model and regenerate.");
                                        return;
                                } //else(createIfMissing)
                        } else {
                                System.out.println("found object:
aCustomerRecord instanceId/primaryKey:
"+foundCustomerRecord.getInstanceId());
                        }
                } else {
                        if(createIfMissing||create){
                                foundCustomerRecord =
createACustomerRecordInDetermineComponentAndWriteUpProblem();
                                newVarCreated=true;
                                System.out.println("created object:
+aCustomerRecord InstanceId/primaryKey:
"+foundCustomerRecord.getInstanceId());
```

```
                            }//if(createIfMissing)
                    } //if(find)
                    if(execdFind||newVarCreated){
                            //if here, either did a find or create
                            //NB NB NB Assign object to variable here
                            //NB NB NB something like:
                            aCustomerRecord = foundCustomerRecord;
                            if(newVarCreated){
                                    //initialize the new var initializeACustomerRecordInDetermineComponentAndWriteUpProblem();
                            }//if(newVarCreated)
                    } //if(find||...)
            } //if(varName)

} //if(stageName)

if (stageName.equalsIgnoreCase("tryToDealWithTheProblem")){
                System.out.println("In ObjectPrep() for stage: "+stageName+"
varName: "+varName);
                if (varName.equalsIgnoreCase("aCustomerRecord")){
                        //NB NB FIND ANDOR CREATE
                        boolean newVarCreated = false;
                        boolean execdFind = false;
                        boolean find = false;
                        boolean findIfMissing = false;
                        boolean create = false;
                        boolean createIfMissing = false;
                        boolean createIfNotFound = false;
                        System.out.println("In ObjectPrep() for stage:
"+stageName+" varName: "+varName);
                        System.out.println("\tfind: "+find+" findIfMissing:
"+findIfMissing+" createIfNotFound: "+createIfNotFound);
                        System.out.println("\tcreate: "+create+" createIfMissing:
"+createIfMissing);
                        CustomerRecord foundCustomerRecord = null;

if(((find)||(findIfMissing&&aCustomerRecord==null))&&!create){
                                execdFind=true;
                                foundCustomerRecord =
findACustomerRecordInTryToDealWithTheProblem();
                                if(foundCustomerRecord==null){
                                        System.out.println("find returned null,
create?");
```

```
                                        // find failed, see if we were supposed to
create one as a last resort
                                        if(createIfNotFound||createIfMissing){
                                                foundCustomerRecord =
createACustomerRecordInTryToDealWithTheProblem();
                                                newVarCreated = true;
                                                System.out.println("created object:
aCustomerRecord instanceId/primaryKey:
"+foundCustomerRecord.getInstanceId());
                                        } else {
                                                //MODELING ERROR: object not
found and not supposed to create one System.out.println("aCustomerRecordnot found and not supposed to create one!!!
Please update model and regenerate.");
                                                return;
                                        } //else(createIfMissing)
                                } else {
                                        System.out.println("found object:
aCustomerRecord instanceId/primaryKey:
"+foundCustomerRecord.getInstanceId());
                                }
                        } else {
                                if(createIfMissing||create){
                                        foundCustomerRecord =
createACustomerRecordInTryToDealWithTheProblem();
                                        newVarCreated=true;
                                        System.out.println("created object:
+aCustomerRecord InstanceId/primaryKey:
"+foundCustomerRecord.getInstanceId());
                                }//if(createIfMissing)
                        } //if(find)
                        if(execdFind||newVarCreated){
                                //if here, either did a find or create
                                //NB NB NB Assign object to variable here
                                //NB NB NB something like:
                                aCustomerRecord = foundCustomerRecord;
                                if(newVarCreated){
                                        //initialize the new var initializeACustomerRecordInTryToDealWithTheProblem();
                                }//if(newVarCreated)
                        } //if(find||...)
                } //if(varName)
```

```
                if (varName.equalsIgnoreCase("aProblemRecord")){
                        //NB NB FIND ANDOR CREATE
                        boolean newVarCreated = false;
                        boolean execdFind = false;
                        boolean find = false;
                        boolean findIfMissing = false;
                        boolean create = false;
                        boolean createIfMissing = false;
                        boolean createIfNotFound = false;
                        System.out.println("In ObjectPrep() for stage: "+stageName+" varName: "+varName);
                        System.out.println("\tfind: "+find+" findIfMissing: "+findIfMissing+" createIfNotFound: "+createIfNotFound);
                        System.out.println("\tcreate: "+create+" createIfMissing: "+createIfMissing);
                        ProblemRecord foundProblemRecord = null;

if(((find)||(findIfMissing&&aProblemRecord==null))&&!create){
                                execdFind=true;
                                foundProblemRecord = findAProblemRecordInTryToDealWithTheProblem();
                                if(foundProblemRecord==null){
                                        System.out.println("find returned null, create?");
                                        // find failed, see if we were supposed to create one as a last resort
                                        if(createIfNotFound||createIfMissing){
                                                foundProblemRecord = createAProblemRecordInTryToDealWithTheProblem();
                                                newVarCreated = true;
                                                System.out.println("created object: aProblemRecord instanceId/primaryKey: "+foundProblemRecord.getInstanceId());
                                        } else {
                                                //MODELING ERROR: object not found and not supposed to create one
                                                System.out.println("aProblemRecordnot found and not supposed to create one!!! Please update model and regenerate.");
                                                return;
                                        } //else(createIfMissing)
                                } else {
                                        System.out.println("found object: aProblemRecord instanceId/primaryKey: "+foundProblemRecord.getInstanceId());
```

```
                    }
            } else {
                    if(createIfMissing||create){
                            foundProblemRecord =
createAProblemRecordInTryToDealWithTheProblem();
                                    newVarCreated=true;
                                    System.out.println("created object:
+aProblemRecord InstanceId/primaryKey:
"+foundProblemRecord.getInstanceId());
                            }//if(createIfMissing)
                    } //if(find)
                    if(execdFind||newVarCreated){
                            //if here, either did a find or create
                            //NB NB NB Assign object to variable here
                            //NB NB NB something like:
                            aProblemRecord = foundProblemRecord;
                            if(newVarCreated){
                                    //initialize the new var initializeAProblemRecordInTryToDealWithTheProblem();
                            }//if(newVarCreated)
                    } //if(find||...)
            } //if(varName)

} //if(stageName)

if (stageName.equalsIgnoreCase("isItANewProblem")){
            System.out.println("In ObjectPrep() for stage: "+stageName+"
varName: "+varName);
            if (varName.equalsIgnoreCase("aCustomerRecord")){
                    //NB NB FIND ANDOR CREATE
                    boolean newVarCreated = false;
                    boolean execdFind = false;
                    boolean find = false;
                    boolean findIfMissing = false;
                    boolean create = false;
                    boolean createIfMissing = false;
                    boolean createIfNotFound = false;
                    System.out.println("In ObjectPrep() for stage:
"+stageName+" varName: "+varName);
                    System.out.println("\tfind: "+find+" findIfMissing:
"+findIfMissing+" createIfNotFound: "+createIfNotFound);
                    System.out.println("\tcreate: "+create+" createIfMissing:
"+createIfMissing);
                    CustomerRecord foundCustomerRecord = null;
```

```
if(((find)||(findIfMissing&&aCustomerRecord==null))&&!create){
    execdFind=true;
    foundCustomerRecord = findACustomerRecordInIsItANewProblem();
    if(foundCustomerRecord==null){
        System.out.println("find returned null, create?");
        // find failed, see if we were supposed to create one as a last resort
        if(createIfNotFound||createIfMissing){
            foundCustomerRecord = createACustomerRecordInIsItANewProblem();
            newVarCreated = true;
            System.out.println("created object: aCustomerRecord instanceId/primaryKey: "+foundCustomerRecord.getInstanceId());
        } else {
            //MODELING ERROR: object not found and not supposed to create one
            System.out.println("aCustomerRecordnot found and not supposed to create one!!! Please update model and regenerate.");
            return;
        } //else(createIfMissing)
    } else {
        System.out.println("found object: aCustomerRecord instanceId/primaryKey: "+foundCustomerRecord.getInstanceId());
    }
} else {
    if(createIfMissing||create){
        foundCustomerRecord = createACustomerRecordInIsItANewProblem();
        newVarCreated=true;
        System.out.println("created object: +aCustomerRecord InstanceId/primaryKey: "+foundCustomerRecord.getInstanceId());
    }//if(createIfMissing)
} //if(find)
if(execdFind||newVarCreated){
    //if here, either did a find or create
    //NB NB NB Assign object to variable here
    //NB NB NB something like:
    aCustomerRecord = foundCustomerRecord;
```

```
                                if(newVarCreated){
                                        //initialize the new var initializeACustomerRecordInIsItANewProblem();
                                        }//if(newVarCreated)
                                } //if(findll...)
                        } //if(varName)

if (varName.equalsIgnoreCase("aProblemRecord")){
                                //NB NB FIND ANDOR CREATE
                                boolean newVarCreated = false;
                                boolean execdFind = false;
                                boolean find = false;
                                boolean findIfMissing = false;
                                boolean create = false;
                                boolean createIfMissing = false;
                                boolean createIfNotFound = false;
                                System.out.println("In ObjectPrep() for stage: "+stageName+" varName: "+varName);
                                System.out.println("\tfind: "+find+" findIfMissing: "+findIfMissing+" createIfNotFound: "+createIfNotFound);
                                System.out.println("\tcreate: "+create+" createIfMissing: "+createIfMissing);
                                ProblemRecord foundProblemRecord = null;

if(((find)||(findIfMissing&&aProblemRecord==null))&&!create){
                                        execdFind=true;
                                        foundProblemRecord = findAProblemRecordInIsItANewProblem();
                                        if(foundProblemRecord==null){
                                                System.out.println("find returned null, create?");
                                                // find failed, see if we were supposed to create one as a last resort
                                                if(createIfNotFound||createIfMissing){
                                                        foundProblemRecord = createAProblemRecordInIsItANewProblem();
                                                        newVarCreated = true;
                                                        System.out.println("created object: aProblemRecord instanceId/primaryKey: "+foundProblemRecord.getInstanceId());
                                                } else {
                                                        //MODELING ERROR: object not found and not supposed to create one
```

```
System.out.println("aProblemRecordnot found and not supposed to create one!!!
Please update model and regenerate.");
                                        return;
                        } //else(createIfMissing)
                } else {
                        System.out.println("found object:
aProblemRecord instanceId/primaryKey:
"+foundProblemRecord.getInstanceId());
                        }
                } else {
                        if(createIfMissing||create){
                                foundProblemRecord =
createAProblemRecordInIsItANewProblem();
                                newVarCreated=true;
                                System.out.println("created object:
+aProblemRecord InstanceId/primaryKey:
"+foundProblemRecord.getInstanceId());
                        }//if(createIfMissing)
                } //if(find)
                if(execdFind||newVarCreated){
                        //if here, either did a find or create
                        //NB NB NB Assign object to variable here
                        //NB NB NB something like:
                        aProblemRecord = foundProblemRecord;
                        if(newVarCreated){
                                //initialize the new var initializeAProblemRecordInIsItANewProblem();
                        }//if(newVarCreated)
                } //if(find||...)
        } //if(varName)

} //if(stageName)

if (stageName.equalsIgnoreCase("attachToAPAR")){
            System.out.println("In ObjectPrep() for stage: "+stageName+"
varName: "+varName);
                if (varName.equalsIgnoreCase("aProblemRecord")){
                        //NB NB FIND ANDOR CREATE
                        boolean newVarCreated = false;
                        boolean execdFind = false;
                        boolean find = false;
                        boolean findIfMissing = false;
                        boolean create = false;
```

```
                boolean createIfMissing = false;
                boolean createIfNotFound = false;
                System.out.println("In ObjectPrep() for stage: "+stageName+" varName: "+varName);
                System.out.println("\tfind: "+find+" findIfMissing: "+findIfMissing+" createIfNotFound: "+createIfNotFound);
                System.out.println("\tcreate: "+create+" createIfMissing: "+createIfMissing);
                ProblemRecord foundProblemRecord = null;

if(((find)||(findIfMissing&&aProblemRecord==null))&&!create){
                        execdFind=true;
                        foundProblemRecord = findAProblemRecordInAttachToAPAR();
                        if(foundProblemRecord==null){
                                System.out.println("find returned null, create?");
                                // find failed, see if we were supposed to create one as a last resort
                                if(createIfNotFound||createIfMissing){
                                        foundProblemRecord = createAProblemRecordInAttachToAPAR();
                                        newVarCreated = true;
                                        System.out.println("created object: aProblemRecord instanceId/primaryKey: "+foundProblemRecord.getInstanceId());
                                } else {
                                        //MODELING ERROR: object not found and not supposed to create one
                                        System.out.println("aProblemRecordnot found and not supposed to create one!!! Please update model and regenerate.");
                                        return;
                                } //else(createIfMissing)
                        } else {
                                System.out.println("found object: aProblemRecord instanceId/primaryKey: "+foundProblemRecord.getInstanceId());
                        }
                } else {
                        if(createIfMissing||create){
                                foundProblemRecord = createAProblemRecordInAttachToAPAR();
                                newVarCreated=true;
```

```
                                        System.out.println("created object:
+aProblemRecord InstanceId/primaryKey:
"+foundProblemRecord.getInstanceId());
                            }//if(createIfMissing)
                    } //if(find)
                    if(execdFind||newVarCreated){
                            //if here, either did a find or create
                            //NB NB NB Assign object to variable here
                            //NB NB NB something like:
                            aProblemRecord = foundProblemRecord;
                            if(newVarCreated){
                                    //initialize the new var initializeAProblemRecordInAttachToAPAR();
                            }//if(newVarCreated)
                    } //if(find||...)
            } //if(varName)

if (varName.equalsIgnoreCase("anAPAR")){
                    //NB NB FIND ANDOR CREATE
                    boolean newVarCreated = false;
                    boolean execdFind = false;
                    boolean find = false;
                    boolean findIfMissing = false;
                    boolean create = false;
                    boolean createIfMissing = true;
                    boolean createIfNotFound = false;
                    System.out.println("In ObjectPrep() for stage:
"+stageName+" varName: "+varName);
                    System.out.println("\tfind: "+find+" findIfMissing:
"+findIfMissing+" createIfNotFound: "+createIfNotFound);
                    System.out.println("\tcreate: "+create+" createIfMissing:
"+createIfMissing);
                            APAR foundAPAR = null;
                            if(((find)||(findIfMissing&&anAPAR==null))&&!create){
                                    execdFind=true;
                                    foundAPAR = findAnAPARInAttachToAPAR();
                                    if(foundAPAR==null){
                                            System.out.println("find returned null,
create?");
                                            // find failed, see if we were supposed to
create one as a last resort
                                            if(createIfNotFound||createIfMissing){
                                                    foundAPAR =
createAnAPARInAttachToAPAR();
```

```
                                    newVarCreated = true;
                                    System.out.println("created object:
anAPAR instanceId/primaryKey: "+foundAPAR.getInstanceId());
                            } else {
                                    //MODELING ERROR: object not
found and not supposed to create one
                                    System.out.println("anAPARnot
found and not supposed to create one!!! Please update model and regenerate.");
                                    return;
                            } //else(createIfMissing)
                    } else {
                            System.out.println("found object: anAPAR
instanceId/primaryKey: "+foundAPAR.getInstanceId());
                    }
            } else {
                    if(createIfMissing||create){
                            foundAPAR =
createAnAPARInAttachToAPAR();
                            newVarCreated=true;
                            System.out.println("created object:
+anAPAR InstanceId/primaryKey: "+foundAPAR.getInstanceId());
                    }//if(createIfMissing)
            } //if(find)
            if(execdFind||newVarCreated){
                    //if here, either did a find or create
                    //NB NB NB Assign object to variable here
                    //NB NB NB something like:
                    anAPAR = foundAPAR;
                    if(newVarCreated){
                            //initialize the new var
                            initializeAnAPARInAttachToAPAR();
                    }//if(newVarCreated)
            } //if(find||...)
    } //if(varName)

if (varName.equalsIgnoreCase("aCustomerRecord")){
            //NB NB FIND ANDOR CREATE
            boolean newVarCreated = false;
            boolean execdFind = false;
            boolean find = false;
            boolean findIfMissing = false;
            boolean create = false;
            boolean createIfMissing = false;
            boolean createIfNotFound = false;
```

```
                System.out.println("In ObjectPrep() for stage:
"+stageName+" varName: "+varName);
                System.out.println("\tfind: "+find+" findIfMissing:
"+findIfMissing+" createIfNotFound: "+createIfNotFound);
                System.out.println("\tcreate: "+create+" createIfMissing:
"+createIfMissing);
                CustomerRecord foundCustomerRecord = null;

if(((find)||(findIfMissing&&aCustomerRecord==null))&&!create){
                        execdFind=true;
                        foundCustomerRecord =
findACustomerRecordInAttachToAPAR();
                        if(foundCustomerRecord==null){
                                System.out.println("find returned null,
create?");
                                // find failed, see if we were supposed to
create one as a last resort
                                if(createIfNotFound||createIfMissing){
                                        foundCustomerRecord =
createACustomerRecordInAttachToAPAR();
                                        newVarCreated = true;
                                        System.out.println("created object:
aCustomerRecord instanceId/primaryKey:
"+foundCustomerRecord.getInstanceId());
                                } else {
                                        //MODELING ERROR: object not
found and not supposed to create one System.out.println("aCustomerRecordnot found and not supposed to create one!!!
Please update model and regenerate.");
                                        return;
                                } //else(createIfMissing)
                        } else {
                                System.out.println("found object:
aCustomerRecord instanceId/primaryKey:
"+foundCustomerRecord.getInstanceId());
                        }
                } else {
                        if(createIfMissing||create){
                                foundCustomerRecord =
createACustomerRecordInAttachToAPAR();
                                newVarCreated=true;
                                System.out.println("created object:
+aCustomerRecord InstanceId/primaryKey:
"+foundCustomerRecord.getInstanceId());
```

```
                }//if(createIfMissing)
            } //if(find)
            if(execdFind||newVarCreated){
                //if here, either did a find or create
                //NB NB NB Assign object to variable here
                //NB NB NB something like:
                aCustomerRecord = foundCustomerRecord;
                if(newVarCreated){
                    //initialize the new var initializeACustomerRecordInAttachToAPAR();
                }//if(newVarCreated)
            } //if(find||...)
        } //if(varName)

} //if(stageName)

if (stageName.equalsIgnoreCase("makeNewAPAR")){
        System.out.println("In ObjectPrep() for stage: "+stageName+"
varName: "+varName);
        if (varName.equalsIgnoreCase("aProblemRecord")){
            //NB NB FIND ANDOR CREATE
            boolean newVarCreated = false;
            boolean execdFind = false;
            boolean find = false;
            boolean findIfMissing = false;
            boolean create = false;
            boolean createIfMissing = false;
            boolean createIfNotFound = false;
            System.out.println("In ObjectPrep() for stage:
"+stageName+" varName: "+varName);
            System.out.println("\tfind: "+find+" findIfMissing:
"+findIfMissing+" createIfNotFound: "+createIfNotFound);
            System.out.println("\tcreate: "+create+" createIfMissing:
"+createIfMissing);
            ProblemRecord foundProblemRecord = null;

if(((find)||(findIfMissing&&aProblemRecord==null))&&!create){
                execdFind=true;
                foundProblemRecord =
findAProblemRecordInMakeNewAPAR();
                if(foundProblemRecord==null){
                    System.out.println("find returned null,
create?");
```

```
                                // find failed, see if we were supposed to
create one as a last resort
                                if(createIfNotFound||createIfMissing){
                                        foundProblemRecord =
createAProblemRecordInMakeNewAPAR();
                                        newVarCreated = true;
                                        System.out.println("created object:
aProblemRecord instanceId/primaryKey:
"+foundProblemRecord.getInstanceId());
                                } else {
                                        //MODELING ERROR: object not
found and not supposed to create one System.out.println("aProblemRecordnot found and not supposed to create one!!!
Please update model and regenerate.");
                                        return;
                                } //else(createIfMissing)
                        } else {
                                System.out.println("found object:
aProblemRecord instanceId/primaryKey:
"+foundProblemRecord.getInstanceId());
                        }
                } else {
                        if(createIfMissing||create){
                                foundProblemRecord =
createAProblemRecordInMakeNewAPAR();
                                        newVarCreated=true;
                                        System.out.println("created object:
+aProblemRecord InstanceId/primaryKey:
"+foundProblemRecord.getInstanceId());
                                }//if(createIfMissing)
                } //if(find)
                if(execdFind||newVarCreated){
                        //if here, either did a find or create
                        //NB NB NB Assign object to variable here
                        //NB NB NB something like:
                        aProblemRecord = foundProblemRecord;
                        if(newVarCreated){
                                //initialize the new var initializeAProblemRecordInMakeNewAPAR();
                        }//if(newVarCreated)
                } //if(find||...)
        } //if(varName)
```

```
if (varName.equalsIgnoreCase("anAPAR")){
    //NB NB FIND ANDOR CREATE
    boolean newVarCreated = false;
    boolean execdFind = false;
    boolean find = false;
    boolean findIfMissing = false;
    boolean create = false;
    boolean createIfMissing = false;
    boolean createIfNotFound = false;
    System.out.println("In ObjectPrep() for stage: "+stageName+" varName: "+varName);
    System.out.println("\tfind: "+find+" findIfMissing: "+findIfMissing+" createIfNotFound: "+createIfNotFound);
    System.out.println("\tcreate: "+create+" createIfMissing: "+createIfMissing);
    APAR foundAPAR = null;
    if(((find)||(findIfMissing&&anAPAR==null))&&!create){
        execdFind=true;
        foundAPAR = findAnAPARInMakeNewAPAR();
        if(foundAPAR==null){
            System.out.println("find returned null, create?");
            // find failed, see if we were supposed to create one as a last resort
            if(createIfNotFound||createIfMissing){
                foundAPAR = createAnAPARInMakeNewAPAR();
                newVarCreated = true;
                System.out.println("created object: anAPAR instanceId/primaryKey: "+foundAPAR.getInstanceId());
            } else {
                //MODELING ERROR: object not found and not supposed to create one
                System.out.println("anAPARnot found and not supposed to create one!!! Please update model and regenerate.");
                return;
            } //else(createIfMissing)
        } else {
            System.out.println("found object: anAPAR instanceId/primaryKey: "+foundAPAR.getInstanceId());
        }
    } else {
        if(createIfMissing||create){
            foundAPAR = createAnAPARInMakeNewAPAR();
```

```
                                newVarCreated=true;
                                System.out.println("created object:
+anAPAR InstanceId/primaryKey: "+foundAPAR.getInstanceId());
                        }//if(createIfMissing)
                } //if(find)
                if(execdFind||newVarCreated){
                        //if here, either did a find or create
                        //NB NB NB Assign object to variable here
                        //NB NB NB something like:
                        anAPAR = foundAPAR;
                        if(newVarCreated){
                                //initialize the new var
                                initializeAnAPARInMakeNewAPAR();
                        }//if(newVarCreated)
                } //if(find||...)
        } //if(varName)

if (varName.equalsIgnoreCase("aCustomerRecord")){
                //NB NB FIND ANDOR CREATE
                boolean newVarCreated = false;
                boolean execdFind = false;
                boolean find = false;
                boolean findIfMissing = false;
                boolean create = false;
                boolean createIfMissing = false;
                boolean createIfNotFound = false;
                System.out.println("In ObjectPrep() for stage:
"+stageName+" varName: "+varName);
                System.out.println("\tfind: "+find+" findIfMissing:
"+findIfMissing+" createIfNotFound: "+createIfNotFound);
                System.out.println("\tcreate: "+create+" createIfMissing:
"+createIfMissing);
                CustomerRecord foundCustomerRecord = null;

if(((find)||(findIfMissing&&aCustomerRecord==null))&&!create){
                                execdFind=true;
                                foundCustomerRecord =
findACustomerRecordInMakeNewAPAR();
                                if(foundCustomerRecord==null){
                                        System.out.println("find returned null,
create?");
                                        // find failed, see if we were supposed to
create one as a last resort
                                        if(createIfNotFound||createIfMissing){
```

```
                                        foundCustomerRecord =
createACustomerRecordInMakeNewAPAR();
                                        newVarCreated = true;
                                        System.out.println("created object:
aCustomerRecord instanceId/primaryKey:
"+foundCustomerRecord.getInstanceId());
                            } else {
                                        //MODELING ERROR: object not
found and not supposed to create one System.out.println("aCustomerRecordnot found and not supposed to create one!!!
Please update model and regenerate.");
                                        return;
                                } //else(createIfMissing)
                        } else {
                                        System.out.println("found object:
aCustomerRecord instanceId/primaryKey:
"+foundCustomerRecord.getInstanceId());
                                }
                    } else {
                            if(createIfMissing||create){
                                    foundCustomerRecord =
createACustomerRecordInMakeNewAPAR();
                                        newVarCreated=true;
                                        System.out.println("created object:
+aCustomerRecord InstanceId/primaryKey:
"+foundCustomerRecord.getInstanceId());
                                }//if(createIfMissing)
                    } //if(find)
                    if(execdFind||newVarCreated){
                            //if here, either did a find or create
                            //NB NB NB Assign object to variable here
                            //NB NB NB something like:
                            aCustomerRecord = foundCustomerRecord;
                            if(newVarCreated){
                                    //initialize the new var initializeACustomerRecordInMakeNewAPAR();
                                }//if(newVarCreated)
                        } //if(find||...)
                } //if(varName)

} //if(stageName)

if (stageName.equalsIgnoreCase("fixTheProduct")){
```

```
                System.out.println("In ObjectPrep() for stage: "+stageName+"
varName: "+varName);
                if (varName.equalsIgnoreCase("aProblemRecord")){
                        //NB NB FIND ANDOR CREATE
                        boolean newVarCreated = false;
                        boolean execdFind = false;
                        boolean find = false;
                        boolean findIfMissing = false;
                        boolean create = false;
                        boolean createIfMissing = false;
                        boolean createIfNotFound = false;
                        System.out.println("In ObjectPrep() for stage:
"+stageName+" varName: "+varName);
                        System.out.println("\tfind: "+find+" findIfMissing:
"+findIfMissing+" createIfNotFound: "+createIfNotFound);
                        System.out.println("\tcreate: "+create+" createIfMissing:
"+createIfMissing);
                        ProblemRecord foundProblemRecord = null;

if(((find)||(findIfMissing&&aProblemRecord==null))&&!create){
                                execdFind=true;
                                foundProblemRecord =
findAProblemRecordInFixTheProduct();
                                if(foundProblemRecord==null){
                                        System.out.println("find returned null,
create?");
                                        // find failed, see if we were supposed to
create one as a last resort
                                        if(createIfNotFound||createIfMissing){
                                                foundProblemRecord =
createAProblemRecordInFixTheProduct();
                                                newVarCreated = true;
                                                System.out.println("created object:
aProblemRecord instanceId/primaryKey:
"+foundProblemRecord.getInstanceId());
                                        } else {
                                                //MODELING ERROR: object not
found and not supposed to create one System.out.println("aProblemRecordnot found and not supposed to create one!!!
Please update model and regenerate.");
                                                return;
                                        } //else(createIfMissing)
                                } else {
```

```
                                        System.out.println("found object:
aProblemRecord instanceId/primaryKey:
"+foundProblemRecord.getInstanceId());
                                }
                        } else {
                                if(createIfMissing||create){
                                        foundProblemRecord =
createAProblemRecordInFixTheProduct();
                                        newVarCreated=true;
                                        System.out.println("created object:
+aProblemRecord InstanceId/primaryKey:
"+foundProblemRecord.getInstanceId());
                                }//if(createIfMissing)
                        } //if(find)
                        if(execdFind||newVarCreated){
                                //if here, either did a find or create
                                //NB NB NB Assign object to variable here
                                //NB NB NB something like:
                                aProblemRecord = foundProblemRecord;
                                if(newVarCreated){
                                        //initialize the new var initializeAProblemRecordInFixTheProduct();
                                }//if(newVarCreated)
                        } //if(find||...)
                } //if(varName)

if (varName.equalsIgnoreCase("aCustomerRecord")){
                        //NB NB FIND ANDOR CREATE
                        boolean newVarCreated = false;
                        boolean execdFind = false;
                        boolean find = false;
                        boolean findIfMissing = false;
                        boolean create = false;
                        boolean createIfMissing = false;
                        boolean createIfNotFound = false;
                        System.out.println("In ObjectPrep() for stage:
"+stageName+" varName: "+varName);
                        System.out.println("\tfind: "+find+" findIfMissing:
"+findIfMissing+" createIfNotFound: "+createIfNotFound);
                        System.out.println("\tcreate: "+create+" createIfMissing:
"+createIfMissing);
                        CustomerRecord foundCustomerRecord = null;

if(((find)||(findIfMissing&&aCustomerRecord==null))&&!create){
```

```
                              execdFind=true;
                              foundCustomerRecord =
findACustomerRecordInFixTheProduct();
                              if(foundCustomerRecord==null){
                                     System.out.println("find returned null,
create?");
                                     // find failed, see if we were supposed to
create one as a last resort
                                     if(createIfNotFound||createIfMissing){
                                            foundCustomerRecord =
createACustomerRecordInFixTheProduct();
                                            newVarCreated = true;
                                            System.out.println("created object:
aCustomerRecord instanceId/primaryKey:
"+foundCustomerRecord.getInstanceId());
                                     } else {
                                            //MODELING ERROR: object not
found and not supposed to create one System.out.println("aCustomerRecordnot found and not supposed to create one!!!
Please update model and regenerate.");
                                            return;
                                     } //else(createIfMissing)
                              } else {
                                     System.out.println("found object:
aCustomerRecord instanceId/primaryKey:
"+foundCustomerRecord.getInstanceId());
                              }
                       } else {
                              if(createIfMissing||create){
                                     foundCustomerRecord =
createACustomerRecordInFixTheProduct();
                                     newVarCreated=true;
                                     System.out.println("created object:
+aCustomerRecord InstanceId/primaryKey:
"+foundCustomerRecord.getInstanceId());
                              }//if(createIfMissing)
                       } //if(find)
                       if(execdFind||newVarCreated){
                              //if here, either did a find or create
                              //NB NB NB Assign object to variable here
                              //NB NB NB something like:
                              aCustomerRecord = foundCustomerRecord;
                              if(newVarCreated){
                                     //initialize the new var
```

```
initializeACustomerRecordInFixTheProduct();
            }//if(newVarCreated)
        } //if(findll...)
    } //if(varName)

if (varName.equalsIgnoreCase("anAPAR")){
                //NB NB FIND ANDOR CREATE
                boolean newVarCreated = false;
                boolean execdFind = false;
                boolean find = false;
                boolean findIfMissing = false;
                boolean create = false;
                boolean createIfMissing = false;
                boolean createIfNotFound = false;
                System.out.println("In ObjectPrep() for stage: "+stageName+" varName: "+varName);
                System.out.println("\tfind: "+find+" findIfMissing: "+findIfMissing+" createIfNotFound: "+createIfNotFound);
                System.out.println("\tcreate: "+create+" createIfMissing: "+createIfMissing);
                APAR foundAPAR = null;
                if(((find)||(findIfMissing&&anAPAR==null))&&!create){
                    execdFind=true;
                    foundAPAR = findAnAPARInFixTheProduct();
                    if(foundAPAR==null){
                        System.out.println("find returned null, create?");
                        // find failed, see if we were supposed to create one as a last resort
                        if(createIfNotFound||createIfMissing){
                            foundAPAR = createAnAPARInFixTheProduct();
                            newVarCreated = true;
                            System.out.println("created object: anAPAR instanceId/primaryKey: "+foundAPAR.getInstanceId());
                        } else {
                            //MODELING ERROR: object not found and not supposed to create one
                            System.out.println("anAPARnot found and not supposed to create one!!! Please update model and regenerate.");
                            return;
                        } //else(createIfMissing)
                    } else {
```

```
                                        System.out.println("found object: anAPAR
instanceId/primaryKey: "+foundAPAR.getInstanceId());
                                }
                        } else {
                                if(createIfMissing||create){
                                        foundAPAR =
createAnAPARInFixTheProduct();
                                        newVarCreated=true;
                                        System.out.println("created object:
+anAPAR InstanceId/primaryKey: "+foundAPAR.getInstanceId());
                                }//if(createIfMissing)
                        } //if(find)
                        if(execdFind||newVarCreated){
                                //if here, either did a find or create
                                //NB NB NB Assign object to variable here
                                //NB NB NB something like:
                                anAPAR = foundAPAR;
                                if(newVarCreated){
                                        //initialize the new var
                                        initializeAnAPARInFixTheProduct();
                                }//if(newVarCreated)
                        } //if(find||...)
                } //if(varName)

} //if(stageName)

if (stageName.equalsIgnoreCase("informTheCustomer")){
                System.out.println("In ObjectPrep() for stage: "+stageName+"
varName: "+varName);
                if (varName.equalsIgnoreCase("aProblemRecord")){
                        //NB NB FIND ANDOR CREATE
                        boolean newVarCreated = false;
                        boolean execdFind = false;
                        boolean find = false;
                        boolean findIfMissing = false;
                        boolean create = false;
                        boolean createIfMissing = false;
                        boolean createIfNotFound = false;
                        System.out.println("In ObjectPrep() for stage:
"+stageName+" varName: "+varName);
                        System.out.println("\tfind: "+find+" findIfMissing:
"+findIfMissing+" createIfNotFound: "+createIfNotFound);
                        System.out.println("\tcreate: "+create+" createIfMissing:
"+createIfMissing);
                        ProblemRecord foundProblemRecord = null;
```

```
if(((find)||(findIfMissing&&aProblemRecord==null))&&!create){
                execdFind=true;
                foundProblemRecord =
findAProblemRecordInInformTheCustomer();
                if(foundProblemRecord==null){
                        System.out.println("find returned null, create?");
                        // find failed, see if we were supposed to create one as a last resort
                        if(createIfNotFound||createIfMissing){
                                foundProblemRecord =
createAProblemRecordInInformTheCustomer();
                                newVarCreated = true;
                                System.out.println("created object: aProblemRecord instanceId/primaryKey: "+foundProblemRecord.getInstanceId());
                        } else {
                                //MODELING ERROR: object not found and not supposed to create one
System.out.println("aProblemRecordnot found and not supposed to create one!!! Please update model and regenerate.");
                                return;
                        } //else(createIfMissing)
                } else {
                        System.out.println("found object: aProblemRecord instanceId/primaryKey: "+foundProblemRecord.getInstanceId());
                }
        } else {
                if(createIfMissing||create){
                        foundProblemRecord =
createAProblemRecordInInformTheCustomer();
                                newVarCreated=true;
                                System.out.println("created object: +aProblemRecord InstanceId/primaryKey: "+foundProblemRecord.getInstanceId());
                }//if(createIfMissing)
        } //if(find)
        if(execdFind||newVarCreated){
                //if here, either did a find or create
                //NB NB NB Assign object to variable here
                //NB NB NB something like:
                aProblemRecord = foundProblemRecord;
```

```
                        if(newVarCreated){
                                //initialize the new var initializeAProblemRecordInInformTheCustomer();
                        }//if(newVarCreated)
                   } //if(findll...)
           } //if(varName)

if (varName.equalsIgnoreCase("aCustomerRecord")){
                           //NB NB FIND ANDOR CREATE
                           boolean newVarCreated = false;
                           boolean execdFind = false;
                           boolean find = false;
                           boolean findIfMissing = false;
                           boolean create = false;
                           boolean createIfMissing = false;
                           boolean createIfNotFound = false;
                           System.out.println("In ObjectPrep() for stage:
"+stageName+" varName: "+varName);
                           System.out.println("\tfind: "+find+" findIfMissing:
"+findIfMissing+" createIfNotFound: "+createIfNotFound);
                           System.out.println("\tcreate: "+create+" createIfMissing:
"+createIfMissing);
                           CustomerRecord foundCustomerRecord = null;

if(((find)||(findIfMissing&&aCustomerRecord==null))&&!create){
                                   execdFind=true;
                                   foundCustomerRecord =
findACustomerRecordInInformTheCustomer();
                               if(foundCustomerRecord==null){
                                       System.out.println("find returned null,
create?");
                                       // find failed, see if we were supposed to
create one as a last resort
                                       if(createIfNotFound||createIfMissing){
                                               foundCustomerRecord =
createACustomerRecordInInformTheCustomer();
                                               newVarCreated = true;
                                               System.out.println("created object:
aCustomerRecord instanceId/primaryKey:
"+foundCustomerRecord.getInstanceId());
                                       } else {
                                               //MODELING ERROR: object not
found and not supposed to create one
```

```
System.out.println("aCustomerRecordnot found and not supposed to create one!!!
Please update model and regenerate.");
                                        return;
                        } //else(createIfMissing)
                } else {
                                System.out.println("found object:
aCustomerRecord instanceId/primaryKey:
"+foundCustomerRecord.getInstanceId());
                        }
                } else {
                        if(createIfMissing||create){
                                foundCustomerRecord =
createACustomerRecordInInformTheCustomer();
                                newVarCreated=true;
                                System.out.println("created object:
+aCustomerRecord InstanceId/primaryKey:
"+foundCustomerRecord.getInstanceId());
                        }//if(createIfMissing)
                } //if(find)
                if(execdFind||newVarCreated){
                        //if here, either did a find or create
                        //NB NB NB Assign object to variable here
                        //NB NB NB something like:
                        aCustomerRecord = foundCustomerRecord;
                        if(newVarCreated){
                                //initialize the new var initializeACustomerRecordInInformTheCustomer();
                        }//if(newVarCreated)
                } //if(find||...)
        } //if(varName)

if (varName.equalsIgnoreCase("anAPAR")){
                //NB NB FIND ANDOR CREATE
                boolean newVarCreated = false;
                boolean execdFind = false;
                boolean find = false;
                boolean findIfMissing = false;
                boolean create = false;
                boolean createIfMissing = false;
                boolean createIfNotFound = false;
                System.out.println("In ObjectPrep() for stage:
"+stageName+" varName: "+varName);
```

```
                System.out.println("\tfind: "+find+" findIfMissing:
"+findIfMissing+" createIfNotFound: "+createIfNotFound);
                System.out.println("\tcreate: "+create+" createIfMissing:
"+createIfMissing);
                APAR foundAPAR = null;
                if(((find)||(findIfMissing&&anAPAR==null))&&!create){
                        execdFind=true;
                        foundAPAR =
findAnAPARInInformTheCustomer();
                        if(foundAPAR==null){
                                System.out.println("find returned null,
create?");
                                // find failed, see if we were supposed to
create one as a last resort
                                if(createIfNotFound||createIfMissing){
                                        foundAPAR =
createAnAPARInInformTheCustomer();
                                        newVarCreated = true;
                                        System.out.println("created object:
anAPAR instanceId/primaryKey: "+foundAPAR.getInstanceId());
                                } else {
                                        //MODELING ERROR: object not
found and not supposed to create one
                                        System.out.println("anAPARnot
found and not supposed to create one!!! Please update model and regenerate.");
                                        return;
                                } //else(createIfMissing)
                        } else {
                                System.out.println("found object: anAPAR
instanceId/primaryKey: "+foundAPAR.getInstanceId());
                        }
                } else {
                        if(createIfMissing||create){
                                foundAPAR =
createAnAPARInInformTheCustomer();
                                newVarCreated=true;
                                System.out.println("created object:
+anAPAR InstanceId/primaryKey: "+foundAPAR.getInstanceId());
                        }//if(createIfMissing)
                } //if(find)
                if(execdFind||newVarCreated){
                        //if here, either did a find or create
                        //NB NB NB Assign object to variable here
                        //NB NB NB something like:
                        anAPAR = foundAPAR;
```

```
                        if(newVarCreated){
                                //initialize the new var
                                initializeAnAPARInInformTheCustomer();
                        }//if(newVarCreated)
                } //if(findll...)
            } //if(varName)

} //if(stageName)
        else {
                System.out.println("Stage name: "+stageName+" not found in
ObjectPrep");
                }
}catch(Exception e){
        System.out.println("caught an exception in objectPrep: "+e);
} //catch
}
private CustRepository createACustomerRepositoryInIdentifyCustomer(){
        try{
                CustRepository      thing;
                thing = xCustRepositoryHome.create();                       return thing;
        } catch (Exception e){
                System.out.println("problem creating object: "+e.getMessage());
        }
        return null;
}
private CustRepository findACustomerRepositoryInIdentifyCustomer(){
        try{
                // temporary solution
                Enumeration objList = xCustRepositoryHome.findAll();
                int i=0;
                while(objList.hasMoreElements()){
                        aCustomerRepository =
(CustRepository)objList.nextElement();
                                if(true){
                                        return aCustomerRepository;
                                }
                }//while
                //if here, no matches found
                aCustomerRepository = null; //NB temporary solution
                return null;
        } catch(Exception e){
                System.out.println("problem finding object: "+e.getMessage());
        }
        return null;
}
```

```java
private void initializeACustomerRepositoryInIdentifyCustomer(){
    try{
        //must enable code from builder to be put here - look in
YifJavaSecretProcessCode>>javaObjectPrepCodeForEJB
        //NB NB NB added after generation
        Enumeration tempEnum = xCustomerRecordHome.findAll();
        Vector tempVector = new Vector();
        while(tempEnum.hasMoreElements()){ tempVector.addElement((CustomerRecord)tempEnum.nextElement());
        }

Revel.howl("EBProcessCallCenterCode>>initializeACustomerRepositoryInIdenti
fyCustomer() customer list size: "+tempVector.size());

System.out.println("EBProcessCallCenterCode>>initializeACustomerRepositoryI
nIdentifyCustomer() customer list size: "+tempVector.size());
        Vector handles = new Vector();
        for(int i=0;i<tempVector.size();i++){ handles.addElement(((CustomerRecord)tempVector.elementAt(i)).getHandle());
        }
        aCustomerRepository.setCustomers(handles);
    } catch(Exception e){
        System.out.println("problem initializing object: "+e.getMessage());
        e.printStackTrace();
    }
}
private ProblemRecord createAProblemRecordInIdentifyRequestType(){
    try{
        ProblemRecord     thing;
        thing = xProblemRecordHome.create();
        return thing;
    } catch (Exception e){
        System.out.println("problem creating object: "+e.getMessage());
    }
    return null;
}
private ProblemRecord findAProblemRecordInIdentifyRequestType(){
    try{
        // temporary solution
        Enumeration objList = xProblemRecordHome.findAll();
        int i=0;
        while(objList.hasMoreElements()){
            aProblemRecord = (ProblemRecord)objList.nextElement();
```

```
                    if(true){
                            return aProblemRecord;
                    }
            }//while
            //if here, no matches found
            aProblemRecord = null; //NB temporary solution
            return null;
    } catch(Exception e){
            System.out.println("problem finding object: "+e.getMessage());
    }
    return null;
}
private void initializeAProblemRecordInIdentifyRequestType(){
    try{
            //must enable code from builder to be put here - look in
YifJavaSecretProcessCode>>javaObjectPrepCodeForEJB aProblemRecord.setCustomerId(aCustomerRecord.getCustomerId());
    } catch(Exception e){
            System.out.println("problem initializing object: "+e.getMessage());
    }
}
private CustomerRecord createACustomerRecordInIdentifyRequestType(){
    try{
            CustomerRecord    thing;
            thing = xCustomerRecordHome.create();           return thing;
    } catch (Exception e){
            System.out.println("problem creating object: "+e.getMessage());
    }
    return null;
}
private CustomerRecord findACustomerRecordInIdentifyRequestType(){
    try{

System.out.println("EBProcessCallCenterCode.findACustomerRecordInIdentifyR
equestType()");
            // temporary solution
            Enumeration objList = xCustomerRecordHome.findAll();
            int i=0;
            while(objList.hasMoreElements()){
                    aCustomerRecord =
(CustomerRecord)objList.nextElement();

if((aCustomerRecord.getCustomerId()).equals(aCustomerRepository.getSelectedC
ustomer().getCustomerId())){
```

```
                                System.out.println("***Found customer record to
    match selected customer");
                                return aCustomerRecord;
                        }
                }//while
                //if here, no matches found
                System.out.println("***Couldn't find customer record to match
    selected customer");
                aCustomerRecord = null; //NB temporary solution
                return null;
        } catch(Exception e){
                System.out.println("problem finding object: "+e.getMessage());
                e.printStackTrace();
        }
        return null;
}
private void  initializeACustomerRecordInIdentifyRequestType(){
        try{
                //must enable code from builder to be put here - look in
    YifJavaSecretProcessCode>>javaObjectPrepCodeForEJB
        } catch(Exception e){
                System.out.println("problem initializing object: "+e.getMessage());
        }
}
private ProblemRecord createAProblemRecordInVerifyEntitlement(){
        try{
                ProblemRecord       thing;
                thing = xProblemRecordHome.create();                  return thing;
        } catch (Exception e){
                System.out.println("problem creating object: "+e.getMessage());
        }
        return null;
}
private ProblemRecord findAProblemRecordInVerifyEntitlement(){
        try{
                // temporary solution
                Enumeration objList = xProblemRecordHome.findAll();
                int i=0;
                while(objList.hasMoreElements()){
                        aProblemRecord = (ProblemRecord)objList.nextElement();
                        if(true){
                                return aProblemRecord;
                        }
                }//while
                //if here, no matches found
```

- 147 -

```
                aProblemRecord = null; //NB temporary solution
                return null;
        } catch(Exception e){
                System.out.println("problem finding object: "+e.getMessage());
        }
        return null;
}
private void  initializeAProblemRecordInVerifyEntitlement(){
        try{
                //must enable code from builder to be put here - look in
YifJavaSecretProcessCode>>javaObjectPrepCodeForEJB
        } catch(Exception e){
                System.out.println("problem initializing object: "+e.getMessage());
        }
}
private CustomerRecord createACustomerRecordInVerifyEntitlement(){
        try{
                CustomerRecord      thing;
                thing = xCustomerRecordHome.create();              return thing;
        } catch (Exception e){
                System.out.println("problem creating object: "+e.getMessage());
        }
        return null;
}
private CustomerRecord findACustomerRecordInVerifyEntitlement(){
        try{
                // temporary solution
                Enumeration objList = xCustomerRecordHome.findAll();
                int i=0;
                while(objList.hasMoreElements()){
                        aCustomerRecord =
(CustomerRecord)objList.nextElement();
                                if(true){
                                        return aCustomerRecord;
                                }
                }//while
                //if here, no matches found
                aCustomerRecord = null; //NB temporary solution
                return null;
        } catch(Exception e){
                System.out.println("problem finding object: "+e.getMessage());
        }
        return null;
}
private void  initializeACustomerRecordInVerifyEntitlement(){
```

```
        try{
                //must enable code from builder to be put here - look in
YifJavaSecretProcessCode>>javaObjectPrepCodeForEJB
        } catch(Exception e){
                System.out.println("problem initializing object: "+e.getMessage());
        }
}
private ProblemRecord createAProblemRecordInGetProblemDescription(){
        try{
                ProblemRecord    thing;
                thing = xProblemRecordHome.create();              return thing;
        } catch (Exception e){
                System.out.println("problem creating object: "+e.getMessage());
        }
        return null;
}
private ProblemRecord findAProblemRecordInGetProblemDescription(){
        try{
                // temporary solution
                Enumeration objList = xProblemRecordHome.findAll();
                int i=0;
                while(objList.hasMoreElements()){
                        aProblemRecord = (ProblemRecord)objList.nextElement();
                        if(true){
                                return aProblemRecord;
                        }
                }//while
                //if here, no matches found
                aProblemRecord = null; //NB temporary solution
                return null;
        } catch(Exception e){
                System.out.println("problem finding object: "+e.getMessage());
        }
        return null;
}
private void  initializeAProblemRecordInGetProblemDescription(){
        try{
                //must enable code from builder to be put here - look in
YifJavaSecretProcessCode>>javaObjectPrepCodeForEJB
        } catch(Exception e){
                System.out.println("problem initializing object: "+e.getMessage());
        }
}
private CustomerRecord createACustomerRecordInGetProblemDescription(){
        try{
```

```
                CustomerRecord    thing;
                thing = xCustomerRecordHome.create();           return thing;
        } catch (Exception e){
                System.out.println("problem creating object: "+e.getMessage());
        }
        return null;
}
private CustomerRecord findACustomerRecordInGetProblemDescription(){
        try{
                // temporary solution
                Enumeration objList = xCustomerRecordHome.findAll();
                int i=0;
                while(objList.hasMoreElements()){
                        aCustomerRecord = (CustomerRecord)objList.nextElement();
                                if(true){
                                        return aCustomerRecord;
                                }
                }//while
                //if here, no matches found
                aCustomerRecord = null; //NB temporary solution
                return null;
        } catch(Exception e){
                System.out.println("problem finding object: "+e.getMessage());
        }
        return null;
}
private void  initializeACustomerRecordInGetProblemDescription(){
        try{
                //must enable code from builder to be put here - look in
        YifJavaSecretProcessCode>>javaObjectPrepCodeForEJB
        } catch(Exception e){
                System.out.println("problem initializing object: "+e.getMessage());
        }
}
private ProblemRecord createAProblemRecordInLevel1HasEasyAnswer(){
        try{
                ProblemRecord    thing;
                thing = xProblemRecordHome.create();           return thing;
        } catch (Exception e){
                System.out.println("problem creating object: "+e.getMessage());
        }
        return null;
}
private ProblemRecord findAProblemRecordInLevel1HasEasyAnswer(){
```

```
try{
        // temporary solution
        Enumeration objList = xProblemRecordHome.findAll();
        int i=0;
        while(objList.hasMoreElements()){
                aProblemRecord = (ProblemRecord)objList.nextElement();
                if(true){
                        return aProblemRecord;
                }
        }//while
        //if here, no matches found
        aProblemRecord = null; //NB temporary solution
        return null;
} catch(Exception e){
        System.out.println("problem finding object: "+e.getMessage());
}
return null;
}
private void  initializeAProblemRecordInLevel1HasEasyAnswer(){
        try{
                //must enable code from builder to be put here - look in
YifJavaSecretProcessCode>>javaObjectPrepCodeForEJB
        } catch(Exception e){
                System.out.println("problem initializing object: "+e.getMessage());
        }
}
private CustomerRecord createACustomerRecordInLevel1HasEasyAnswer(){
        try{
                CustomerRecord     thing;
                thing = xCustomerRecordHome.create();            return thing;
        } catch (Exception e){
                System.out.println("problem creating object: "+e.getMessage());
        }
        return null;
}
private CustomerRecord findACustomerRecordInLevel1HasEasyAnswer(){
        try{
                // temporary solution
                Enumeration objList = xCustomerRecordHome.findAll();
                int i=0;
                while(objList.hasMoreElements()){
                        aCustomerRecord =
(CustomerRecord)objList.nextElement();
                                if(true){
                                        return aCustomerRecord;
```

```
                    }
                }//while
                //if here, no matches found
                aCustomerRecord = null; //NB temporary solution
                return null;
        } catch(Exception e){
                System.out.println("problem finding object: "+e.getMessage());
        }
        return null;
}
private void initializeACustomerRecordInLevel1HasEasyAnswer(){
        try{
                //must enable code from builder to be put here - look in
YifJavaSecretProcessCode>>javaObjectPrepCodeForEJB
        } catch(Exception e){
                System.out.println("problem initializing object: "+e.getMessage());
        }
}
private ProblemRecord createAProblemRecordInFindRecordOfSimilarProblem(){
        try{
                ProblemRecord    thing;
                thing = xProblemRecordHome.create();              return thing;
        } catch (Exception e){
                System.out.println("problem creating object: "+e.getMessage());
        }
        return null;
}
private ProblemRecord findAProblemRecordInFindRecordOfSimilarProblem(){
        try{
                // temporary solution
                Enumeration objList = xProblemRecordHome.findAll();
                int i=0;
                while(objList.hasMoreElements()){
                        aProblemRecord = (ProblemRecord)objList.nextElement();
                        if(true){
                                return aProblemRecord;
                        }
                }//while
                //if here, no matches found
                aProblemRecord = null; //NB temporary solution
                return null;
        } catch(Exception e){
                System.out.println("problem finding object: "+e.getMessage());
        }
        return null;
```

```
}
private void  initializeAProblemRecordInFindRecordOfSimilarProblem(){
        try{
                //must enable code from builder to be put here - look in
YifJavaSecretProcessCode>>javaObjectPrepCodeForEJB
        } catch(Exception e){
                System.out.println("problem initializing object: "+e.getMessage());
        }
}
private CustomerRecord
createACustomerRecordInFindRecordOfSimilarProblem(){
        try{
                CustomerRecord     thing;
                thing = xCustomerRecordHome.create();           return thing;
        } catch (Exception e){
                System.out.println("problem creating object: "+e.getMessage());
        }
        return null;
}
private CustomerRecord
findACustomerRecordInFindRecordOfSimilarProblem(){
        try{
                // temporary solution
                Enumeration objList = xCustomerRecordHome.findAll();
                int i=0;
                while(objList.hasMoreElements()){
                        aCustomerRecord =
(CustomerRecord)objList.nextElement();
                        if(true){
                                return aCustomerRecord;
                        }
                }//while
                //if here, no matches found
                aCustomerRecord = null; //NB temporary solution
                return null;
        } catch(Exception e){
                System.out.println("problem finding object: "+e.getMessage());
        }
        return null;
}
private void  initializeACustomerRecordInFindRecordOfSimilarProblem(){
        try{
                //must enable code from builder to be put here - look in
YifJavaSecretProcessCode>>javaObjectPrepCodeForEJB
        } catch(Exception e){
```

```
                    System.out.println("problem initializing object: "+e.getMessage());
            }
    }
    private ProblemRecord
    createAProblemRecordInDetermineComponentAndWriteUpProblem(){
            try{
                    ProblemRecord     thing;
                    thing = xProblemRecordHome.create();              return thing;
            } catch (Exception e){
                    System.out.println("problem creating object: "+e.getMessage());
            }
            return null;
    }
    private ProblemRecord
    findAProblemRecordInDetermineComponentAndWriteUpProblem(){
            try{
                    // temporary solution
                    Enumeration objList = xProblemRecordHome.findAll();
                    int i=0;
                    while(objList.hasMoreElements()){
                            aProblemRecord = (ProblemRecord)objList.nextElement();
                            if(true){
                                    return aProblemRecord;
                            }
                    }//while
                    //if here, no matches found
                    aProblemRecord = null; //NB temporary solution
                    return null;
            } catch(Exception e){
                    System.out.println("problem finding object: "+e.getMessage());
            }
            return null;
    }
    private void
    initializeAProblemRecordInDetermineComponentAndWriteUpProblem(){
            try{
                    //must enable code from builder to be put here - look in
    YifJavaSecretProcessCode>>javaObjectPrepCodeForEJB
            } catch(Exception e){
                    System.out.println("problem initializing object: "+e.getMessage());
            }
    }
    private CustomerRecord
    createACustomerRecordInDetermineComponentAndWriteUpProblem(){
            try{
```

```
                CustomerRecord    thing;
                thing = xCustomerRecordHome.create();          return thing;
        } catch (Exception e){
                System.out.println("problem creating object: "+e.getMessage());
        }
        return null;
}
private CustomerRecord
findACustomerRecordInDetermineComponentAndWriteUpProblem(){
        try{
                // temporary solution
                Enumeration objList = xCustomerRecordHome.findAll();
                int i=0;
                while(objList.hasMoreElements()){
                        aCustomerRecord =
(CustomerRecord)objList.nextElement();
                        if(true){
                                return aCustomerRecord;
                        }
                }//while
                //if here, no matches found
                aCustomerRecord = null; //NB temporary solution
                return null;
        } catch(Exception e){
                System.out.println("problem finding object: "+e.getMessage());
        }
        return null;
}
private void
initializeACustomerRecordInDetermineComponentAndWriteUpProblem(){
        try{
                //must enable code from builder to be put here - look in
YifJavaSecretProcessCode>>javaObjectPrepCodeForEJB
        } catch(Exception e){
                System.out.println("problem initializing object: "+e.getMessage());
        }
}
private CustomerRecord
createACustomerRecordInTryToDealWithTheProblem(){
        try{
                CustomerRecord    thing;
                thing = xCustomerRecordHome.create();          return thing;
        } catch (Exception e){
                System.out.println("problem creating object: "+e.getMessage());
        }
```

```java
                return null;
        }
        private CustomerRecord findACustomerRecordInTryToDealWithTheProblem(){
                try{
                        // temporary solution
                        Enumeration objList = xCustomerRecordHome.findAll();
                        int i=0;
                        while(objList.hasMoreElements()){
                                aCustomerRecord = (CustomerRecord)objList.nextElement();
                                if(true){
                                        return aCustomerRecord;
                                }
                        }//while
                        //if here, no matches found
                        aCustomerRecord = null; //NB temporary solution
                        return null;
                } catch(Exception e){
                        System.out.println("problem finding object: "+e.getMessage());
                }
                return null;
        }
        private void  initializeACustomerRecordInTryToDealWithTheProblem(){
                try{
                        //must enable code from builder to be put here - look in
YifJavaSecretProcessCode>>javaObjectPrepCodeForEJB
                } catch(Exception e){
                        System.out.println("problem initializing object: "+e.getMessage());
                }
        }
        private ProblemRecord createAProblemRecordInTryToDealWithTheProblem(){
                try{
                        ProblemRecord      thing;
                        thing = xProblemRecordHome.create();                return thing;
                } catch (Exception e){
                        System.out.println("problem creating object: "+e.getMessage());
                }
                return null;
        }
        private ProblemRecord findAProblemRecordInTryToDealWithTheProblem(){
                try{
                        // temporary solution
                        Enumeration objList = xProblemRecordHome.findAll();
                        int i=0;
                        while(objList.hasMoreElements()){
```

```
                aProblemRecord = (ProblemRecord)objList.nextElement();
                if(true){
                        return aProblemRecord;
                }
        }//while
        //if here, no matches found
        aProblemRecord = null; //NB temporary solution
        return null;
    } catch(Exception e){
        System.out.println("problem finding object: "+e.getMessage());
    }
    return null;
}
private void  initializeAProblemRecordInTryToDealWithTheProblem(){
    try{
        //must enable code from builder to be put here - look in
YifJavaSecretProcessCode>>javaObjectPrepCodeForEJB
    } catch(Exception e){
        System.out.println("problem initializing object: "+e.getMessage());
    }
}
private CustomerRecord createACustomerRecordInIsItANewProblem(){
    try{
        CustomerRecord      thing;
        thing = xCustomerRecordHome.create();             return thing;
    } catch (Exception e){
        System.out.println("problem creating object: "+e.getMessage());
    }
    return null;
}
private CustomerRecord findACustomerRecordInIsItANewProblem(){
    try{
        // temporary solution
        Enumeration objList = xCustomerRecordHome.findAll();
        int i=0;
        while(objList.hasMoreElements()){
                aCustomerRecord = (CustomerRecord)objList.nextElement();
                if(true){
                        return aCustomerRecord;
                }
        }//while
        //if here, no matches found
        aCustomerRecord = null; //NB temporary solution
        return null;
```

- 157 -

```
        } catch(Exception e){
                System.out.println("problem finding object: "+e.getMessage());
        }
        return null;
}
private void  initializeACustomerRecordInIsItANewProblem(){
        try{
                //must enable code from builder to be put here - look in
YifJavaSecretProcessCode>>javaObjectPrepCodeForEJB
        } catch(Exception e){
                System.out.println("problem initializing object: "+e.getMessage());
        }
}
private ProblemRecord createAProblemRecordInIsItANewProblem(){
        try{
                ProblemRecord       thing;
                thing = xProblemRecordHome.create();               return thing;
        } catch (Exception e){
                System.out.println("problem creating object: "+e.getMessage());
        }
        return null;
}
private ProblemRecord findAProblemRecordInIsItANewProblem(){
        try{
                // temporary solution
                Enumeration objList = xProblemRecordHome.findAll();
                int i=0;
                while(objList.hasMoreElements()){
                        aProblemRecord = (ProblemRecord)objList.nextElement();
                        if(true){
                                return aProblemRecord;
                        }
                }//while
                //if here, no matches found
                aProblemRecord = null; //NB temporary solution
                return null;
        } catch(Exception e){
                System.out.println("problem finding object: "+e.getMessage());
        }
        return null;
}
private void  initializeAProblemRecordInIsItANewProblem(){
        try{
                //must enable code from builder to be put here - look in
YifJavaSecretProcessCode>>javaObjectPrepCodeForEJB
```

```
        } catch(Exception e){
                System.out.println("problem initializing object: "+e.getMessage());
        }
}
private ProblemRecord createAProblemRecordInAttachToAPAR(){
        try{
                ProblemRecord     thing;
                thing = xProblemRecordHome.create();          return thing;
        } catch (Exception e){
                System.out.println("problem creating object: "+e.getMessage());
        }
        return null;
}
private ProblemRecord findAProblemRecordInAttachToAPAR(){
        try{
                // temporary solution
                Enumeration objList = xProblemRecordHome.findAll();
                int i=0;
                while(objList.hasMoreElements()){
                        aProblemRecord = (ProblemRecord)objList.nextElement();
                        if(true){
                                return aProblemRecord;
                        }
                }//while
                //if here, no matches found
                aProblemRecord = null; //NB temporary solution
                return null;
        } catch(Exception e){
                System.out.println("problem finding object: "+e.getMessage());
        }
        return null;
}
private void  initializeAProblemRecordInAttachToAPAR(){
        try{
                //must enable code from builder to be put here - look in
YifJavaSecretProcessCode>>javaObjectPrepCodeForEJB
        } catch(Exception e){
                System.out.println("problem initializing object: "+e.getMessage());
        }
}
private APAR createAnAPARInAttachToAPAR(){
        try{
                APAR thing;
                thing = xAPARHome.create();        return thing;
        } catch (Exception e){
```

```
                    System.out.println("problem creating object: "+e.getMessage());
            }
            return null;
    }
    private APAR findAnAPARInAttachToAPAR(){
            try{
                    // temporary solution
                    Enumeration objList = xAPARHome.findAll();
                    int i=0;
                    while(objList.hasMoreElements()){
                            anAPAR = (APAR)objList.nextElement();
                            if(true){
                                    return anAPAR;
                            }
                    }//while
                    //if here, no matches found
                    anAPAR = null; //NB temporary solution
                    return null;
            } catch(Exception e){
                    System.out.println("problem finding object: "+e.getMessage());
            }
            return null;
    }
    private void initializeAnAPARInAttachToAPAR(){
            try{
                    //must enable code from builder to be put here - look in
    YifJavaSecretProcessCode>>javaObjectPrepCodeForEJB
            } catch(Exception e){
                    System.out.println("problem initializing object: "+e.getMessage());
            }
    }
    private CustomerRecord createACustomerRecordInAttachToAPAR(){
            try{
                    CustomerRecord      thing;
                    thing = xCustomerRecordHome.create();                return thing;
            } catch (Exception e){
                    System.out.println("problem creating object: "+e.getMessage());
            }
            return null;
    }
    private CustomerRecord findACustomerRecordInAttachToAPAR(){
            try{
                    // temporary solution
                    Enumeration objList = xCustomerRecordHome.findAll();
                    int i=0;
```

```
                while(objList.hasMoreElements()){
                        aCustomerRecord =
(CustomerRecord)objList.nextElement();
                        if(true){
                                return aCustomerRecord;
                        }
                }//while
                //if here, no matches found
                aCustomerRecord = null; //NB temporary solution
                return null;
        } catch(Exception e){
                System.out.println("problem finding object: "+e.getMessage());
        }
        return null;
}
private void  initializeACustomerRecordInAttachToAPAR(){
        try{
                //must enable code from builder to be put here - look in
YifJavaSecretProcessCode>>javaObjectPrepCodeForEJB
        } catch(Exception e){
                System.out.println("problem initializing object: "+e.getMessage());
        }
}
private ProblemRecord createAProblemRecordInMakeNewAPAR(){
        try{
                ProblemRecord       thing;
                thing = xProblemRecordHome.create();            return thing;
        } catch (Exception e){
                System.out.println("problem creating object: "+e.getMessage());
        }
        return null;
}
private ProblemRecord findAProblemRecordInMakeNewAPAR(){
        try{
                // temporary solution
                Enumeration objList = xProblemRecordHome.findAll();
                int i=0;
                while(objList.hasMoreElements()){
                        aProblemRecord = (ProblemRecord)objList.nextElement();
                        if(true){
                                return aProblemRecord;
                        }
                }//while
                //if here, no matches found
                aProblemRecord = null; //NB temporary solution
```

```java
                    return null;
            } catch(Exception e){
                    System.out.println("problem finding object: "+e.getMessage());
            }
            return null;
    }
    private void  initializeAProblemRecordInMakeNewAPAR(){
            try{
                    //must enable code from builder to be put here - look in
    YifJavaSecretProcessCode>>javaObjectPrepCodeForEJB
            } catch(Exception e){
                    System.out.println("problem initializing object: "+e.getMessage());
            }
    }
    private APAR createAnAPARInMakeNewAPAR(){
            try{
                    APAR thing;
                    thing = xAPARHome.create();                return thing;
            } catch (Exception e){
                    System.out.println("problem creating object: "+e.getMessage());
            }
            return null;
    }
    private APAR findAnAPARInMakeNewAPAR(){
            try{
                    // temporary solution
                    Enumeration objList = xAPARHome.findAll();
                    int i=0;
                    while(objList.hasMoreElements()){
                            anAPAR = (APAR)objList.nextElement();
                            if(true){
                                    return anAPAR;
                            }
                    }//while
                    //if here, no matches found
                    anAPAR = null; //NB temporary solution
                    return null;
            } catch(Exception e){
                    System.out.println("problem finding object: "+e.getMessage());
            }
            return null;
    }
    private void  initializeAnAPARInMakeNewAPAR(){
            try{
```

```
                //must enable code from builder to be put here - look in
YifJavaSecretProcessCode>>javaObjectPrepCodeForEJB
        } catch(Exception e){
                System.out.println("problem initializing object: "+e.getMessage());
        }
}
private CustomerRecord createACustomerRecordInMakeNewAPAR(){
        try{
                CustomerRecord      thing;
                thing = xCustomerRecordHome.create();            return thing;
        } catch (Exception e){
                System.out.println("problem creating object: "+e.getMessage());
        }
        return null;
}
private CustomerRecord findACustomerRecordInMakeNewAPAR(){
        try{
                // temporary solution
                Enumeration objList = xCustomerRecordHome.findAll();
                int i=0;
                while(objList.hasMoreElements()){
                        aCustomerRecord =
(CustomerRecord)objList.nextElement();
                        if(true){
                                return aCustomerRecord;
                        }
                }//while
                //if here, no matches found
                aCustomerRecord = null; //NB temporary solution
                return null;
        } catch(Exception e){
                System.out.println("problem finding object: "+e.getMessage());
        }
        return null;
}
private void initializeACustomerRecordInMakeNewAPAR(){
        try{
                //must enable code from builder to be put here - look in
YifJavaSecretProcessCode>>javaObjectPrepCodeForEJB
        } catch(Exception e){
                System.out.println("problem initializing object: "+e.getMessage());
        }
}
private ProblemRecord createAProblemRecordInFixTheProduct(){
        try{
```

```
                ProblemRecord    thing;
                thing = xProblemRecordHome.create();        return thing;
        } catch (Exception e){
                System.out.println("problem creating object: "+e.getMessage());
        }
        return null;
}
private ProblemRecord findAProblemRecordInFixTheProduct(){
        try{
                // temporary solution
                Enumeration objList = xProblemRecordHome.findAll();
                int i=0;
                while(objList.hasMoreElements()){
                        aProblemRecord = (ProblemRecord)objList.nextElement();
                        if(true){
                                return aProblemRecord;
                        }
                }//while
                //if here, no matches found
                aProblemRecord = null; //NB temporary solution
                return null;
        } catch(Exception e){
                System.out.println("problem finding object: "+e.getMessage());
        }
        return null;
}
private void initializeAProblemRecordInFixTheProduct(){
        try{
                //must enable code from builder to be put here - look in
YifJavaSecretProcessCode>>javaObjectPrepCodeForEJB
        } catch(Exception e){
                System.out.println("problem initializing object: "+e.getMessage());
        }
}
private CustomerRecord createACustomerRecordInFixTheProduct(){
        try{
                CustomerRecord    thing;
                thing = xCustomerRecordHome.create();        return thing;
        } catch (Exception e){
                System.out.println("problem creating object: "+e.getMessage());
        }
        return null;
}
private CustomerRecord findACustomerRecordInFixTheProduct(){
        try{
```

```
                    // temporary solution
                    Enumeration objList = xCustomerRecordHome.findAll();
                    int i=0;
                    while(objList.hasMoreElements()){
                            aCustomerRecord =
(CustomerRecord)objList.nextElement();
                            if(true){
                                    return aCustomerRecord;
                            }
                    }//while
                    //if here, no matches found
                    aCustomerRecord = null; //NB temporary solution
                    return null;
            } catch(Exception e){
                    System.out.println("problem finding object: "+e.getMessage());
            }
            return null;
    }
    private void  initializeACustomerRecordInFixTheProduct(){
            try{
                    //must enable code from builder to be put here - look in
YifJavaSecretProcessCode>>javaObjectPrepCodeForEJB
            } catch(Exception e){
                    System.out.println("problem initializing object: "+e.getMessage());
            }
    }
    private APAR createAnAPARInFixTheProduct(){
            try{
                    APAR thing;
                    thing = xAPARHome.create();                 return thing;
            } catch (Exception e){
                    System.out.println("problem creating object: "+e.getMessage());
            }
            return null;
    }
    private APAR findAnAPARInFixTheProduct(){
            try{
                    // temporary solution
                    Enumeration objList = xAPARHome.findAll();
                    int i=0;
                    while(objList.hasMoreElements()){
                            anAPAR = (APAR)objList.nextElement();
                            if(true){
                                    return anAPAR;
                            }
```

```
            }//while
            //if here, no matches found
            anAPAR = null; //NB temporary solution
            return null;
        } catch(Exception e){
            System.out.println("problem finding object: "+e.getMessage());
        }
        return null;
    }
    private void  initializeAnAPARInFixTheProduct(){
        try{
            //must enable code from builder to be put here - look in
YifJavaSecretProcessCode>>javaObjectPrepCodeForEJB
        } catch(Exception e){
            System.out.println("problem initializing object: "+e.getMessage());
        }
    }
    private ProblemRecord createAProblemRecordInInformTheCustomer(){
        try{
            ProblemRecord      thing;
            thing = xProblemRecordHome.create();              return thing;
        } catch (Exception e){
            System.out.println("problem creating object: "+e.getMessage());
        }
        return null;
    }
    private ProblemRecord findAProblemRecordInInformTheCustomer(){
        try {
            // temporary solution
            Enumeration objList = xProblemRecordHome.findAll();
            int i=0;
            while(objList.hasMoreElements()){
                aProblemRecord = (ProblemRecord)objList.nextElement();
                if(true){
                    return aProblemRecord;
                }
            }//while
            //if here, no matches found
            aProblemRecord = null; //NB temporary solution
            return null;
        } catch(Exception e){
            System.out.println("problem finding object: "+e.getMessage());
        }
        return null;
    }
```

```
private void initializeAProblemRecordInInformTheCustomer(){
        try{
                //must enable code from builder to be put here - look in
YifJavaSecretProcessCode>>javaObjectPrepCodeForEJB
        } catch(Exception e){
                System.out.println("problem initializing object: "+e.getMessage());
        }
}
private CustomerRecord createACustomerRecordInInformTheCustomer(){
        try{
                CustomerRecord    thing;
                thing = xCustomerRecordHome.create();          return thing;
        } catch (Exception e){
                System.out.println("problem creating object: "+e.getMessage());
        }
        return null;
}
private CustomerRecord findACustomerRecordInInformTheCustomer(){
        try{
                // temporary solution
                Enumeration objList = xCustomerRecordHome.findAll();
                int i=0;
                while(objList.hasMoreElements()){
                        aCustomerRecord =
(CustomerRecord)objList.nextElement();
                                if(true){
                                        return aCustomerRecord;
                                }
                }//while
                //if here, no matches found
                aCustomerRecord = null; //NB temporary solution
                return null;
        } catch(Exception e){
                System.out.println("problem finding object: "+e.getMessage());
        }
        return null;
}
private void initializeACustomerRecordInInformTheCustomer(){
        try{
                //must enable code from builder to be put here - look in
YifJavaSecretProcessCode>>javaObjectPrepCodeForEJB
        } catch(Exception e){
                System.out.println("problem initializing object: "+e.getMessage());
        }
}
```

```
private APAR createAnAPARInInformTheCustomer(){
    try{
        APAR thing;
        thing = xAPARHome.create();            return thing;
    } catch (Exception e){
        System.out.println("problem creating object: "+e.getMessage());
    }
    return null;
}
private APAR findAnAPARInInformTheCustomer(){
    try{
        // temporary solution
        Enumeration objList = xAPARHome.findAll();
        int i=0;
        while(objList.hasMoreElements()){
            anAPAR = (APAR)objList.nextElement();
            if(true){
                return anAPAR;
            }
        }//while
        //if here, no matches found
        anAPAR = null; //NB temporary solution
        return null;
    } catch(Exception e){
        System.out.println("problem finding object: "+e.getMessage());
    }
    return null;
}
private void  initializeAnAPARInInformTheCustomer(){
    try{
        //must enable code from builder to be put here - look in
YifJavaSecretProcessCode>>javaObjectPrepCodeForEJB
    } catch(Exception e){
        System.out.println("problem initializing object: "+e.getMessage());
    }
}

}
```

We claim:

1. A computer-implemented method for developing software for use in an information system that comprises diverse software services and hardware platforms, the method comprising the steps of:
   generating data representing a model of an enterprise process, wherein said model of an enterprise process comprises, without any modeling constructs external to said model, a plurality of actors, actions performed by said actors, objects acted upon by said actions, wherein the objects comprise object models of business logic;
   identifying a configuration defining software services and hardware platforms that support said model represented by said data; and
   generating program fragments suitable for execution on hardware platforms defined by said configuration that uses software services defined by said configuration, wherein said program fragments support said model represented by said data.

2. The method of claim 1, wherein the step of generating said data representing said model is based upon user input with a graphical interface that visually depicts said model.

3. The method of claim 1, wherein the generating step uses a set of templates that support the software services and hardware platforms defined by said configuration.

4. The method of claim 1, wherein the view of attributes of at least one of the objects in a given situation of the enterprise process is based upon user input.

5. The method of claim 4, wherein the view of said attributes of the at least one object is defined by:
   associating a plurality of situation/role pairs with the at least one object; and
   for each particular situation/role pair, defining a view definition of the attributes of the at least one object based upon user input, and storing the view definition for subsequent use by the information system.

6. The method of claim 5, wherein said view definition indicates whether the attributes of the at least one object are to be displayed.

7. The method of claim 5, wherein said view definition provides information that dictates how to display the attributes of the at least one object.

8. The method of claim 5, wherein said view definition indicates whether the attributes of the at least one object are to be editable.

9. The method of claim 5, wherein said view definition provides information that dictates how to edit the attributes of the at least one object.

10. The method according to of claim 1, further comprising the steps of:
    generating an additional model using additional modeling constructs, whereby said additional modeling constructs define additional characteristics of the enterprise process; and
    generating program fragments reflective of said additional characteristics.

11. A computer-implemented method for developing software for use in an information system that comprises diverse software services and hardware platforms, the method comprising the steps of:
    generating data representing a model of an enterprise process, wherein said model of an enterprise process comprises, without an additional modeling constructs, a plurality of actors, actions performed by said actors, and objects acted upon by said actions, the objects comprising object models of business logic, and wherein said data represented said model is based upon user input with a graphical interface that visually depicts said model;
    identifying a configuration defining software services and hardware platforms that support said model represented by said data; and
    generating program fragments suitable for execution on hardware platforms defined by said configuration that uses software services defined by said configuration, wherein said program fragments support said model represented by said data.

12. The method of claim 11, wherein the generating step uses a set of templates that support the software services and hardware platforms defined by said configuration.

13. The method of claim 11, wherein the view of attributes of at least one of the objects in a given situation of the enterprise process is based upon user input.

14. The method of claim 11, wherein said model comprises a plurality of roles.

15. The method of claim 14, wherein the view of said attributes of the at least one object is defined by:
    associating a plurality of situation/role pairs with the at least one object; and
    for each particular situation/role pair, defining a view definition of the attributes of the at least one object based upon user input, and storing the view definition for subsequent use by the information system.

16. The method of claim 15, wherein said view definition indicates whether the attributes of the at least one object are to be displayed.

17. The method of claim 15, wherein said view definition provides information that dictates how to display the attributes of the at least one object.

18. The method of claim 15, wherein said view definition indicates whether the attributes of the at least one object are to be editable.

19. The method of claim 15, wherein said view definition provides information that dictates how to edit the attributes of the at least one object.

20. The method according to of claim 11, further comprising the steps of:
    generating an additional model using additional modeling constructs, whereby said additional modeling constructs define additional characteristics of the enterprise process; and
    generating program fragments reflective of said additional characteristics.

21. A program storage device readable by a machine, tangibly embodying a program of instructions executable by the machine to perform method steps for developing software for use in an information system that comprises diverse software services and hardware platforms, the method steps comprising:
    generating data representing a model of an enterprise process, wherein said model of an enterprise process comprises, without any modeling constructs external to said model, a plurality of actors, actions performed by said actors, objects acted upon by said actions, the objects comprising object models of business logic, and roles, wherein the objects comprise object models of business to logic,
    identifying a configuration defining software services and hardware platforms that support said model represented by said data; and
    generating program fragments suitable for execution on hardware platforms defined by said configuration that uses software services defined by said configuration, wherein said program fragments support said model represented by said data.

22. The program storage device of claim 21, wherein the step of generating said data representing said model is based upon user input with a graphical interface that visually depicts said model.

23. The program storage device of claim 21, wherein the generating step uses a set of templates that support the software services and hardware platforms defined by said configuration.

24. The program storage device of claim 21, wherein the view of attributes of at least one of the objects in a given situation of the enterprise process is based upon user input.

25. The program storage device of claim 24, wherein the view of said attributes of the at least one object is defined by:
    associating a plurality of situation/role pairs with the at least one object; and
    for each particular situation/role pair, defining a view definition of the attributes of the at least one object based upon user input, and storing the view definition for subsequent use by the information system.

26. The program storage device of claim 25, wherein the view definition indicates whether the attributes of the at least one object are to be displayed.

27. The program storage device of claim 25, wherein said view definition provides information that dictates how to display the attributes of the at least one object.

28. The program storage device of claim 25, wherein said view definition indicates whether the attributes of the at least one object are to be editable.

29. The program storage device of claim 25, wherein said view definition provides information that dictates how to edit the attributes of the at least one object.

30. The program storage device according to of claim 21, further comprising the steps of:
    generating an additional model using additional modeling constructs, whereby said additional modeling constructs define additional characteristics of the enterprise process; and
    generating program fragments reflective of said additional characteristics.

31. A program storage device readable by a machine, tangibly embodying a program of instructions executable by the machine to perform method steps for developing software for use in an information system that comprises diverse software services and hardware platforms, the method comprising the steps of:
    generating data representing a model of an enterprise process, wherein said model of an enterprise process comprises without any modeling constructs external to said model, a plurality of actors, actions performed by said actors, and objects acted upon by said actions, the objects comprising object models of business logic, and wherein said data representing said model is based upon user input with a graphical interface that visually depicts said model;
    identifying a configuration defining software services and hardware platforms that support said model represented by said data; and
    generating program fragments suitable for execution on hardware platforms defined by said configuration that uses software services defined by said configuration, wherein said program fragments support said model represented by said data.

32. The program storage device of claim 31, wherein the generating step uses a set of templates that support the software services and hardware platforms defined by said configuration.

33. The program storage device of claim 31, wherein the view of attributes of at least one of the objects in a given situation of the enterprise process is based upon user input.

34. The program storage device of claim 31, wherein said model comprises a plurality of roles.

35. The program storage device of claim 34, wherein the view of said attributes of the at least one object is defined by:
    associating a plurality of situation/role pairs with the at least one object; and
    for each particular situation/role pair, defining a view definition of the attributes of the at least one object based upon user input, and storing the view definition for subsequent use by the information system.

36. The program storage device of claim 35, wherein said view definition indicates whether the attributes of the at least one object are to be displayed.

37. The program storage device of claim 35, wherein said view definition provides information that dictates how to display the attributes of the at least one object.

38. The program storage device of claim 35, wherein said view definition indicates whether the attributes of the at least one object are to be editable.

39. The program storage device of claim 35, wherein said view definition provides information that dictates how to edit the attributes of the at least one object.

40. The program storage device according to of claim 31, further comprising the steps of:
    generating an additional model using additional modeling constructs, whereby said additional modeling constructs define additional characteristics of the enterprise process; and
    generating program fragments reflective of said additional characteristics.

* * * * *

UNITED STATES PATENT AND TRADEMARK OFFICE
CERTIFICATE OF CORRECTION

PATENT NO.         : 6,732,353 B1                                     Page 1 of 1
APPLICATION NO. : 09/460642
DATED               : May 4, 2004
INVENTOR(S)       : Bard Bloom et al.

It is certified that error appears in the above-identified patent and that said Letters Patent is hereby corrected as shown below:

Column 352, Line 55, should read as follows:

generating data representing a model of an enterprise
    process, wherein said model of an enterprise process
    comprises, without any modeling constructs external to
    said model, a plurality of actors, actions performed by
    said actors, objects acted upon by said actions, the
    objects comprising object models of business logic, and roles;

Signed and Sealed this

Eighth Day of January, 2008

JON W. DUDAS
*Director of the United States Patent and Trademark Office*